(12) United States Patent
Zhang et al.

(10) Patent No.: US 12,184,972 B2
(45) Date of Patent: Dec. 31, 2024

(54) CAMERA USE METHOD, ELECTRONIC DEVICE, AND CAMERA

(71) Applicant: HUAWEI TECHNOLOGIES CO., LTD., Guangdong (CN)

(72) Inventors: Xingong Zhang, Xi'an (CN); Fei Lv, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 18/003,652

(22) PCT Filed: Mar. 16, 2021

(86) PCT No.: PCT/CN2021/081092
§ 371 (c)(1),
(2) Date: Dec. 28, 2022

(87) PCT Pub. No.: WO2022/001191
PCT Pub. Date: Jan. 6, 2022

(65) Prior Publication Data
US 2023/0254575 A1 Aug. 10, 2023

(30) Foreign Application Priority Data
Jun. 30, 2020 (CN) .......................... 202010618161.2

(51) Int. Cl.
*H04N 23/661* (2023.01)
*G06F 13/42* (2006.01)

(52) U.S. Cl.
CPC ....... *H04N 23/661* (2023.01); *G06F 13/4282* (2013.01)

(58) Field of Classification Search
CPC .... H04N 23/661; H04N 23/617; H04N 23/66; G06F 13/4282
See application file for complete search history.

(56) References Cited

U.S. PATENT DOCUMENTS

| | | | |
|---|---|---|---|
| 11,032,136 B2 * | 6/2021 | Karivaradaswamy | ...................... H04N 23/661 |
| 2018/0124294 A1 * | 5/2018 | Ogata | ................... H04N 23/661 |
| 2022/0038484 A1 * | 2/2022 | Das | ......................... H04L 63/10 |

\* cited by examiner

*Primary Examiner* — Gevell V Selby
(74) *Attorney, Agent, or Firm* — Fish & Richardson P.C.

(57) ABSTRACT

Example camera use methods and apparatus are described. One example includes receiving a first message including an application ID or an application sub-function ID. When a type corresponding to the first message is a first type, a first processing result having a first message type is outputted along a first path through the first interface. When a type corresponding to the first message is a second type, a second processing result having a second message type is outputted along a second path or a third path through the first interface. A second message is received, which includes another application ID or another application sub-function ID. When a type corresponding to the second message is the first type, a third processing result having the first message type is outputted along the first path through the first interface.

17 Claims, 36 Drawing Sheets

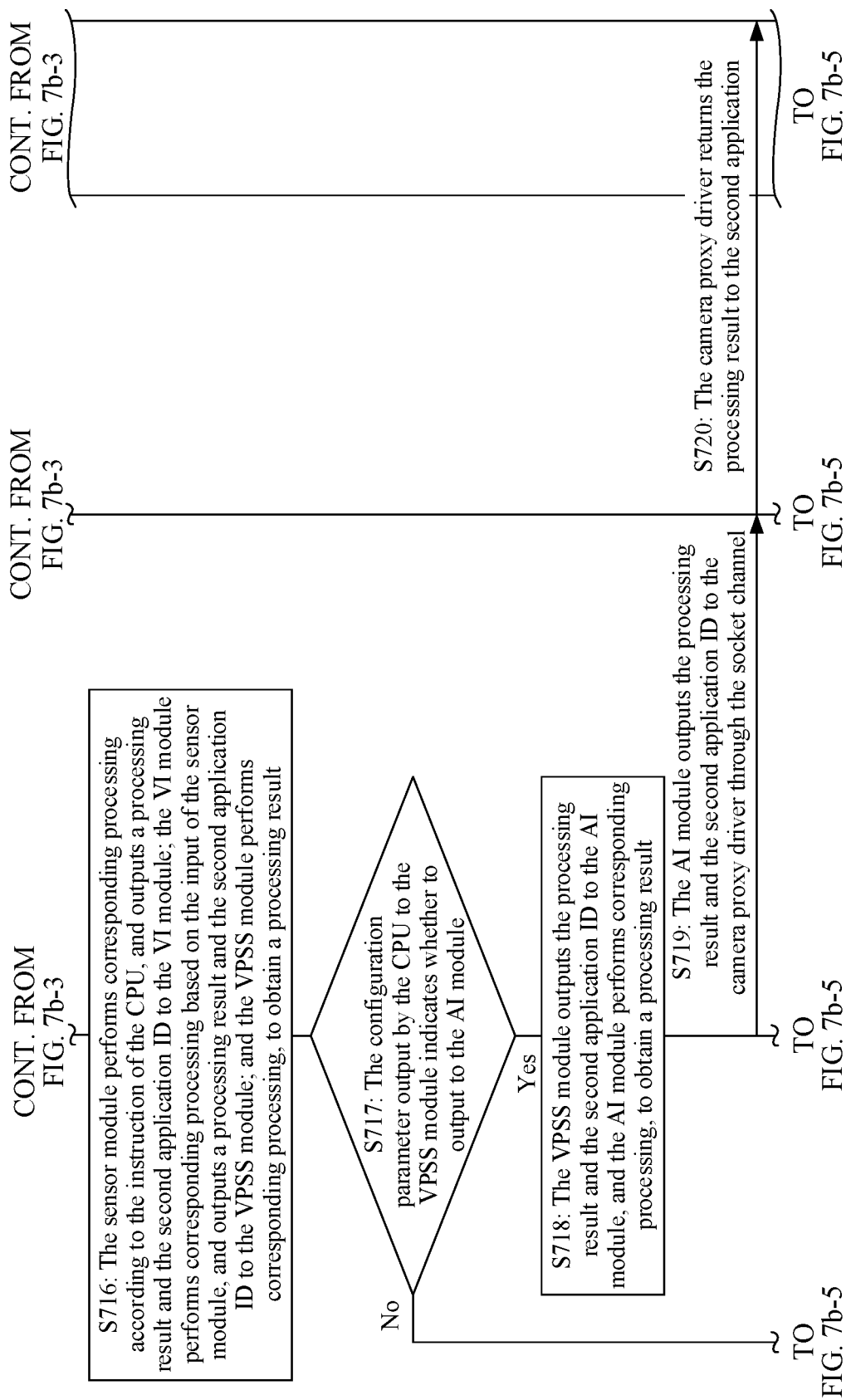

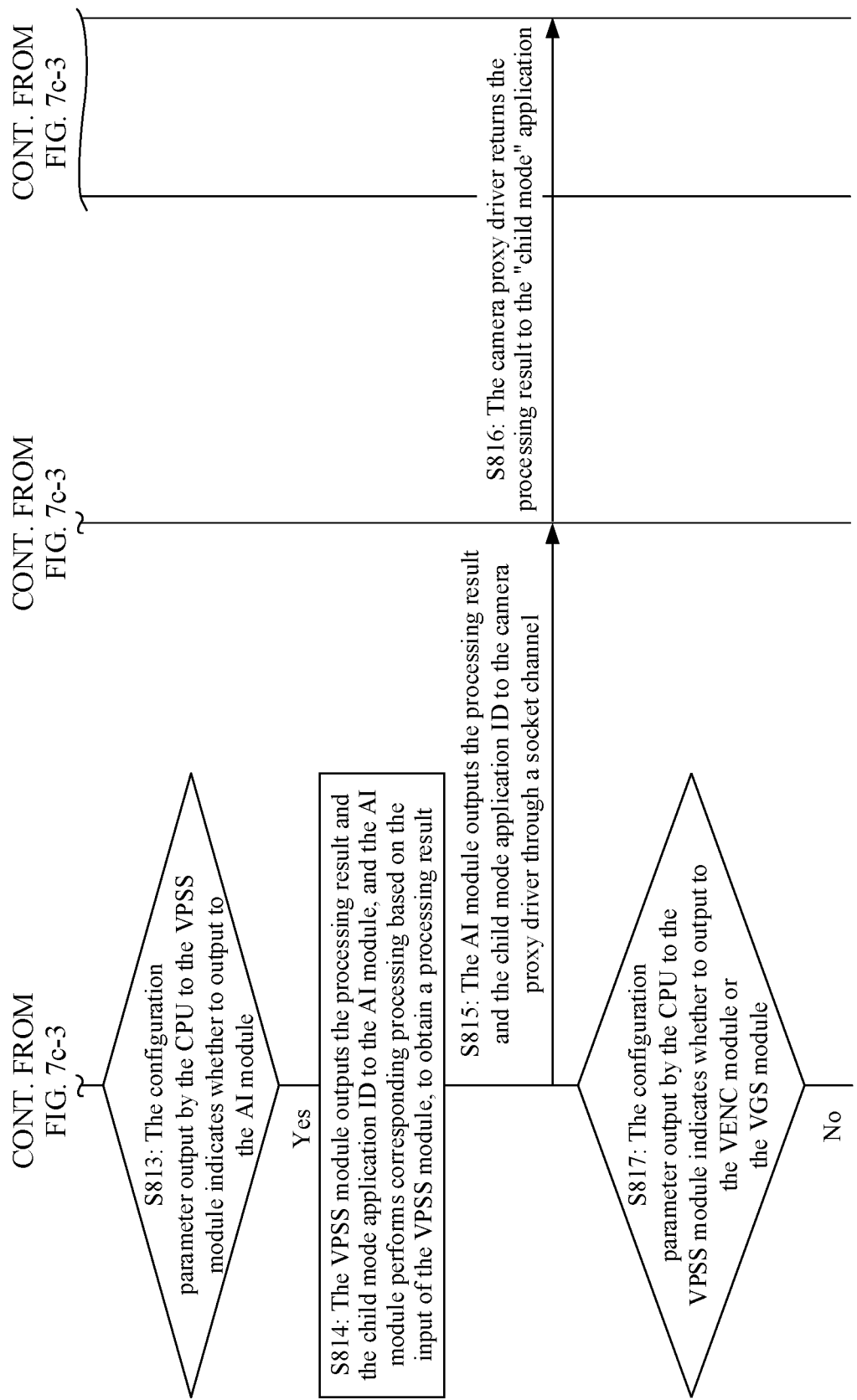

CAMERA USE METHOD, ELECTRONIC DEVICE, AND CAMERA

CROSS-REFERENCE TO RELATED APPLICATIONS

This application is a national stage of International Application No. PCT/CN2021/081092, filed on Mar. 16, 2021, which claims priority to Chinese Patent Application No. 202010618161.2, filed on Jun. 30, 2020. Both of the aforementioned applications are hereby incorporated by reference in their entireties.

TECHNICAL FIELD

This application relates to the field of electronic device control, and in particular, to a camera use method, an electronic device, and a camera.

BACKGROUND

A camera of an electronic device can be remotely used by another electronic device, and implement a corresponding function. For example, after a remote housekeeping application is installed in both a mobile device and a large screen, a camera of the large screen can be remotely used by the mobile device by using the remote housekeeping application, to implement a remote housekeeping function. However, in the foregoing remote use process, the camera of the electronic device can be exclusively used by only one application. If another application needs to use the camera in this case, the another application can use the camera only after the current application exits. Therefore, how to use a camera by a plurality of applications becomes an issue to be resolved.

SUMMARY

To resolve the foregoing technical issue, this application provides a camera use method, an electronic device, and a camera. In the method, in a remote use process, a camera of an electronic device can be used by at least two applications, or even the camera can be used simultaneously by at least two applications. This improves use efficiency and improves user experience.

According to a first aspect, a camera is provided. The camera is connected to an electronic device through a first interface, where the camera includes one or more processors, a memory, and one or more computer programs. The one or more computer programs are stored in the memory, and when the computer program is executed by the one or more processors, the camera is enabled to perform the following steps: receiving a first message including an application ID or an application sub-function ID; in response to the first message, outputting a first processing result of a first message type along a first path through the first interface when it is detected that a type corresponding to the application ID or the application sub-function ID is a first type, or outputting a second processing result of a second message type along a second path or a third path through the first interface when it is detected that a type corresponding to the application ID or the application sub-function ID is a second type; receiving a second message including another application ID or another application sub-function ID; and in response to the second message, outputting a third processing result of the first message type along the first path through the first interface when it is detected that a type corresponding to the another application ID or the another application sub-function ID is the first type. Another application sub-function may be another sub-function of one application, or may be a sub-function of another application. In this way, the camera is connected to the electronic device through one interface, and the camera can implement a dynamic use method that is based on an application type, to satisfy use requests of at least two applications, at least one application plus one application sub-function, and at least two application sub-functions. An exclusive use issue of the camera is resolved without changing an internal architecture of the camera. This improves use efficiency and improves user experience.

According to the first aspect, the camera further performs the following step: in response to the second message, outputting a fourth processing result of the second message type along the second path or the third path through the first interface when it is detected that the type corresponding to the another application ID or the another application sub-function ID is the second type. In this way, a processing manner for the message of the second type when another application or another application sub-function uses the camera is provided.

According to any one of the first aspect or the implementations of the first aspect, the camera further performs the following step: in response to the first message, outputting the first processing result of the first message type along the first path through the first interface and outputting the second processing result of the second message type along the second path or the third path through the first interface when it is detected that the type corresponding to the application ID or the application sub-function ID is a third type, where the third type is the first type+the second type; and in response to the second message, outputting the third processing result of the first message type along the first path through the first interface and outputting the fourth processing result of the second message type along the second path or the third path through the first interface when it is detected that the type corresponding to the another application ID or the another application sub-function ID is the third type, where the third type is the first type+the second type. In this way, a processing manner for the message of the third type when one application or one application sub-function uses the camera and a processing manner for the message of the third type when another application or another application sub-function uses the camera are provided.

According to any one of the first aspect or the implementations of the first aspect, the camera further includes one or more sensor modules, a video input module, a video processing subsystem module, an artificial intelligence module, a video encoding module, and a video graphics system module. The sensor module is configured to collect an image, and output the collected image to the video input module. The video input module is configured to preprocess the image collected by the sensor module. The video processing subsystem module is configured to perform noise reduction processing on an image obtained through preprocessing by the video input module. The artificial intelligence module is configured to perform artificial intelligence recognition on an image obtained through processing by the video processing subsystem module, and output an artificial intelligence event of the first message type through the first interface. The video graphics system module is configured to perform zoom processing on the image obtained through processing by the video processing subsystem module, and output an image obtained through zoom processing to the video encoding module. The video encoding module is configured to encode the image obtained through processing by the video processing subsystem module or the image obtained through zoom processing by the video graphics system module to generate a video stream, and output the video stream of the second message type through the first interface. In this way, a specific architecture of the camera is provided.

According to any one of the first aspect or the implementations of the first aspect, the first path includes the sensor module, the video input module, the video processing subsystem module, and the artificial intelligence module, the second path includes the sensor module, the video input module, the video processing subsystem module, the video graphics system module, and the video encoding module, and the third path includes the sensor module, the video input module, the video processing subsystem module, and the video encoding module. In this way, different paths are provided based on the specific architecture of the camera.

According to any one of the first aspect or the implementations of the first aspect, the first type is an artificial intelligence type, the second type is a video stream type, and the third type is the artificial intelligence type+the video stream type; the first message type is a socket message type, and the second message type is a UVC message type; and the first interface is a USB interface. In this way, specific types, specific message types, and a specific interface are provided.

According to a second aspect, a camera is provided. The camera is connected to an electronic device through a first interface and a second interface, where the camera includes one or more processors, a memory, and one or more computer programs. The one or more computer programs are stored in the memory, and when the computer program is executed by the one or more processors, the camera is enabled to perform the following steps: receiving a first message including an application ID or an application sub-function ID; in response to the first message, outputting a first processing result of a first message type along a first path through the first interface when it is detected that a type corresponding to the application ID or the application sub-function ID is a first type, or outputting a second processing result of a second message type along a second path or a third path through the second interface when it is detected that a type corresponding to the application ID or the application sub-function ID is a second type; receiving a second message including another application ID or another application sub-function ID; and in response to the second message, outputting a third processing result of the first message type along the first path through the first interface when it is detected that a type corresponding to the another application ID or the another application sub-function ID is the first type. Another application sub-function may be another sub-function of one application, or may be a sub-function of another application. In this way, the camera is connected to the electronic device through two interfaces, and the camera can implement a dynamic use method that is based on an application type, to satisfy use requests of at least two applications, at least one application plus one application sub-function, and at least two application sub-functions. An exclusive use issue of the camera is resolved without changing an internal architecture of the camera. This improves use efficiency and improves user experience.

According to the second aspect, the camera further performs the following step: in response to the second message, outputting a fourth processing result of the second message type along the second path or the third path through the second interface when it is detected that the type corresponding to the another application ID or the another application sub-function ID is the second type. In this way, a processing manner for the message of the second type when another application or another application sub-function uses the camera is provided.

According to any one of the second aspect or the implementations of the second aspect, the camera further performs the following step: in response to the first message, outputting the first processing result of the first message type along the first path through the first interface and outputting the second processing result of the second message type along the second path or the third path through the second interface when it is detected that the type corresponding to the application ID or the application sub-function ID is a third type, where the third type is the first type+the second type; and in response to the second message, outputting the third processing result of the first message type along the first path through the first interface and outputting the fourth processing result of the second message type along the second path or the third path through the second interface when it is detected that the type corresponding to the another application ID or the another application sub-function ID is the third type, where the third type is the first type+the second type. In this way, a processing manner for the message of the third type when one application or one application sub-function uses the camera and a processing manner for the message of the third type when another application or another application sub-function uses the camera are provided.

According to any one of the second aspect or the implementations of the second aspect, the camera further includes one or more sensor modules, a video input module, a video processing subsystem module, an artificial intelligence module, a video encoding module, and a video graphics system module. The sensor module is configured to collect an image, and output the collected image to the video input module. The video input module is configured to preprocess the image collected by the sensor module. The video processing subsystem module is configured to perform noise reduction processing on an image obtained through preprocessing by the video input module. The artificial intelligence module is configured to perform artificial intelligence recognition on an image obtained through processing by the video processing subsystem module, and output an artificial intelligence event of the first message type through the first interface. The video graphics system module is configured to perform zoom processing on the image obtained through processing by the video processing subsystem module, and output an image obtained through zoom processing to the video encoding module. The video encoding module is configured to encode the image obtained through processing by the video processing subsystem module or the image obtained through zoom processing by the video graphics system module to generate a video stream, and output the video stream of the second message type through the second interface. In this way, a specific architecture of the camera is provided.

According to any one of the second aspect or the implementations of the second aspect, the first path includes the sensor module, the video input module, the video processing subsystem module, and the artificial intelligence module, the second path includes the sensor module, the video input module, the video processing subsystem module, the video graphics system module, and the video encoding module, and the third path includes the sensor module, the video input module, the video processing subsystem module, and the video encoding module. In this way, different paths are provided based on the specific architecture of the camera.

According to any one of the second aspect or the implementations of the second aspect, the first type is an artificial intelligence type, the second type is a video stream type, and the third type is the artificial intelligence type+the video stream type; the first message type is a socket message type, and the second message type is a UVC message type; and at least one of the first interface and the second interface is a USB interface. In this way, specific types, specific message types, and specific interfaces are provided.

According to a third aspect, a camera use method is provided. The method is applied to a camera, and the camera is connected to an electronic device through a first interface. The method includes: receiving a first message including an application ID or an application sub-function ID; in response to the first message, outputting a first processing result of a first message type along a first path through the first interface when it is detected that a type corresponding to the application ID or the application sub-function ID is a first type, or outputting a second processing result of a second message type along a second path or a third path through the first interface when it is detected that a type corresponding to the application ID or the application sub-function ID is a second type; receiving a second message including another application ID or another application sub-function ID; and in response to the second message, outputting a third processing result of the first message type along the first path through the first interface when it is detected that a type corresponding to the another application ID or the another application sub-function ID is the first type.

According to the third aspect, the method further includes: in response to the second message, outputting a fourth processing result of the second message type along the second path or the third path through the first interface when it is detected that the type corresponding to the another application ID or the another application sub-function ID is the second type.

According to any one of the third aspect or the implementations of the third aspect, the method further includes: in response to the first message, outputting the first processing result of the first message type along the first path through the first interface and outputting the second processing result of the second message type along the second path or the third path through the first interface when it is detected that the type corresponding to the application ID or the application sub-function ID is a third type, where the third type is the first type+the second type; and in response to the second message, outputting the third processing result of the first message type along the first path through the first interface and outputting the fourth processing result of the second message type along the second path or the third path through the first interface when it is detected that the type corresponding to the another application ID or the another application sub-function ID is the third type, where the third type is the first type+the second type.

According to any one of the third aspect or the implementations of the third aspect, the camera includes one or more sensor modules, a video input module, a video processing subsystem module, an artificial intelligence module, a video encoding module, and a video graphics system module. The sensor module is configured to collect an image, and output the collected image to the video input module. The video input module is configured to preprocess the image collected by the sensor module. The video processing subsystem module is configured to perform noise reduction processing on an image obtained through preprocessing by the video input module. The artificial intelligence module is configured to perform artificial intelligence recognition on an image obtained through processing by the video processing subsystem module, and output an artificial intelligence event of the first message type through the first interface. The video graphics system module is configured to perform zoom processing on the image obtained through processing by the video processing subsystem module, and output an image obtained through zoom processing to the video encoding module. The video encoding module is configured to encode the image obtained through processing by the video processing subsystem module or the image obtained through zoom processing by the video graphics system module to generate a video stream, and output the video stream of the second message type through the first interface.

According to any one of the third aspect or the implementations of the third aspect, the first path includes the sensor module, the video input module, the video processing subsystem module, and the artificial intelligence module, the second path includes the sensor module, the video input module, the video processing subsystem module, the video graphics system module, and the video encoding module, and the third path includes the sensor module, the video input module, the video processing subsystem module, and the video encoding module.

According to any one of the third aspect or the implementations of the third aspect, the first type is an artificial intelligence type, the second type is a video stream type, and the third type is the artificial intelligence type+the video stream type; the first message type is a socket message type, and the second message type is a UVC message type; and the first interface is a USB interface.

The third aspect and any one of the implementations of the third aspect are respectively corresponding to the first aspect and any one of the implementations of the first aspect. For technical effects corresponding to the third aspect and any one of the implementations of the third aspect, refer to the technical effects corresponding to the first aspect and any one of the implementations of the first aspect. Details are not described herein again.

According to a fourth aspect, a camera use method is provided. The method is applied to a camera, and the camera is connected to an electronic device through a first interface and a second interface. The method includes: receiving a first message including an application ID or an application sub-function ID; in response to the first message, outputting a first processing result of a first message type along a first path through the first interface when it is detected that a type corresponding to the application ID or the application sub-function ID is a first type, or outputting a second processing result of a second message type along a second path or a third path through the second interface when it is detected that a type corresponding to the application ID or the application sub-function ID is a second type; receiving a second message including another application ID or another application sub-function ID; and in response to the second message, outputting a third processing result of the first message type along the first path through the first interface when it is detected that a type corresponding to the another application ID or the another application sub-function ID is the first type.

According to the fourth aspect, the method further includes: in response to the second message, outputting a fourth processing result of the second message type along the second path or the third path through the second interface when it is detected that the type corresponding to the another application ID or the another application sub-function ID is the second type.

According to any one of the fourth aspect or the implementations of the fourth aspect, the method further includes: in response to the first message, outputting the first processing result of the first message type along the first path through the first interface and outputting the second processing result of the second message type along the second path or the third path through the second interface when it is detected that the type corresponding to the application ID or the application sub-function ID is a third type, where the third type is the first type+the second type; and in response to the second message, outputting the third processing result of the first message type along the first path through the first interface and outputting the fourth processing result of the second message type along the second path or the third path through the second interface when it is detected that the type corresponding to the another application ID or the another application sub-function ID is the third type, where the third type is the first type+the second type.

According to any one of the fourth aspect or the implementations of the fourth aspect, the camera includes one or more sensor modules, a video input module, a video processing subsystem module, an artificial intelligence module, a video encoding module, and a video graphics system module. The sensor module is configured to collect an image, and output the collected image to the video input module. The video input module is configured to preprocess the image collected by the sensor module. The video processing subsystem module is configured to perform noise reduction processing on an image obtained through preprocessing by the video input module. The artificial intelligence module is configured to perform artificial intelligence recognition on an image obtained through processing by the video processing subsystem module, and output an artificial intelligence event of the first message type through the first interface. The video graphics system module is configured to perform zoom processing on the image obtained through processing by the video processing subsystem module, and output an image obtained through zoom processing to the video encoding module. The video encoding module is configured to encode the image obtained through processing by the video processing subsystem module or the image obtained through zoom processing by the video graphics system module to generate a video stream, and output the video stream of the second message type through the second interface.

According to any one of the fourth aspect or the implementations of the fourth aspect, the first path includes the sensor module, the video input module, the video processing subsystem module, and the artificial intelligence module, the second path includes the sensor module, the video input module, the video processing subsystem module, the video graphics system module, and the video encoding module, and the third path includes the sensor module, the video input module, the video processing subsystem module, and the video encoding module.

According to any one of the fourth aspect or the implementations of the fourth aspect, the first type is an artificial intelligence type, the second type is a video stream type, and the third type is the artificial intelligence type+the video stream type; the first message type is a socket message type, and the second message type is a UVC message type; and at least one of the first interface and the second interface is a USB interface.

The fourth aspect and any one of the implementations of the fourth aspect are respectively corresponding to the second aspect and any one of the implementations of the second aspect. For technical effects corresponding to the fourth aspect and any one of the implementations of the fourth aspect, refer to the technical effects corresponding to the second aspect and any one of the implementations of the second aspect. Details are not described herein again.

According to a fifth aspect, an electronic device is provided. The electronic device is connected to a camera through a first interface, where the electronic device includes one or more processors, a memory, and one or more computer programs. The one or more computer programs are stored in the memory, and when the computer program is executed by the one or more processors, the electronic device is enabled to perform the following steps: when detecting that an application associated with the camera is started or when detecting that an application sub-function of an application is started, sending a first message including an application ID or an application sub-function ID to the camera, where the application ID corresponds to the application or the application sub-function ID corresponds to the application sub-function; receiving a first processing result of a first message type through the first interface and/or receiving a second processing result of a second message type through the first interface; when detecting that another application associated with the camera is started or when detecting that another application sub-function is enabled, sending a second message including another application ID or another application sub-function ID to the camera, where the another application ID corresponds to the another application or the another application sub-function ID corresponds to the another application sub-function; and receiving a third processing result of the first message type through the first interface and/or receiving a fourth processing result of the second message type through the first interface. In this way, the electronic device is connected to the camera through one interface, so that the electronic device cooperates with the camera, to satisfy use requests of at least two applications, at least one application plus one application sub-function, and at least two application sub-functions. An exclusive use issue of the camera is resolved without changing an internal architecture of the camera. This improves use efficiency and improves user experience.

According to the fifth aspect, the first message type is a socket message type, and the second message type is a UVC message type; and the first interface is a USB interface. In this way, specific message types and a specific interface are provided.

According to a sixth aspect, an electronic device is provided. The electronic device is connected to a camera through a first interface and a second interface, where the electronic device includes one or more processors, a memory, and one or more computer programs. The one or more computer programs are stored in the memory, and when the computer program is executed by the one or more processors, the electronic device is enabled to perform the following steps: when detecting that an application associated with the camera is started or when detecting that an application sub-function of an application is started, sending a first message including an application ID or an application sub-function ID to the camera, where the application ID corresponds to the application or the application sub-function ID corresponds to the application sub-function; receiving a first processing result of a first message type through the first interface and/or receiving a second processing result of a second message type through the second interface; when detecting that another application associated with the camera is started or when detecting that another application sub-function is enabled, sending a second message including another application ID or another application sub-function ID to the camera, where the another application ID corresponds to the another application or the another application sub-function ID corresponds to the another application sub-function; and receiving a third processing result of the first message type through the first interface and/or receiving a fourth processing result of the second message type through the second interface. In this way, the electronic device is connected to the camera through two interfaces, so that the electronic device cooperates with the camera, to satisfy use requests of at least two applications, at least one application plus one application sub-function, and at least two application sub-functions. An exclusive use issue of the camera is resolved without changing an internal architecture of the camera. This improves use efficiency and improves user experience.

According to the sixth aspect, the first message type is a socket message type, and the second message type is a UVC message type; and at least one of the first interface and the second interface is a USB interface. In this way, specific message types and specific interfaces are provided.

According to a seventh aspect, a camera use method is provided. The method is applied to an electronic device, and the electronic device is connected to a camera through a first interface. The method includes: when it is detected that an application associated with the camera is started or when it is detected that an application sub-function of an application is started, sending a first message including an application ID or an application sub-function ID to the camera, where the application ID corresponds to the application or the application sub-function ID corresponds to the application sub-function; receiving a first processing result of a first message type through the first interface and/or receiving a second processing result of a second message type through the first interface; when it is detected that another application associated with the camera is started or when it is detected that another application sub-function is enabled, sending a second message including another application ID or another application sub-function ID to the camera, where the another application ID corresponds to the another application or the another application sub-function ID corresponds to the another application sub-function; and receiving a third processing result of the first message type through the first interface and/or receiving a fourth processing result of the second message type through the first interface.

According to the seventh aspect, the first message type is a socket message type, and the second message type is a UVC message type; and the first interface is a USB interface.

The seventh aspect and any one of the implementations of the seventh aspect are respectively corresponding to the fifth aspect and any one of the implementations of the fifth aspect. For technical effects corresponding to the seventh aspect and any one of the implementations of the seventh aspect, refer to the technical effects corresponding to the fifth aspect and any one of the implementations of the fifth aspect. Details are not described herein again.

According to an eighth aspect, a camera use method is provided. The method is applied to an electronic device, and the electronic device is connected to a camera through a first interface and a second interface. The method includes: when it is detected that an application associated with the camera is started or when it is detected that an application sub-function of an application is started, sending a first message including an application ID or an application sub-function ID to the camera, where the application ID corresponds to the application or the application sub-function ID corresponds to the application sub-function; receiving a first processing result of a first message type through the first interface and/or receiving a second processing result of a second message type through the second interface; when it is detected that another application associated with the camera is started or when it is detected that another application sub-function is enabled, sending a second message including another application ID or another application sub-function ID to the camera, where the another application ID corresponds to the another application or the another application sub-function ID corresponds to the another application sub-function; and receiving a third processing result of the first message type through the first interface and/or receiving a fourth processing result of the second message type through the second interface.

According to the eighth aspect, the first message type is a socket message type, and the second message type is a UVC message type; and at least one of the first interface and the second interface is a USB interface.

The eighth aspect and any one of the implementations of the eighth aspect are respectively corresponding to the sixth aspect and any one of the implementations of the sixth aspect. For technical effects corresponding to the eighth aspect and any one of the implementations of the eighth aspect, refer to the technical effects corresponding to the sixth aspect and any one of the implementations of the sixth aspect. Details are not described herein again.

According to a ninth aspect, a computer-readable storage medium is provided. The medium includes a computer program. When the computer program is run on a camera, the camera is enabled to perform the camera use method according to any one of the third aspect or the implementations of the third aspect, or any one of the fourth aspect or the implementations of the fourth aspect.

The ninth aspect and any one of the implementations of the ninth aspect are respectively corresponding to the third aspect, the fourth aspect, any one of the implementations of the third aspect, and any one of the implementations of the fourth aspect. For technical effects corresponding to the ninth aspect and any one of the implementations of the ninth aspect, refer to the technical effects corresponding to the third aspect, the fourth aspect, any one of the implementations of the third aspect, and any one of the implementations of the fourth aspect. Details are not described herein again.

According to a tenth aspect, a computer-readable storage medium is provided. The medium includes a computer program. When the computer program is run on an electronic device, the electronic device is enabled to perform the camera use method according to any one of the seventh aspect or the implementations of the seventh aspect, or any one of the eighth aspect or the implementations of the eighth aspect.

The tenth aspect and any one of the implementations of the tenth aspect are respectively corresponding to the seventh aspect, the eighth aspect, any one of the implementations of the seventh aspect, and any one of the implementations of the eighth aspect. For technical effects corresponding to the tenth aspect and any one of the implementations of the tenth aspect, refer to the technical effects corresponding to the seventh aspect, the eighth aspect, any one of the implementations of the seventh aspect, and any one of the implementations of the eighth aspect. Details are not described herein again.

According to an eleventh aspect, a computer system is provided. The computer system includes the electronic device according to the fifth aspect, the sixth aspect, any one of the implementations of the fifth aspect, and any one of the implementations of the sixth aspect, and the camera according to the first aspect, the second aspect, any one of the implementations of the first aspect, and any one of the implementations of the second aspect, so that the electronic device performs the method according to the seventh aspect, the eighth aspect, any one of the implementations of the seventh aspect, and any one of the implementations of the eighth aspect, and the camera performs the method according to the third aspect, the fourth aspect, any one of the implementations of the third aspect, and any one of the implementations of the fourth aspect.

The eleventh aspect and any one of the implementations of the eleventh aspect are respectively corresponding to a combination of the fifth aspect, the sixth aspect, any one of the implementations of the fifth aspect, and any one of the implementations of the sixth aspect; a combination of the first aspect, the second aspect, any one of the implementations of the first aspect, and any one of the implementations of the second aspect; a combination of the seventh aspect, the eighth aspect, any one of the implementations of the seventh aspect, and any one of the implementations of the eighth aspect; and a combination of the third aspect, the fourth aspect, any one of the implementations of the third aspect, and any one of the implementations of the fourth aspect. For technical effects corresponding to the eleventh aspect and any one of the implementations of the eleventh aspect, refer to the technical effects corresponding to the fifth aspect, the sixth aspect, any one of the implementations of the fifth aspect, and any one of the implementations of the sixth aspect; the technical effects corresponding to the first aspect, the second aspect, any one of the implementations of the first aspect, and any one of the implementations of the second aspect; the technical effects corresponding to the seventh aspect, the eighth aspect, any one of the implementations of the seventh aspect, and any one of the implementations of the eighth aspect; and the technical effects corresponding to the third aspect, the fourth aspect, any one of the implementations of the third aspect, and any one of the implementations of the fourth aspect. Details are not described herein again.

In this application, use of the camera by more applications and/or application sub-functions is similar to the foregoing use manners. Details are not described herein again.

BRIEF DESCRIPTION OF DRAWINGS

To describe the technical solutions in embodiments of this application more clearly, the following briefly describes the accompanying drawings for describing embodiments of this application. It is clear that the accompanying drawings in the following description show merely some embodiments of this application, and a person of ordinary skill in the art may still derive other drawings from these accompanying drawings without creative efforts.

FIG. 5*a*-1 to FIG. 5*d*-4 are schematic flowcharts of camera use methods according to Embodiment 1 of this application;

FIG. 7*a*-1 to FIG. 7*d*-4 are schematic flowcharts of camera use methods according to Embodiment 2 of this application.

DESCRIPTION OF EMBODIMENTS

The following clearly describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object and the second target object are used to distinguish different target objects, but not to describe a particular order of the target objects.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In descriptions of embodiments of this application, unless otherwise specified, "a plurality of" means more than two. The "more than two" includes two.

In descriptions of embodiments of this application, a first application and a second application each may be any application that is in an electronic device and that needs to use a camera. Optionally, the first application and the second application may be installed before delivery of the electronic device, or may be downloaded by a user during use of the electronic device. This is not limited in this application. The first application and the second application are merely used as an example, but are not used to limit a specific quantity of applications.

Figure 1:
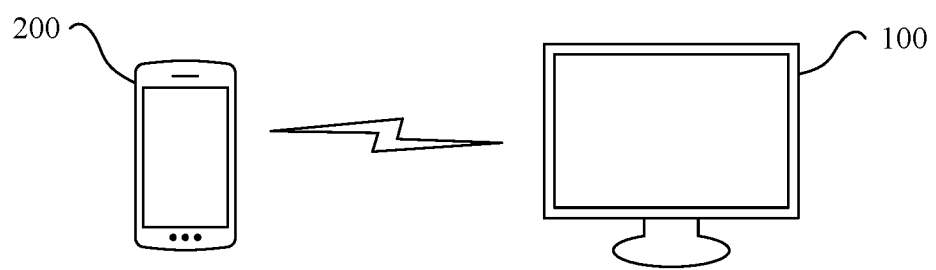
FIG. 1 is a schematic diagram of an application scenario according to an embodiment of this application.

Before the technical solutions in embodiments of this application are described, an application scenario in embodiments of this application is first described with reference to the accompanying drawings. FIG. 1 is a schematic diagram of an application scenario according to an embodiment of this application. As shown in FIG. 1, a first electronic device 100 can be used by a second electronic device 200. The first electronic device 100 has a camera (not shown), or the first electronic device 100 is connected to a camera through various interfaces such as a universal serial bus (universal serial bus, USB) interface. The second electronic device 200 remotely uses and controls the camera of the first electronic device 100. Specifically, a same application, for example, a "remote housekeeping" application, is installed in both the first electronic device 100 and the second electronic device 200. The second electronic device 200 first starts the "remote housekeeping" application of the second electronic device 200, and then sends a use request to the first electronic device 100 by using the "remote housekeeping" application of the second electronic device 200. After receiving the request, the first electronic device 100 starts the "remote housekeeping" application of the first electronic device 100. Both the first electronic device 100 and the second electronic device 200 include but are not limited to various computing devices such as a large screen, a laptop computer, a desktop computer, a palmtop computer (for example, a tablet computer or a smartphone), and a smart wearable device (for example, a smart band, a smartwatch, smart glasses, or a smart ring). For example, the first electronic device 100 is a large screen configured with a camera, and the second electronic device 200 is a smartphone. Alternatively, the second electronic device 200 may or may not be configured with a camera. In addition, although there is only one first electronic device 100 and only one second electronic device 200 in FIG. 1, there may be a plurality of first electronic devices 100 and/or a plurality of second electronic devices 200.

Figure 2:
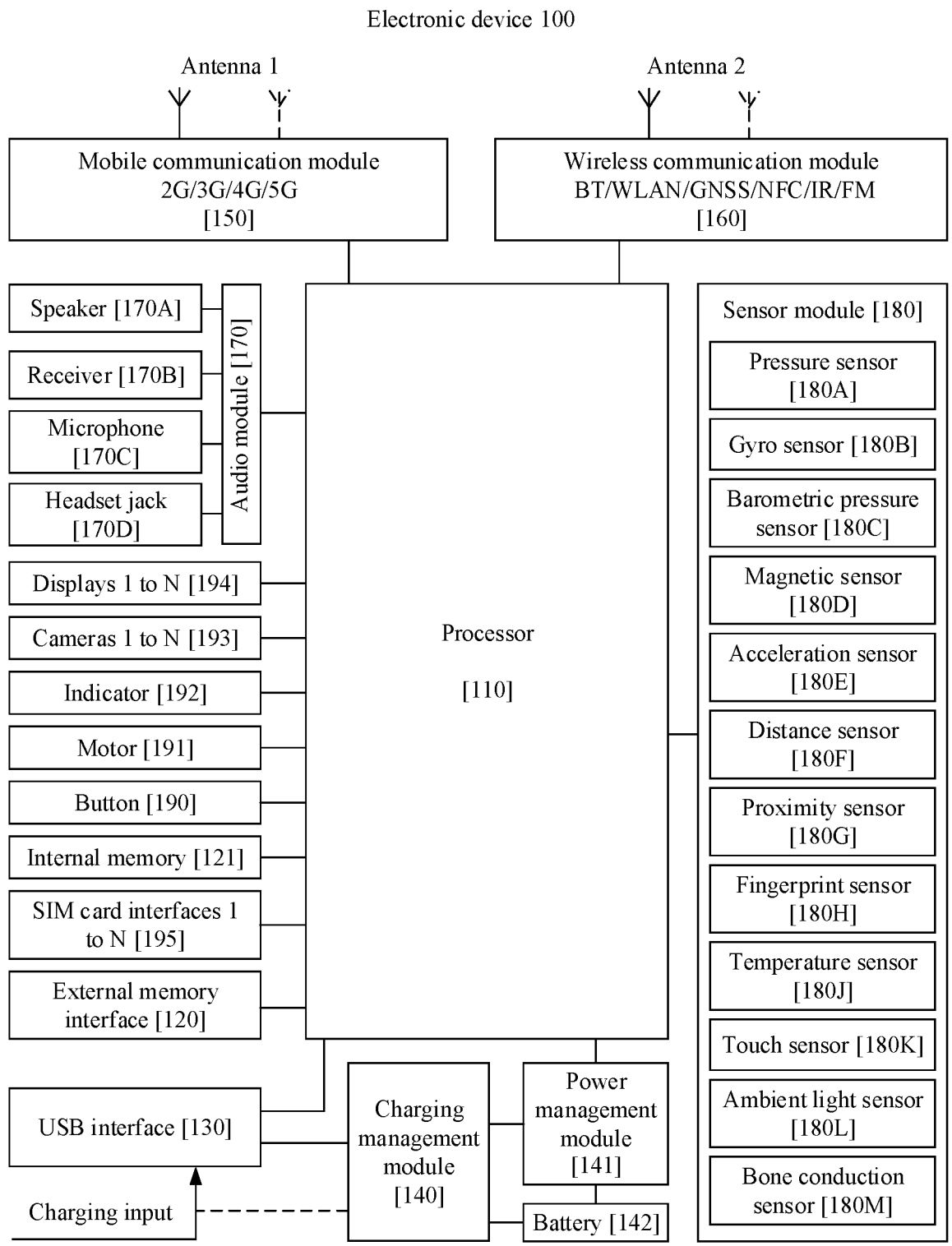
FIG. 2 is a schematic diagram of a hardware structure of an electronic device according to an embodiment of this application.

FIG. 2 is a schematic diagram of a structure of an electronic device according to an embodiment of this application. Although the first electronic device 100 in FIG. 1 is used as an example for describing the structure of the electronic device in FIG. 2, a person skilled in the art understands that the structure of the electronic device in FIG. 2 is also applicable to the second electronic device 200 in FIG. 1. As shown in FIG. 2, the electronic device 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a key 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

The USB interface 130 is an interface complying with the USB standard specification, and may be specifically a mini USB interface, a micro USB interface, a USB type C interface, or the like, and can support various USB specifications including USB 1.0, USB 2.0, USB 3.0, USB 4.0, or a higher USB standard specification. For example, the USB interface 130 may include one or more USB interfaces.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The power management module 141 is configured to connect to the battery 142, the charging management module 140, and the processor 110. A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that includes 2G, 3G, 4G, 5G, and the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same component as at least some modules of the processor 110.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time division-synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a photographing function by using the ISP, the camera 193, the video codec, the GPU, the display 194, the application processor, and the like.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The electronic device 100 may implement an audio function, for example, music playing or recording, by using the audio module 170, the speaker 170A, the receiver 170B, the microphone 170C, the headset jack 170D, the application processor, and the like.

Figure 3:
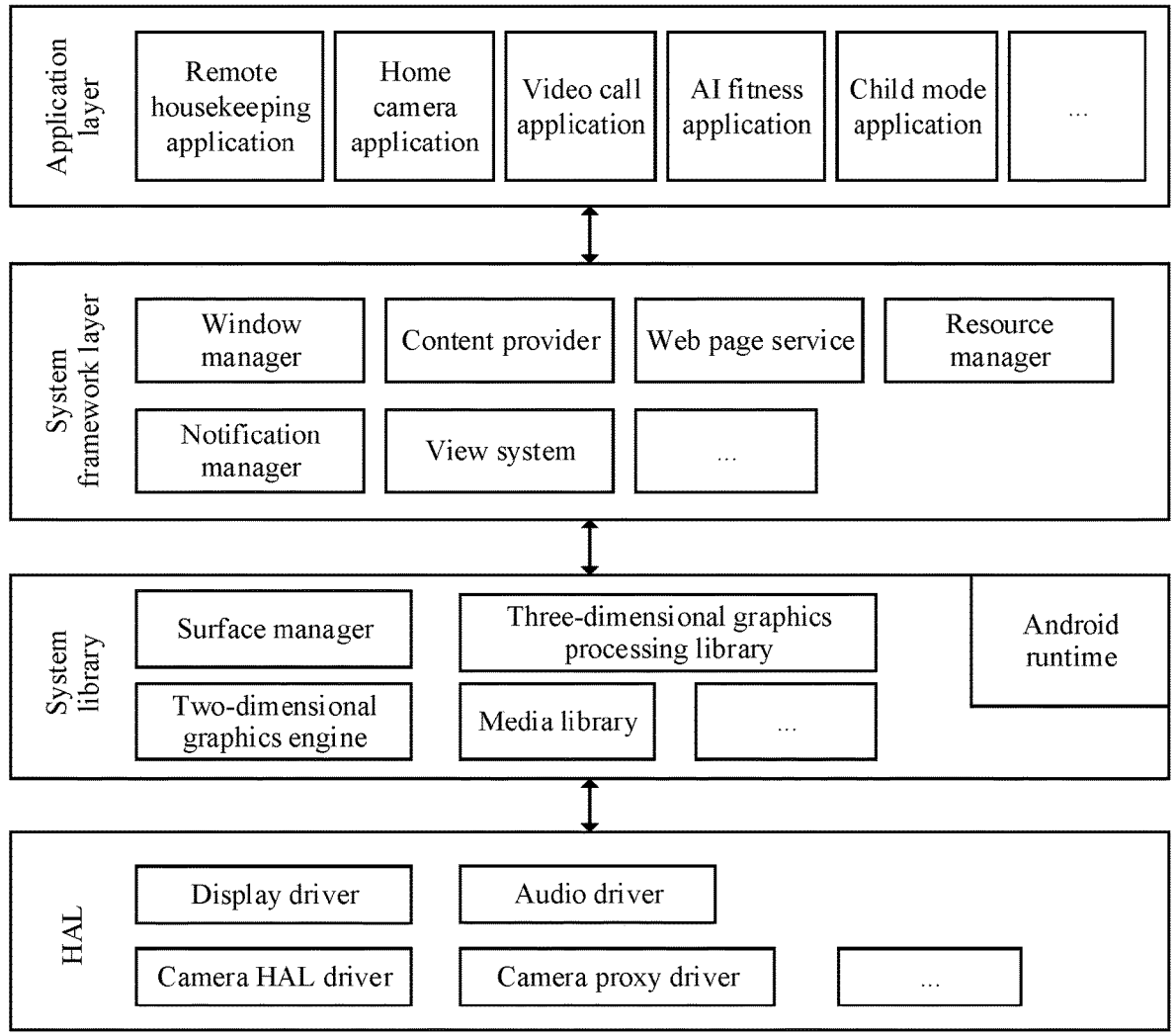
FIG. 3 is a schematic diagram of a software structure of an electronic device according to an embodiment of this application.

FIG. 3 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers from top to bottom: an application layer, a system framework layer, a system library and Android runtime layer, and a hardware abstraction layer. The application layer may include programs such as a remote housekeeping application, a home camera application, a video call application, an artificial intelligence (Artificial Intelligence, AI) fitness application, and a child mode application. The remote housekeeping application is used by a device other than the electronic device 100 to open a camera of the electronic device 100 in a remote use manner, and obtain a video and/or an image shot by the camera. It should be noted that the applications included in the application layer shown in FIG. 3 are merely an example for description. This is not limited in this application. It can be understood that the applications included in the application layer do not constitute any specific limitation on the electronic device 100. In some other embodiments of this application, the electronic device 100 may include more or fewer applications than the applications included in the application layer shown in FIG. 3, or the electronic device 100 may include completely different applications.

The system framework layer provides an application programming interface (Application Programming Interface, API) and a programming framework for an application at the application layer, and includes various components and services to support Android development by a developer. The system framework layer includes some predefined functions. As shown in FIG. 3, the system framework layer may include a view system, a window manager, a resource manager, a content provider, and the like. The view system includes visual controls, such as a control for displaying a text and a control for displaying an image. The view system may be used to construct an application. A display interface may include one or more views. The window manager is used to manage a window program. The window manager may obtain a size of the display, determine whether there is a status bar, perform screen locking, take a screenshot, and the like. The resource manager provides, for an application, various resources such as a localized character string, an icon, an image, a layout file, and a video file. The content provider is used to store and obtain data, and enable the data to be accessible by an application. The data may include a video, an image, audio, and the like.

The system library and runtime layer includes a system library and an Android runtime (Android Runtime). The system library may include a plurality of function modules, such as a browser kernel, a 3D graphics library (for example, OpenGL ES), and a font library. The browser kernel is responsible for interpreting a web page syntax (for example, an application HTML based on a standard generalized markup language, and JavaScript) and rendering (displaying) a web page. The 3D graphics library is configured to implement three-dimensional graphics drawing, image rendering, composition, layer processing, and the like. The font library is configured to input different fonts. The Android runtime includes a core library and a virtual machine. The Android runtime is responsible for scheduling and management of the Android system. The kernel library includes two parts: a function that needs to be called in Java language, and a kernel library of Android. The application layer and the system framework layer run on the virtual machine. The virtual machine executes Java files at the application layer and the system framework layer as binary files. The virtual machine is used to perform functions such as object lifecycle management, stack management, thread management, security and exception management, and garbage collection.

It can be understood that components included in the system framework layer, and the system library and runtime layer that are shown in FIG. 3 do not constitute any specific limitation on the electronic device 100. In some other embodiments of this application, the electronic device 100 may include more or fewer components than those shown in the figure, some components may be combined, or some components may be split, or there may be a different component layout.

The hardware abstraction layer (Hardware Abstraction Layer, HAL) is a layer between hardware and software. The HAL includes a camera HAL driver, a camera proxy (camera Proxy) driver, a display driver, an audio driver, and the like. The foregoing drivers are merely an example. This is not limited in this application. The HAL is a foundation of an Android®™ system. An ultimate function of the Android®™ system is implemented by using the HAL.

For example, both the camera HAL driver and the camera proxy driver are used to abstract the camera, to hide specific channels of the camera, so that an application can access (or use) the camera. The camera HAL driver may communicate with the camera based on a universal serial bus video class (universal serial bus video class, UVC) protocol. The UVC protocol can also be understood as a UVC channel-based protocol. To be specific, the camera 400 establishes a UVC connection (communication connection) to the HAL through a UVC channel, and transmits, based on the UVC connection, a message that complies with the UVC protocol. The camera proxy driver may communicate with the camera based on a remote network driver interface specification (remote network driver interface specification, RNDIS) protocol. It should be noted that the RNDIS protocol can also be understood as a socket channel-based protocol. To be specific, the camera 400 establishes a socket connection (communication connection) to the HAL through a socket channel, and transmits, based on the socket connection, a message that complies with the RNDIS protocol.

Optionally, the UVC channel may be used to transmit a control instruction and a video stream. The socket channel may be used to transmit information such as an AI event and a log.

The camera of the electronic device 100 may be an external camera and/or a built-in camera. The external camera may be connected to the USB interface of the electronic device 100 through a USB cable. The built-in camera may be embedded in the electronic device 100. In the electronic device 100, the built-in camera is connected to the USB interface of the electronic device 100 through a USB cable.

Embodiment 1

Figure 4:
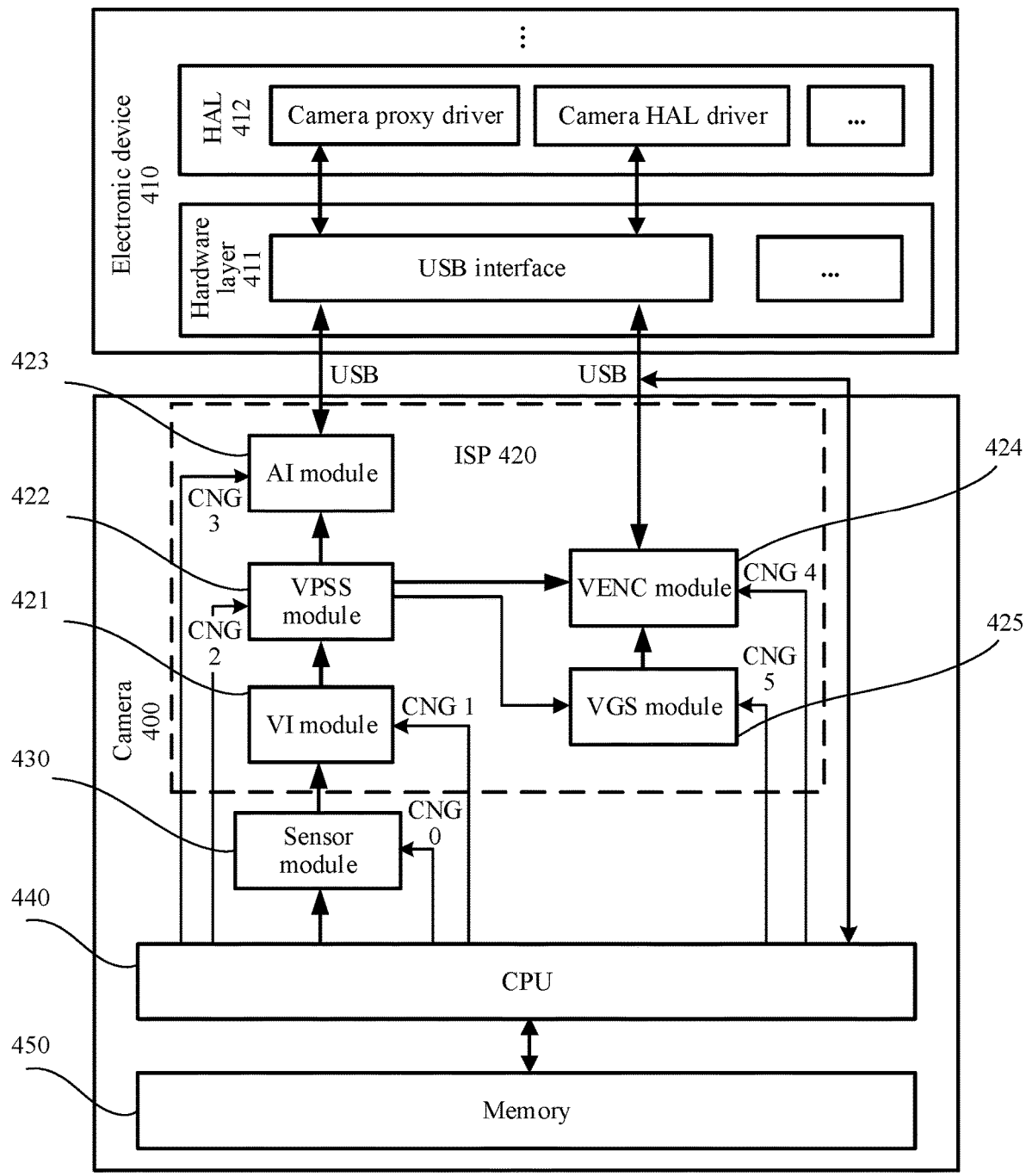
FIG. 4 is a schematic diagram of a structure in which a camera is connected to an electronic device according to Embodiment 1 of this application.

FIG. 4 is a schematic diagram of a structure in which a camera is connected to an electronic device according to Embodiment 1 of this application. As shown in FIG. 4, the camera 400 is connected to a USB interface of the electronic device 410 through a USB cable, and further is connected to the electronic device 410. It should be noted that a quantity of USB interfaces and distribution of the USB interfaces on one side of the electronic device 410 in FIG. 4 are merely an example, and do not limit the scope of this application. Other types of interfaces such as a UART and a USART may also be used for implementing a connection between the camera 400 and the electronic device 410. The foregoing interfaces (including the USB interface) may be located on one side of the electronic device 410, may be located on one side of the camera 400, or may be located on two sides of the electronic device 410 and the camera 400. There may be one, two, or more USB interfaces.

The USB interface in FIG. 4 is located on a hardware layer 411 on one side of the electronic device 410. A HAL 412 is above the hardware layer 411, and the HAL 412 includes at least a camera proxy driver and a camera HAL driver.

The camera proxy driver is a proxy program located between an Android application package (Android application package, APK) application and the camera, is located at an Android HAL layer, serves a standard HAL interface definition language (HAL interface definition language, HIDL), and is used to abstract the camera. The camera proxy driver hides hardware interface details of a specific camera component, and provides more lightweight and convenient camera access for the APK application.

The camera HAL driver is a proxy program between the APK application and the camera, is located at the Android HAL layer, provides a standard data structure and interface definition specification, and defines standard interfaces for system services of different camera hardware. Manufacturers of different camera hardware only need to implement corresponding interfaces. Device-related implementations are performed at the HAL layer and are provided in a form of a shared library (.so), so that the device can be used by an Android system.

In this embodiment of this application, the camera proxy driver and the camera HAL driver are used to receive, respectively through two streams, data that is input by an AI module 423 and a VENC module 424.

The camera 400 includes an ISP 420, a sensor module 430, a CPU 440, and a memory 450. The ISP 420 is configured to process an image and a video stream, and output a processed video stream and image through two streams. The CPU 440 is merely an example. Various microcontrollers, such as a micro control unit (Microcontroller Unit, MCU), or components that functions as a processor or a microcontroller may be alternative forms of the foregoing CPU.

The sensor module 430 is a photosensitive element of the camera 400, collects an optical signal, converts the collected optical signal into an electrical signal, and then transmits the electrical signal to the ISP 420 for processing. The ISP 420 converts the electrical signal into an image or a video stream.

The ISP 420 includes a video input (video input, VI) module 421, a video processing subsystem (video processing subsystem, VPSS) module 422, the AI module 423, the video encoding (video encoding, VENC) module 424, and a video graphics system (video graphics system, VGS) module 425.

The VI module 421 is configured to preprocess an image collected by the sensor module 430. The preprocessing includes noise reduction, color correction, shading (shading), and the like.

The VPSS module 422 is configured to perform 3D noise reduction processing on an image obtained through processing by the VI module 421, and the like. The 3D noise reduction processing performed by the VPSS module 422 is three-dimensional noise reduction performed on the image in time domain on a basis of the two-dimensional noise reduction performed by the VI module 421.

The AI module 423 is configured to perform AI recognition on an image, and report an AI event. For example, the AI module 423 may recognize a feature in the image to detect whether the feature conforms to a specific feature of the AI event; and if detecting that the specific feature exists in the image, determine that the corresponding AI event exists, and report the AI event. For example, it is assumed that a child is watching TV. The AI module 423 recognizes images obtained through processing by other modules (including the sensor module 430, the VI module 421, and the like), and detects a feature of the child. The AI module 423 may determine, based on the recognized feature of the child, that a child TV-watching event exists, and report the child TV-watching event to the electronic device 410. Specifically, after completing recognition detection on the AI event, the AI module 423 transmits an AI event recognition result to the camera proxy driver of the HAL 412 through a socket channel, and further sends the AI event recognition result to the electronic device side. AI events include an AI gestures, portrait tracking, child recognition, posture detection, and the like. The socket channel is a channel for transmitting data based on a TCP connection protocol. In this embodiment, the socket channel is a channel used by the camera to transmit the AI event recognition result to the USB interface on the electronic device side through the USB cable.

The VENC module 424 is configured to: encode an image to generate a video stream (also referred to as video data, video information, or the like), transmit the video stream to the camera HAL driver of the HAL 412 through a UVC channel, and further send the video stream to one side of the electronic device 410. The UVC channel is a channel used by the camera to transmit the video data to the USB interface on the electronic device side through the USB cable. Optionally, the VENC module 424 may perform encoding (also referred to as video encoding) on a plurality of images.

The VGS module 425 is configured to perform zoom processing on an image, and output an image obtained through zoom processing to the VENC module 424. The zoom processing is processing such as zooming in or zooming out performed on the image on a premise of ensuring that the image is undistorted.

The VI module 421, the VPSS module 422, the AI module 423, the VENC module 424, the VGS module 425, and the sensor module 430 are all connected to the CPU 440. Specifically, the CPU 440 may be connected to the sensor module 430, the VI module 421, the VPSS module 422, the AI module 423, the VENC module 424, and the VGS module 425 through a CNG 0, a CNG 1, a CNG 2, a CNG 3, a CNG 4, and a CNG 5, respectively. The CNG 0 to the CNG 5 are used by the CPU 440 to provide configuration parameters for the modules. The VPSS module 422 is used as an example. After receiving, through the CNG 2, the configuration parameter provided by the CPU 440 for the VPSS module 422, the VPSS module 422 may determine, based on the provided configuration parameter, specific one or more of the AI module 423, the VENC module 424, and the VGS module 425 to which a processing result of the VPSS module 422 is output. The AI module 423 is further used as an example. The AI module 423 may determine, based on the provided configuration parameter, whether to start. For example, if the configuration parameter received by the AI module 423 is "0", the AI module 423 determines not to start. For example, if the configuration parameter received by the AI module 423 is "1", the AI module 423 determines to start. The foregoing manner in which the configuration parameter indicates whether each module is to start is merely an example. This is not limited in this application. Alternatively, in other embodiments, the configuration parameter may only be used to indicate whether each module is to start, and a transmission object of a processing result may be determined by each started module based on a circuit connection between the modules. For example, the VPSS module 422 is connected (for example, electrically connected) to the AI module 423, the VGS module 425, and the VENC module 424. The CPU 440 may indicate, by using the configuration parameters, the AI module 423 to start and the VGS module 425 and the VENC module 424 not to start. The VPSS module 422 may transmit the processing result for the processing through three connection circuits based on a connection relationship (namely, an electrical connection, which can also be understood as an actual physical connection relationship). Actually, only the AI module 423 in a started state receives the processing result of the VPSS module 422, while the VGS module 425 and the VENC module 424 that are not started do not receive the processing result of the VPSS module 422.

A manner in which an application in the electronic device 410 uses the camera is used as an example for description.

For example, An application at an application layer of the electronic device 410 (such as a home camera application) may send an instruction to the camera HAL driver of the HAL 412 to use the camera 400. The camera HAL driver may send a UVC command (or message) to the camera 400 through the USB cable according to the instruction of the application to use the camera 400. The UVC command (or message) is a command (or message) sent through the UVC channel.

For example, the camera 400 starts the CPU 440 and some or all of the modules in the camera 400 (for example, the sensor module 430, the VI module 421, the VPSS module 422, the VGS module 425, and the VENC module 424) according to the instruction of the camera HAL driver. The CPU 440 and the modules perform respective functions. For example, after the sensor module 430 performs processing such as noise reduction, 3D noise reduction, and zooming on the collected image by using the VI module 421, the VPSS module 422, and the VGS module 425, the VENC module 424 encodes the obtained image to generate the video stream, and sends the UVC message to the camera HAL driver through the UVC channel. The UVC message carries the generated video stream.

For example, the camera HAL driver transmits the video stream to the application layer. The application at the application layer, for example, a home camera application, may process the video stream, for example, perform operations such as rendering and displaying on the video stream.

For example, if the application layer in the electronic device includes an AI application, for example, an AI fitness application, the electronic device may perform, by using the AI fitness application, AI processing on the video stream transmitted by the camera HAL driver, to obtain a corresponding AI event.

It should be noted that, that the modules are used as entities for implementing functions is described in this specification. Actually, the functions of the modules are implemented by a processing circuit in the ISP. This is not described again in the following.

In addition, there may be a plurality of USB interfaces in FIG. 4. The AI module 423 and the VENC module 424 may be connected respectively to two USB interfaces of the electronic device 410 through two USB cables.

It should be noted that both the UVC channel and the socket channel that is described below are logical channels, and reflect message types transmitted through a USB. It should also be noted that connection relationships between the modules of the camera and processing procedures of the modules shown in this embodiment and subsequent embodiments are merely examples. Actually, internal connections (including hardware connections and logical connections) of cameras produced by various manufacturers may be different. For example, an image obtained through processing by the VPSS module may be transmitted to the VENC module for encoding without passing through the VGS module. This is not limited in this application.

Optionally, the camera may further include a drive motor, configured to adjust an angle and/or a location of the camera, for example, raise or lower the camera.

Figures 1, 5A:
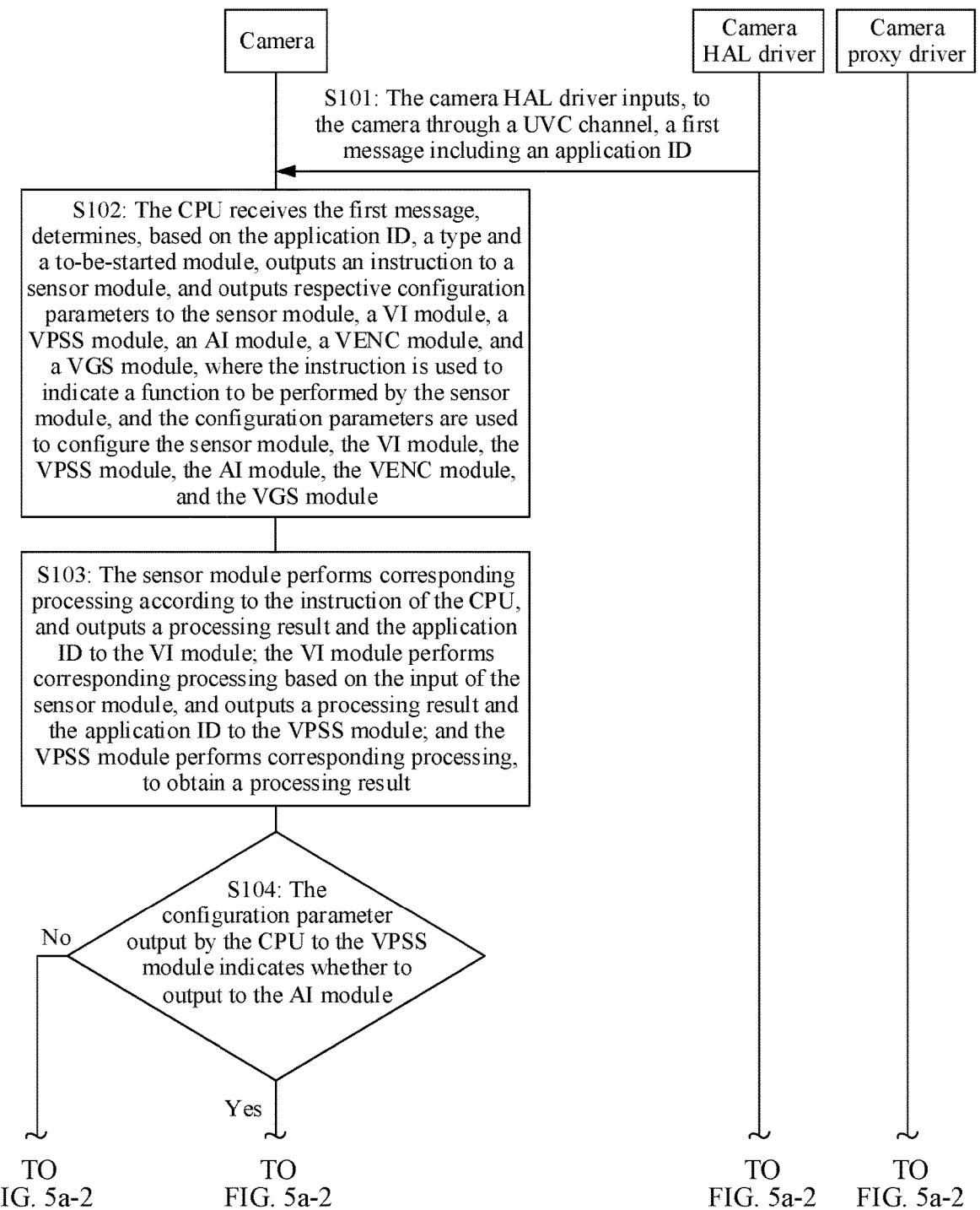
Figures 2, 5A:
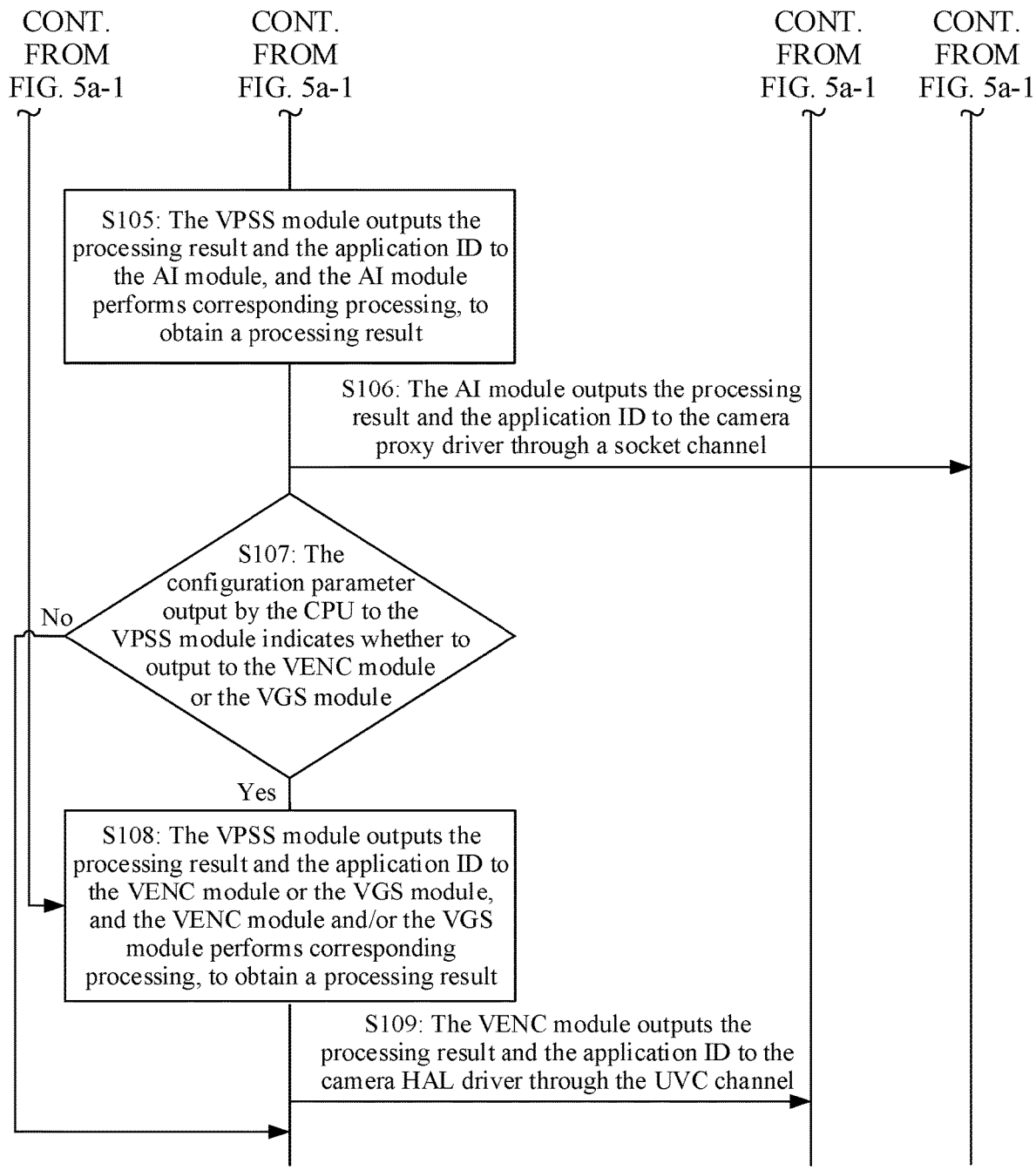

The following details the technical solutions of this application with reference to FIG. 5a-1 and FIG. 5a-2, to further describe a process of using the camera by the camera HAL driver and the camera proxy driver of the electronic device.

S101: The camera HAL driver inputs, to the camera through the UVC channel, a first message including an application ID.

Specifically, the camera HAL driver receives a use request message of an application, where the use request message is used to indicate that the application needs to use the camera. For example, the use request message carries the application ID. Specifically, in response to the received use request message, the camera HAL driver sends the first message to the camera through the UVC channel, to request to use the camera. The first message carries the application ID. For example, the first message is a UVC message. The UVC message may be specifically a SET CUR message, and a specified field in the message carries the application ID.

S102: The CPU receives the first message, determines, based on the application ID, a type and a to-be-started module, outputs an instruction to the sensor module 430, and outputs the respective configuration parameters to the sensor module 430, the VI module 421, the VPSS module 422, the AI module 423, the VENC module 424, and the VGS module 425, where the instruction is used to instruct the sensor module 430 to perform a specific function, and the configuration parameters are used to configure the sensor module 430, the VI module 421, the VPSS module 422, the AI module 423, the VENC module 424, and the VGS module 425.

Optionally, the CPU obtains the application ID in response to the received first message. The memory of the camera prestores a database, where the database stores an application ID, a type (or type information) corresponding to the application ID, and a module use manner corresponding to the type. The CPU matches the obtained application ID with the application ID in the prestored database, and extracts a type corresponding to a successfully matched application ID. Specifically, the CPU further matches the obtained type with the prestored type, and extracts a module use manner corresponding to a successfully matched type. The module use manner is used to indicate one or more modules that need to be started.

Optionally, the CPU obtains the application ID in response to the received first message. A database, for example, a data storage matching table, is provided in a program run by the CPU, where the data storage matching table stores an application ID, a type (or type information) corresponding to the application ID, and a module use manner corresponding to the type. The CPU matches the obtained application ID with the application ID in the database, extracts a type corresponding to a successfully matched application ID and a corresponding module use manner, and starts one or more modules based on the module use manner. Subsequently, the database may be updated or modified through upgrading, modification by an authorized administrator, or in another manner. In this way, a risk of leaking the database can be reduced.

A process of configuring the application ID, the type, and the module use manner is detailed in the following embodiments.

For example, the CPU may output an instruction to the sensor module through the connection channel CNG 0 connected to the sensor module, to instruct the sensor module to start and to collect an image. The CPU outputs the corresponding configuration parameters through channels (for example, the CNG 0 to the CNG 5) to the modules. The configuration parameters are used to perform, including but not limited to, a function of instructing the modules to start or not to start. The CPU outputs the configuration parameters corresponding to the modules to the sensor module, the VI module, the VPSS module, the AI module, the VENC module, and the VGS module, to indicate some of the modules to start, and to make each started module learn an output object of a processing result, for example, to make the VPSS module learn that the processing result of the VPSS module needs to be output to the AI module.

S103: The sensor module performs corresponding processing according to the instruction of the CPU, and outputs a processing result and the application ID to the VI module; the VI module performs corresponding processing based on the input of the sensor module, and outputs a processing result and the application ID to the VPSS module; and the VPSS module performs corresponding processing to obtain the processing result.

Specifically, the sensor module may perform corresponding processing, for example, collect an image by using the camera, according to the instruction of the CPU; and output the collected image to the VI module. The VI module performs corresponding processing, for example, performs noise reduction processing, on the image from the sensor module based on the configuration parameter sent by the CPU; and outputs a processed image to the VPSS module. The VPSS module may perform corresponding processing, for example, 3D noise reduction processing, on the image from the VI module, to obtain the processing result.

S104: The configuration parameter output by the CPU to the VPSS module indicates whether to output the processing result to the AI module.

Specifically, after completing the image processing to obtain the processing result, the VPSS module determines whether the configuration parameter output by the CPU to the VPSS module indicates that the processing result needs to be output to the AI module.

If a type is an AI type, the application needs the camera to implement an AI function. Correspondingly, the configuration parameter output by the CPU to the VPSS module indicates the VPSS module to output the processing result to the AI module, and the AI module also receives the configuration parameter that indicates the AI module to start. The VPSS determines that the configuration parameter output by the CPU to the VPSS module indicates to output the processing result to the AI module, and performs S105.

If a type is a video stream type, the application needs the camera to implement a video streaming function. Correspondingly, the configuration parameter output by the CPU to the VPSS module indicates the VPSS module to output the processing result to the VGS module or the VENC module, and S108 is performed.

If a type is an AI type+a video stream type, the application needs the camera to implement an AI function, and also needs the camera to implement a video streaming function. Correspondingly, the configuration parameter output by the CPU to the VPSS module indicates the VPSS module to output the processing result to the AI module and the VENC module, or the AI module and the VGS module, and S105 to S109 are correspondingly performed.

S105: The VPSS module outputs the processing result and the application ID to the AI module, and the AI module performs corresponding processing to obtain a processing result.

Specifically, the VPSS module outputs the processing result to the AI module based on the indication of the configuration parameter sent by the CPU, and the AI module performs corresponding processing on the processing result, namely, the processed image, input by the VPSS. For example, the AI module performs AI recognition (or detection) on the image to obtain the processing result, which may also be referred to as an AI detection result. The AI detection result includes: An AI event exists, and no AI event exists.

S106: The AI module outputs the processing result and the application ID to the camera proxy driver through the socket channel.

Specifically, the application ID is used to indicate an application to which the processing result is fed back. The AI module may output an obtained AI event and the obtained application ID to the camera proxy driver through the socket channel based on the configuration parameter sent by the CPU. For example, the AI module sends a socket message to the camera proxy driver, where the message carries the AI event and the application ID. Optionally, if the AI module detects no AI event, after performing AI detection, the AI module does not perform any processing, that is, does not need to send the socket message to the camera proxy driver.

S107: The configuration parameter output by the CPU to the VPSS module indicates whether to output the processing result to the VENC module or the VGS module.

Specifically, the VPSS module may further determine whether to output the processing result to the VENC module or the VGS module. A sequence for performing steps S107 and S104 is not limited. The VPSS module may first determine whether to output the processing result to the AI module, may first determine whether to output the processing result to the VENC module or the VGS module, or may simultaneously determine whether to output the processing result to the AI module and whether to output the output result to the VENC module or the VGS module. This is not limited in this application.

In an example, if the application that currently requests to use the camera is of the AI type, that is, if the application only needs the camera to implement the AI function, the configuration parameter output by the CPU to the VPSS module indicates to output the processing result and the application ID to the AI module. Then, in this step (S107), the VPSS module determines, based on the configuration parameter, that the VPSS module does not need to output the processing result and the application ID to the VENC module or the VGS module.

In another example, if the application that currently requests to use the camera is of the video stream type, that is, if the application only needs the camera to implement the video streaming function, the configuration parameter output by the CPU to the VPSS module indicates to output the processing result and the application ID to the VENC module or the VGS module. Then, in this step (S107), the VPSS module determines, based on the configuration parameter, that the VPSS module needs to output the processing result and the application ID to the VENC module or the VGS module.

In still another example, if the application that currently requests to use the camera is of the video stream type and the AI type, that is, if the application needs the camera to implement the video streaming function and the AI function, the configuration parameter output by the CPU to the VPSS module indicates to output the processing result and the application ID to the AI module and the VENC module, or the AI module and the VGS module. Then, in this step (S107), the VPSS module determines, based on the configuration parameter, that the VPSS module needs to output the processing result and the application ID to the AI module and the VENC module, or the AI module and the VGS module.

S108: The VPSS module outputs the processing result and the application ID to the VENC module or the VGS module, and the VENC module or the VGS module performs corresponding processing to obtain a processing result.

In an example, if the VPSS module outputs the processing result and the application ID to the VENC module, the VENC module encodes the image to generate a video stream. In another example, if the VPSS module outputs the processing result and the application ID to the VGS module, the VGS module performs zooming on the image, and outputs a processing result and the application ID to the VENC module based on the indication of the configuration parameter sent by the CPU. The VENC module encodes an image obtained through processing by the VGS module to generate a video stream.

S109: The VENC module outputs the processing result and the application ID to the camera HAL driver through the UVC channel.

Specifically, the application ID is used to indicate an application to which the processing result is fed back. The VENC module may output the generated video stream to the camera HAL driver through the UVC channel based on the indication of the configuration parameter sent by the CPU. For example, the VENC module sends a UVC message to the camera HAL driver, where the UVC message includes the generated video stream.

In S102 to S108, processing performed by each module is based only on a processing result that is input by a previous module. The application ID is used to identify an application to which the processing result corresponds.

In other embodiments, the application ID may be replaced with a sub-function ID of an application. For example, "remote housekeeping" may be considered as a sub-function and is integrated into a "smart screen" application. The "smart screen" application includes a plurality of sub-functions associated with the camera. The remote housekeeping function is only a sub-function of the "smart screen" application. The "smart screen" application may further include other sub-functions associated with the camera. When a user taps the remote housekeeping sub-function of the "smart screen" application, a smart screen (large screen) uses the camera. When the user taps other sub-functions of the "smart screen" application that are associated with the camera, the smart screen (large screen) also uses the camera. For another example, a "smart screen" application and a "child mode" application are provided on a mobile phone of a user, and the "smart screen" application includes a remote housekeeping sub-function. Likewise, after the "child mode" application is tapped, the smart screen (large screen) uses the camera; and after the remote housekeeping sub-function is tapped, the smart screen (large screen) also uses the camera. Unless otherwise stated, the content in this paragraph is also applicable to embodiments in FIG. 5b-1 to FIG. 5d-4 and FIG. 7a-1 to FIG. 7d-4, and is not described below again.

Figures 1, 5B:
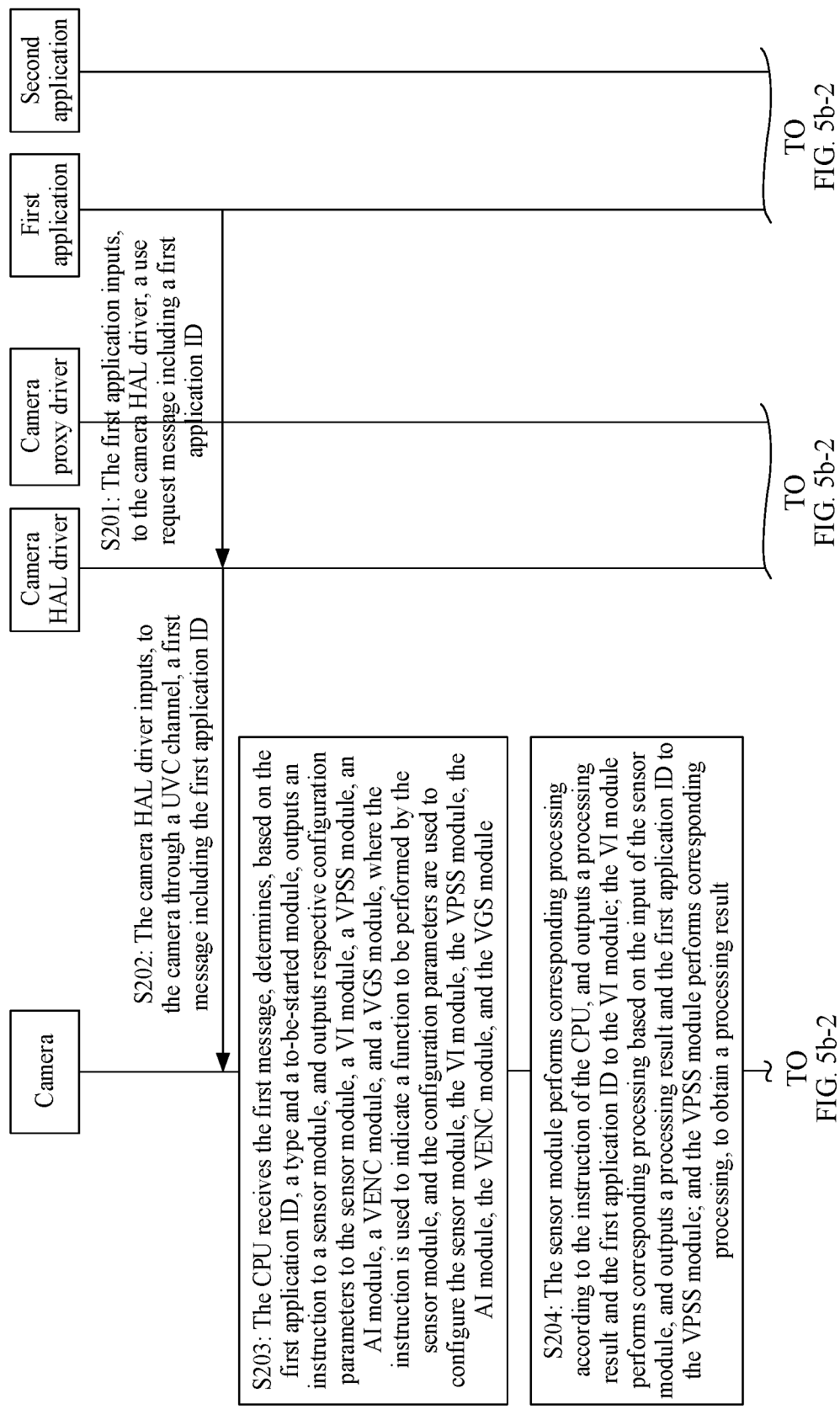
Figures 2, 5B:
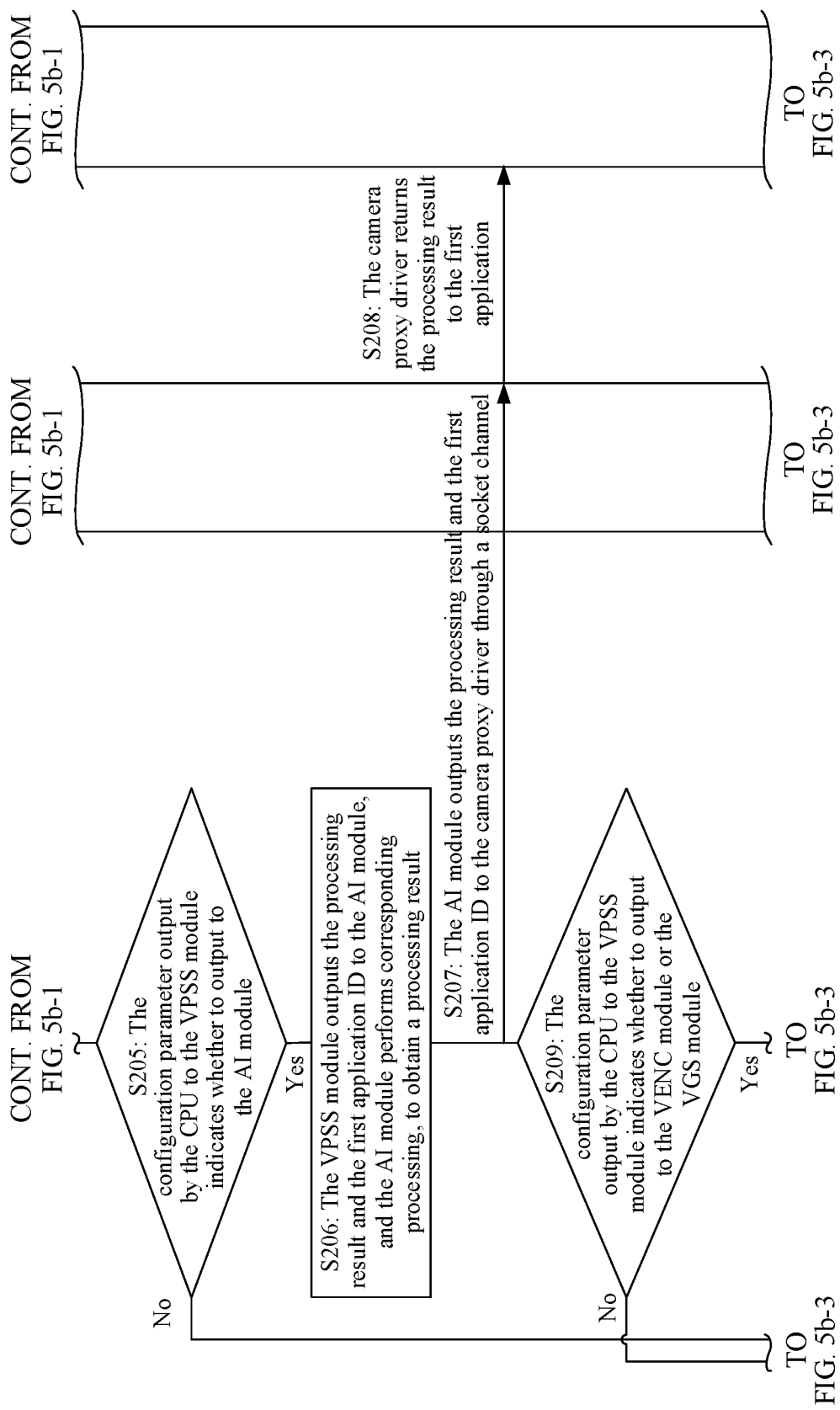
Figures 3, 5B:
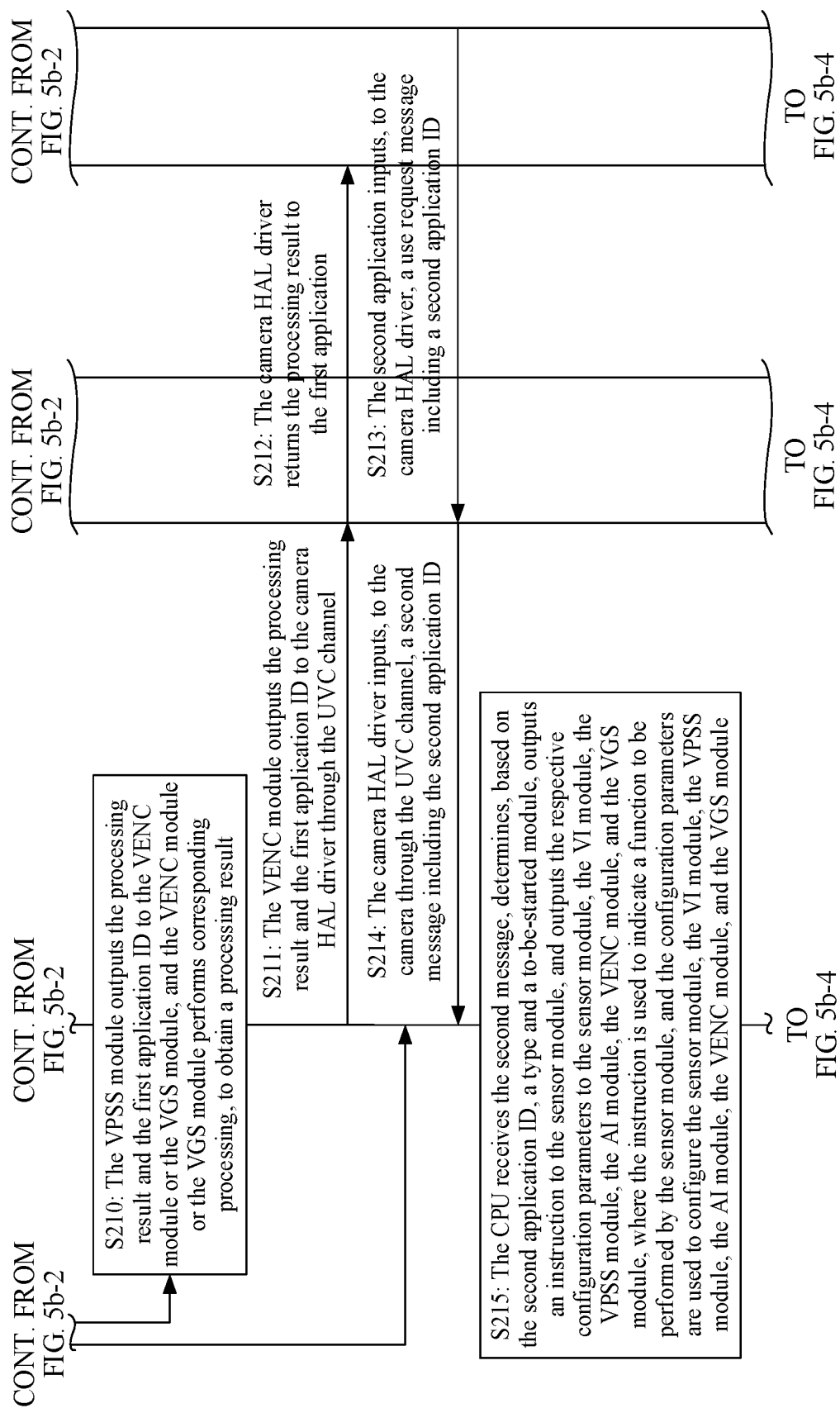
Figures 4, 5B:
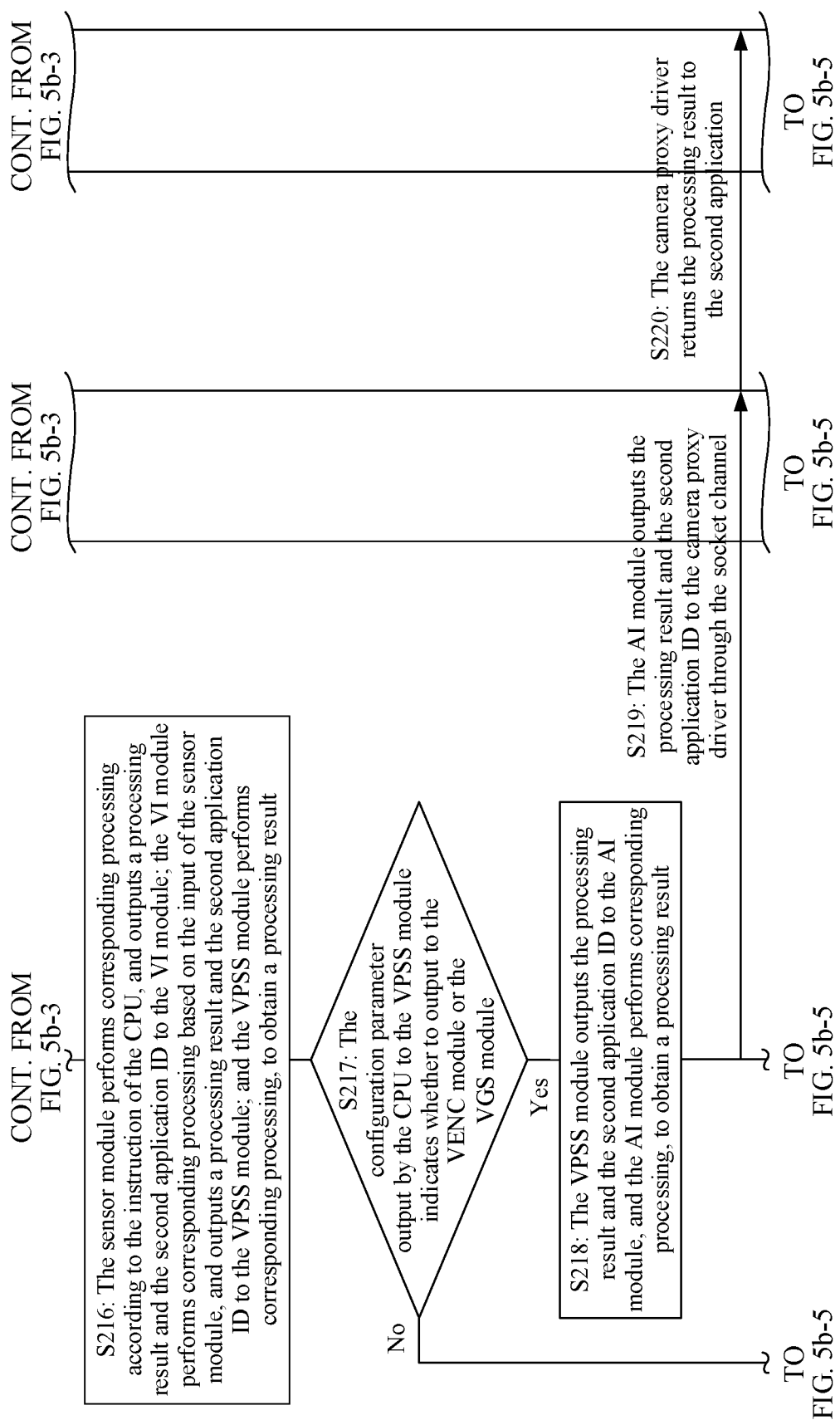

Based on the embodiment shown in FIG. 5a-1 and FIG. 5a-2, method steps of remotely using a camera of the first electronic device by a second electronic device are further described with reference to FIG. 5b-1 to FIG. 5b-5. A same application is installed in both the first electronic device and the second electronic device, and an account for running the same application in the first electronic device is the same as an account for running the same application in the second electronic device, or the accounts belong to a same group, for example, a family group. When the same application in the second electronic device is run, the same application in the first electronic device is started. The first electronic device may be in a screen-off state, that is, does not display any content, or may be in a screen-on state. However, the first electronic device starts the same application in effect. Specific steps are as follows.

S201: A first application inputs, to the camera HAL driver, a use request message including a first application ID.

Specifically, after being started, the first application obtains the first application ID sent by the camera HAL driver, and inputs the use request message including the first application ID to the camera HAL driver, to request to use the camera. For example, a user may remotely trigger, by using the second electronic device, the first application to start, or the user may trigger, directly on the first electronic device, the first application to start. This is not limited in this application.

For example, the first application ID may be an ID of the first application, or may be an ID of a sub-function of the first application.

S202: The camera HAL driver inputs, to the camera through the UVC channel, a first message including the first application ID.

S203: The CPU receives the first message, determines, based on the first application ID, a type and a to-be-started module, outputs an instruction to the sensor module, and outputs the respective configuration parameters to the sensor module, the VI module, the VPSS module, the AI module, the VENC module, and the VGS module, where the instruction is used to instruct the sensor module to perform a specific function, and the configuration parameters are used to configure the sensor module, the VI module, the VPSS module, the AI module, the VENC module, and the VGS module.

S204: The sensor module performs corresponding processing according to the instruction of the CPU, and outputs a processing result and the first application ID to the VI module; the VI module performs corresponding processing based on the input of the sensor module, and outputs a processing result and the first application ID to the VPSS module; and the VPSS module performs corresponding processing to obtain a processing result.

S205: The configuration parameter output by the CPU to the VPSS module indicates whether to output the processing result to the AI module.

S206: The VPSS module outputs the processing result and the first application ID to the AI module, and the AI module performs corresponding processing on the processing result input by the VPSS module, to obtain a processing result.

S207: The AI module outputs the processing result and the first application ID to the camera proxy driver through the socket channel.

S208: The camera proxy driver returns the processing result to the first application based on the first application ID.

For example, after the camera proxy driver receives the processing result and the first application ID that are input by the AI module, that is, receives a socket message that carries an AI event and the first application ID, the camera proxy driver may report the AI event to the first application, so that the first application performs corresponding processing on the AI event.

S209: The configuration parameter output by the CPU to the VPSS module indicates whether to output the processing result to the VENC module or the VGS module.

S210: The VPSS module outputs the processing result and the first application ID to the VENC module or the VGS module, and the VENC module or the VGS module performs corresponding processing to obtain a processing result.

S211: The VENC module outputs the processing result and the first application ID to the camera HAL driver through the UVC channel.

Specific content of S202 to S207 and S209 to S211 is respectively the same as content of S101 to S109. Details are not described herein again.

S212: The camera HAL driver returns the processing result to the first application based on the first application ID.

For example, after the camera HAL driver receives the processing result and the first application ID that are input by the VENC module, that is, receives a UVC message that carries a video stream and the first application ID, the camera HAL driver may report the video stream to the first application, so that the first application performs corresponding processing on the video stream, for example, renders and displays the video stream.

S213: A second application inputs, to the camera HAL driver, a use request message including a second application ID.

For example, only the second application ID is used as an example for description in this embodiment. In other embodiments, the first application may input, to the camera HAL driver, a use request message including an application sub-function ID of another sub-function of the first application, or the second application may input, to the camera HAL driver, a use request message including an application sub-function ID corresponding to a sub-function of the second application.

S214: The camera HAL driver inputs, to the camera through the UVC channel, a second message including the second application ID.

S215: The CPU receives the second message, determines, based on the second application ID, a type and a to-be-started module, outputs an instruction to the sensor module, and outputs the respective configuration parameters to the sensor module, the VI module, the VPSS module, the AI module, the VENC module, and the VGS module, where the instruction is used to instruct the sensor module to perform a specific function, and the configuration parameters are used to configure the sensor module, the VI module, the VPSS module, the AI module, the VENC module, and the VGS module.

In a possible implementation, the VENC module is an exclusive module, that is, the VENC module can execute only one video process. If the VENC module has been used by the first application, the second application uses the VENC module only after the first application finishes using the VENC module. If the VENC module is not used by any application, the second application can directly use the VENC module. In another possible implementation, the AI module is a non-exclusive module, that is, the AI module can execute one or more processes. Regardless of whether the AI module has been used, the second application can directly use the AI module.

S216: The sensor module performs corresponding processing according to the instruction of the CPU, and outputs a processing result and the second application ID to the VI module; the VI module performs corresponding processing based on the input of the sensor module, and outputs a processing result and the second application ID to the VPSS module; and the VPSS module performs corresponding processing to obtain a processing result.

S217: The configuration parameter output by the CPU to the VPSS module indicates whether to output the processing result to the AI module.

S218: The VPSS module outputs the processing result and the second application ID to the AI module, and the AI module performs corresponding processing to obtain a processing result.

S219: The AI module outputs the processing result and the second application ID to the camera proxy driver through the socket channel.

S220: The camera proxy driver returns the processing result to the second application based on the second application ID.

S221: The configuration parameter output by the CPU to the VPSS module indicates whether to output the processing result to the VENC module or the VGS module.

S222: The VPSS module outputs the processing result and the second application ID to the VENC module or the VGS module, and the VENC module or the VGS module performs corresponding processing to obtain a processing result.

S223: The VENC module outputs the processing result and the second application ID to the camera HAL driver through the UVC channel.

S224: The camera HAL driver returns the processing result to the second application based on the second application ID.

For specific content of S213 to S224, refer to S201 to S212. Details are not described herein again.

Figures 5, 5B:
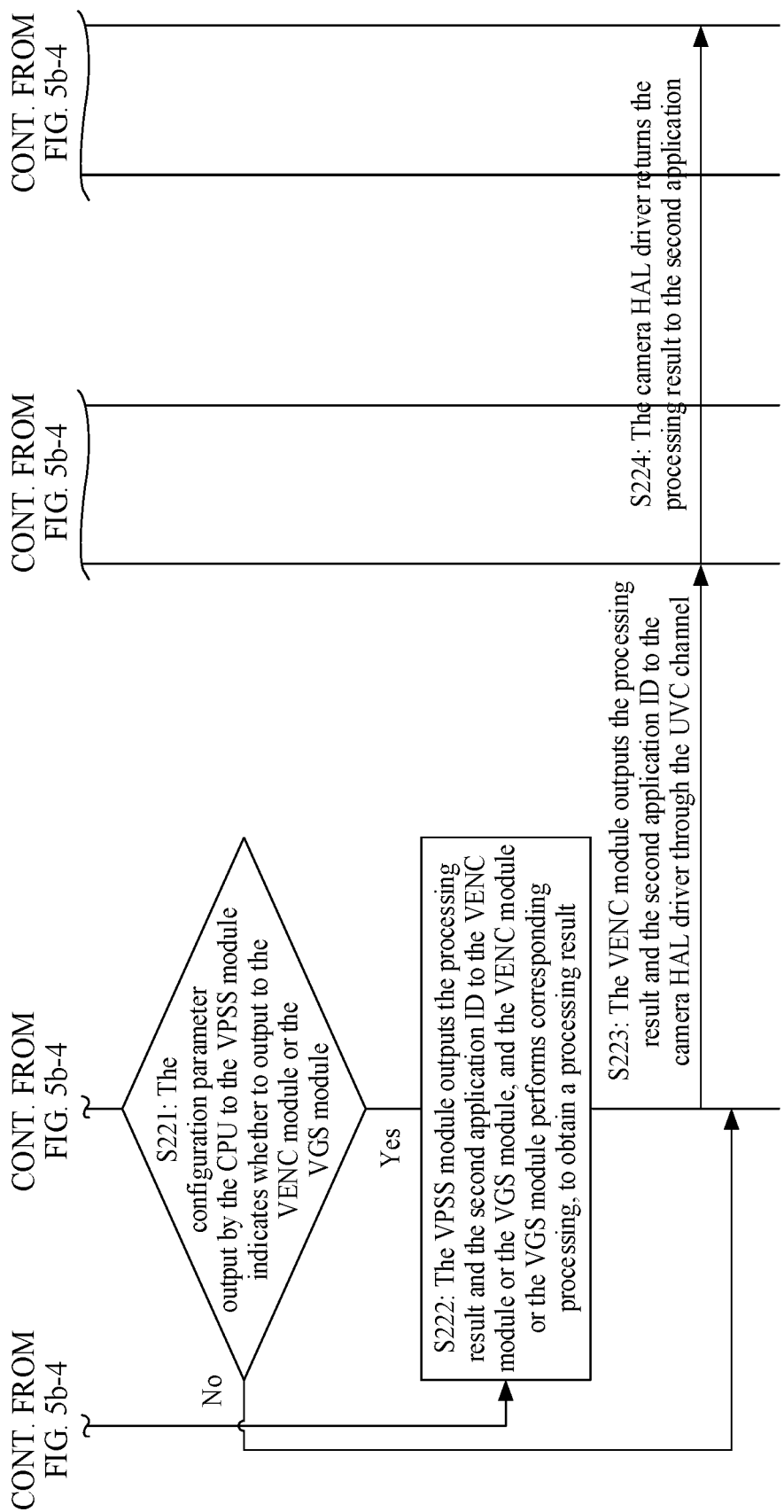
Figures 1, 5C:
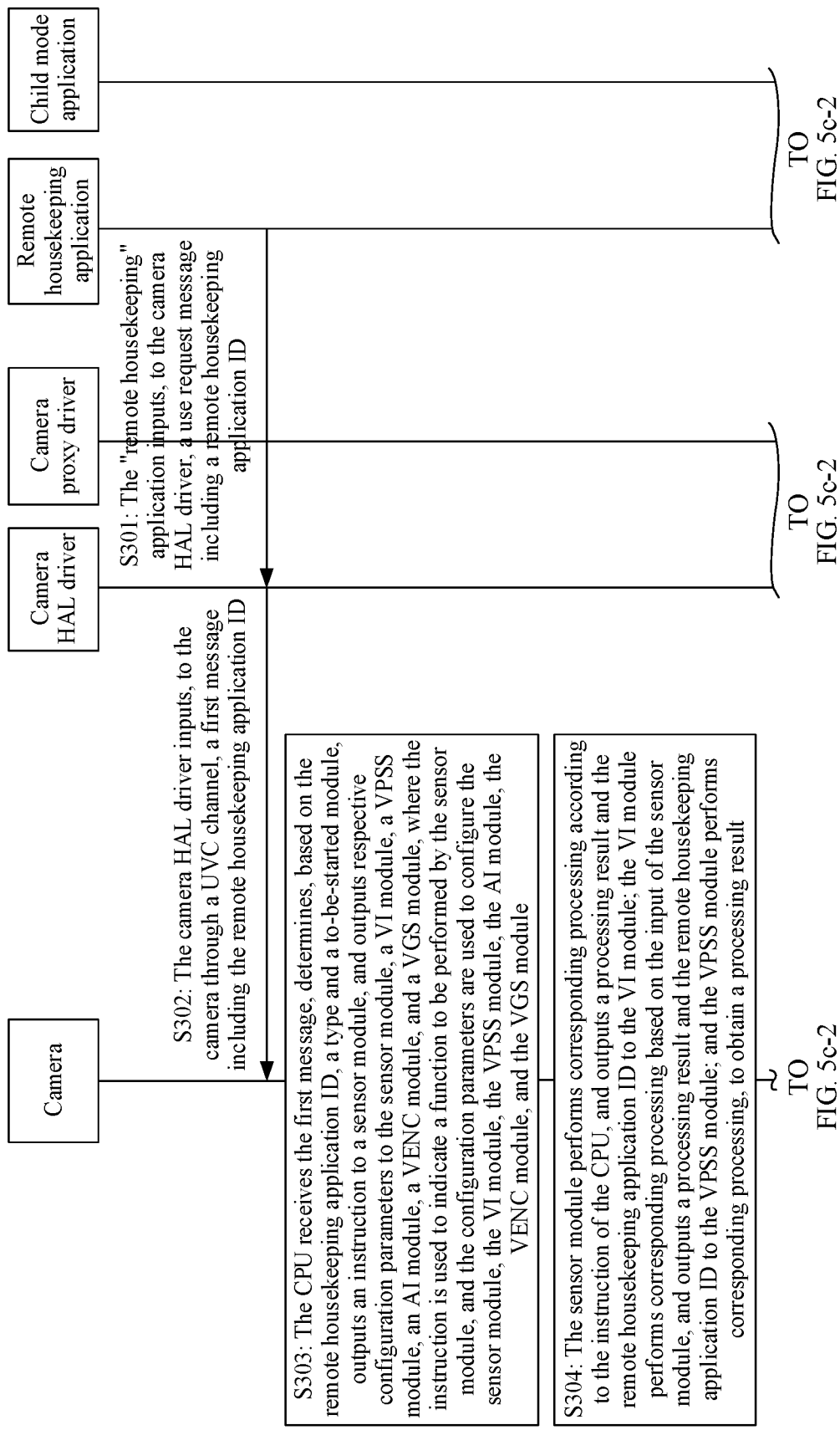
Figures 2, 5C:
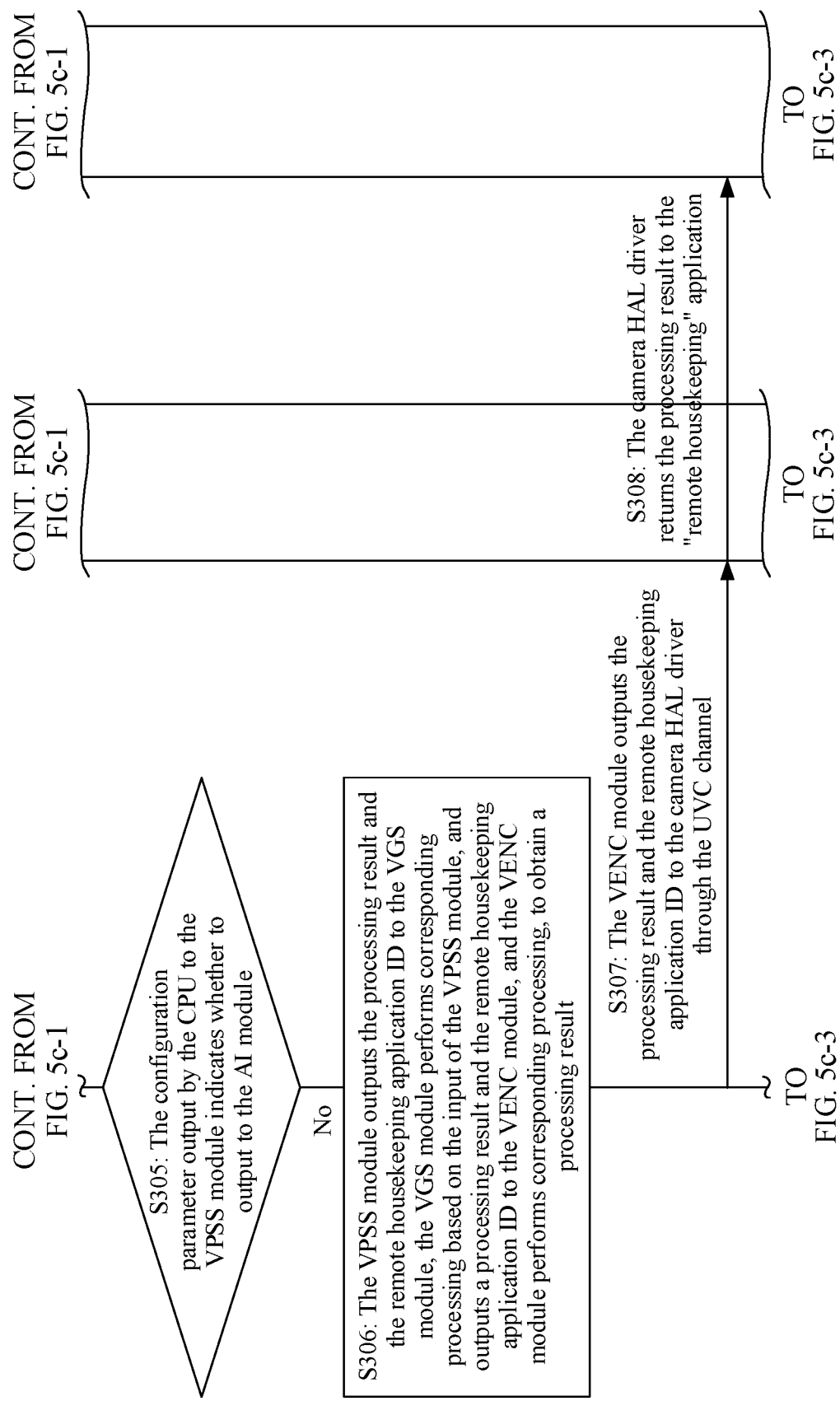
Figures 3, 5C:
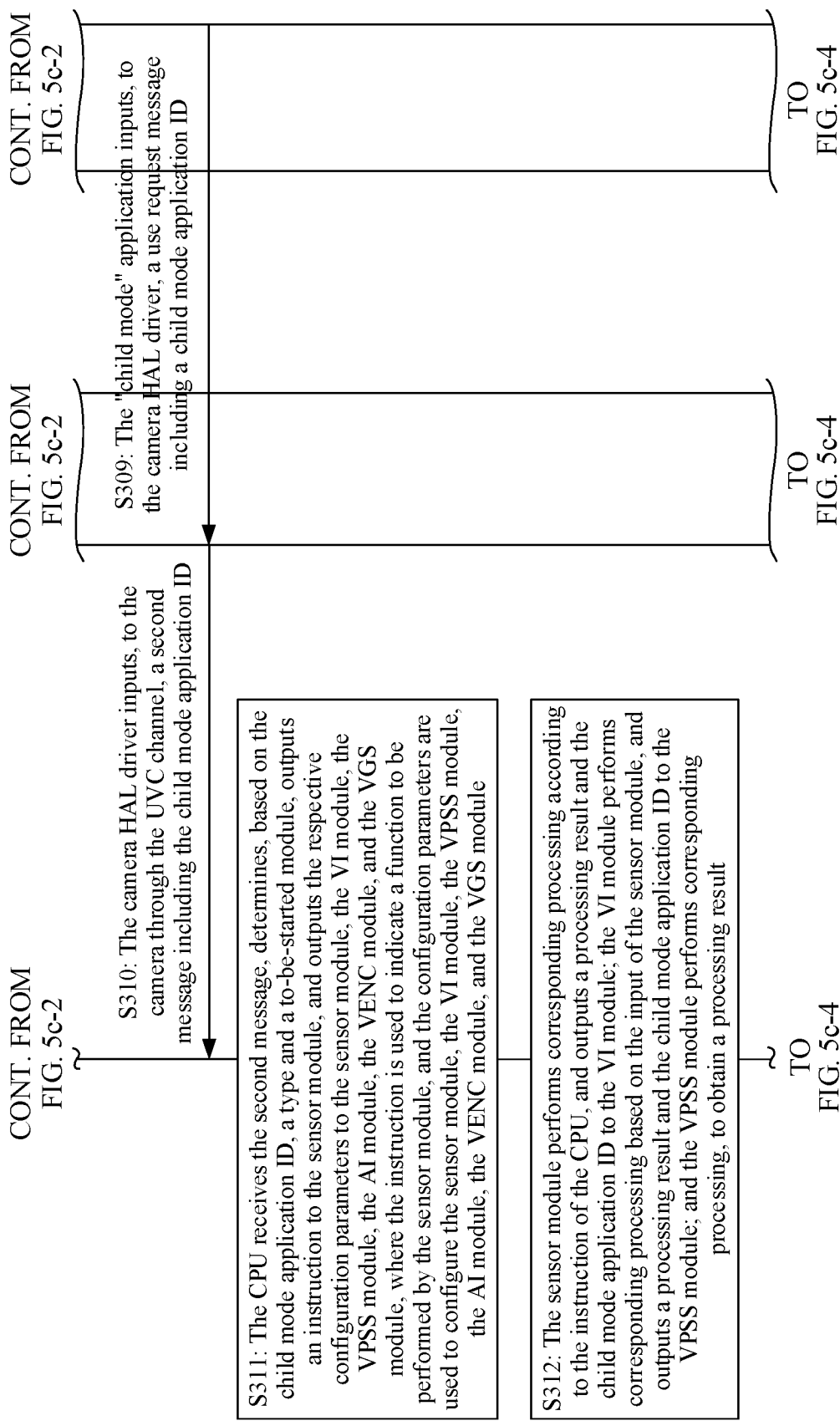
Figures 4, 5C:
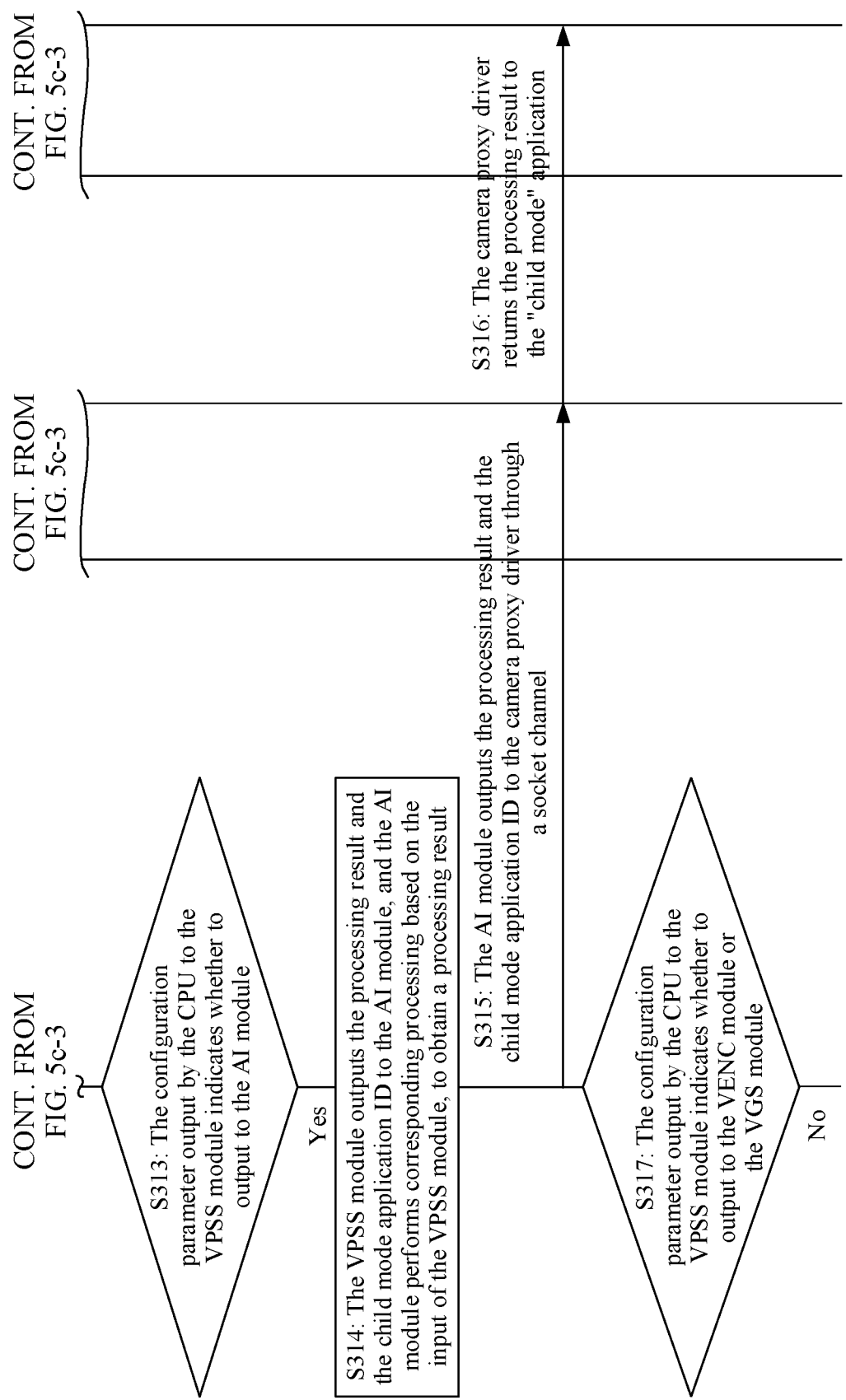

With reference to FIG. 5c-1 to FIG. 5c-4, the following further describes a method procedure in which the second electronic device remotely uses the camera of the first electronic device. As shown in FIG. 5c-1 to FIG. 5c-4, a camera use manner is described by using an example in which the first application in the first electronic device is a "remote housekeeping" application and the second application in the first electronic device is a "child mode" application. When using the camera, the "remote housekeeping" application uses the camera to shoot or record a home video, so that a user can remotely learn a situation at home by using the first electronic device. When using the camera, the "child mode" application uses the camera to dynamically collect an image of a child, and determines and recognizes a status of the child through AI recognition, so that the user can remotely learn the status of the child by using the first electronic device. For example, if the child is in a lying state, it is determined that a lying-state AI event exists.

As shown in FIG. 5c-1 to FIG. 5c-4, after the second electronic device starts the "remote housekeeping" application and the first electronic device starts the "remote housekeeping" application (the first electronic device may be in a screen-off state or a screen-on state), the method steps of remotely using the camera of the first electronic device by the second electronic device are as follows.

S301: The "remote housekeeping" application inputs, to the camera HAL driver, a use request message including a remote housekeeping application ID.

The "remote housekeeping" application is a "remote housekeeping" application installed in the first electronic device. A "remote housekeeping" application is installed in both the first electronic device and the second electronic device. After being started, the "remote housekeeping" application obtains the remote housekeeping application ID, and sends the use request message to the camera HAL driver, to request to use the camera, where the message carries the remote housekeeping application ID. The "remote housekeeping" application may be a "remote housekeeping" application in the first electronic device.

It should be noted that the "remote housekeeping" application specifically includes three sub-functions: an AI function, a video streaming function, and an AI function and a video streaming function. Different sub-functions are corresponding to different "remote housekeeping" application IDs. For example, "remote housekeeping" application IDs corresponding to the AI function, the video streaming function, and the AI function and the video streaming function are an ID 11, an ID 12, and an ID 13, respectively. For example, when the user starts the "remote housekeeping" application, a selection interface is popped up for the user to select one of the foregoing three functions. A corresponding application ID is obtained based on selection of one of the functions made by the user. For example, if the user selects the video streaming function, the obtained application ID is the ID 12.

S302: The camera HAL driver inputs, to the camera through the UVC channel, a first message including the remote housekeeping application ID.

S303: The CPU receives the first message, determines, based on the remote housekeeping application ID, a type and a to-be-started module, outputs an instruction to the sensor module, and outputs the respective configuration parameters to the sensor module, the VI module, the VPSS module, the AI module, the VENC module, and the VGS module, where the instruction is used to instruct the sensor module to perform a specific function, and the configuration parameters are used to configure the sensor module, the VI module, the VPSS module, the AI module, the VENC module, and the VGS module.

S304: The sensor module performs corresponding processing according to the instruction of the CPU, and outputs a processing result and the remote housekeeping application ID to the VI module; the VI module performs corresponding processing based on the input of the sensor module, and outputs a processing result and the remote housekeeping application ID to the VPSS module; and the VPSS module performs corresponding processing to obtain a processing result.

S305: The configuration parameter output by the CPU to the VPSS module indicates whether to output the processing result to the AI module.

S306: The VPSS module outputs the processing result and the remote housekeeping application ID to the VGS module; the VGS module performs corresponding processing based on the input of the VPSS module, and outputs a processing result and the remote housekeeping application ID to the VENC module; and the VENC module performs corresponding processing, to obtain a processing result.

S307: The VENC module outputs the processing result and the remote housekeeping application ID to the camera HAL driver through the UVC channel.

S308: The camera HAL driver returns the processing result to the "remote housekeeping" application based on the remote housekeeping application ID.

For example, finally, after receiving the processing result, the "remote housekeeping" application of the first electronic device transmits the obtained processing result, namely, a video stream, to the "remote housekeeping" application of the second electronic device (for example, a mobile phone). The user may view, by using the "remote housekeeping" application in the mobile phone, a home picture shot by the camera of the first electronic device.

S309: The "child mode" application inputs, to the camera HAL driver, a use request message including a child mode application ID.

For example, the user may place the "remote housekeeping" application of the second electronic device in the background, that is, the "remote housekeeping" application still remotely uses the camera of the first electronic device, and the user may trigger, by using the second electronic device (for example, a mobile phone), the "child mode" application to start. For example, the "child mode" application has only an AI function, and does not have other sub-functions. The child mode application ID may be an application package name of the child mode application.

S310: The camera HAL driver inputs, to the camera through the UVC channel, a second message including the child mode application ID.

S311: The CPU receives the second message, determines, based on the child mode application ID, a type and a to-be-started module, outputs an instruction to the sensor module, and outputs the respective configuration parameters to the sensor module, the VI module, the VPSS module, the AI module, the VENC module, and the VGS module, where the instruction is used to instruct the sensor module to perform a specific function, and the configuration parameters are used to configure the sensor module, the VI module, the VPSS module, the AI module, the VENC module, and the VGS module.

Specifically, the CPU outputs the instruction to the sensor module, to instruct the sensor module to collect an image. The sensor module, the VI module, the VPSS module, and the AI module are started based on the configuration parameters provided by the CPU, and the configuration parameter of the sensor module indicates the sensor module to output the processing result to the VI module. The configuration parameter of the VI module indicates the VI module to output the processing result to the VPSS module. The configuration parameter of the VPSS module indicates the VPSS module to output the processing result to the AI module. The configuration parameter of the AI module indicates the AI module to output the processing result to the camera proxy driver. The configuration parameter of the VGS module indicates that the VGS module does not need to be started, and the configuration parameter of the VENC module indicates that the VENC module does not need to be started.

S312: The sensor module performs corresponding processing according to the instruction of the CPU, and outputs a processing result and the child mode application ID to the VI module; the VI module performs corresponding processing based on the input of the sensor module, and outputs a processing result and the child mode application ID to the VPSS module; and the VPSS module performs corresponding processing to obtain a processing result.

S313: The configuration parameter output by the CPU to the VPSS module indicates whether to output the processing result to the AI module.

S314: The VPSS module outputs the processing result and the child mode application ID to the AI module, and the AI module performs corresponding processing based on the input of the VPSS module, to obtain a processing result.

For example, based on the received image obtained through processing by the VPSS module, the AI module performs AI recognition on the image, and detects, based on a recognized feature, whether a corresponding AI event exists. In this embodiment, the AI event is a child lying AI event. If detecting the child lying AI event, the AI module performs S315. If detecting no child lying AI event, the AI module continues to perform AI detection on the image obtained through processing by the VPSS module.

S315: The AI module outputs the processing result and the child mode application ID to the camera proxy driver through the socket channel.

For example, the AI module sends a socket message to the camera proxy driver, where the message carries a child lying AI event.

S316: The camera proxy driver returns the processing result to the "child mode" application based on the child mode application ID.

For example, the camera proxy driver reports the child lying AI event to the "child mode" application. The "child mode" application may send the child lying AI event to the second electronic device of the user, to notify, by using the "child mode" application of the second electronic device, the user that the child lying AI event exists, and the user can learn that the child is lying at home.

S317: The configuration parameter output by the CPU to the VPSS module indicates whether to output the processing result to the VENC module or the VGS module.

For example, a module use manner corresponding to the "child mode" application indicates that the VENC module or the VGS module does not need to be started. Therefore, the VPSS module may determine, based on the configuration parameter sent by the CPU, that the processing result does not need to be output to the VENC module or the VGS module.

Details that are not described in S301 to S317 are the same as or similar to those in S201 to S222. Details are not described herein again.

In another example, the first application may be an "AI fitness" application and the second application may be a "child mode" application. When using the camera, the "AI fitness" application uses the camera to collect a current image of the user, and determines, through AI recognition, whether a fitness action of the user is standard. For example, if determining that the fitness action of the user is not standard, the "AI fitness" application determines that a nonstandard-action AI event exists.

Figures 1, 5D:
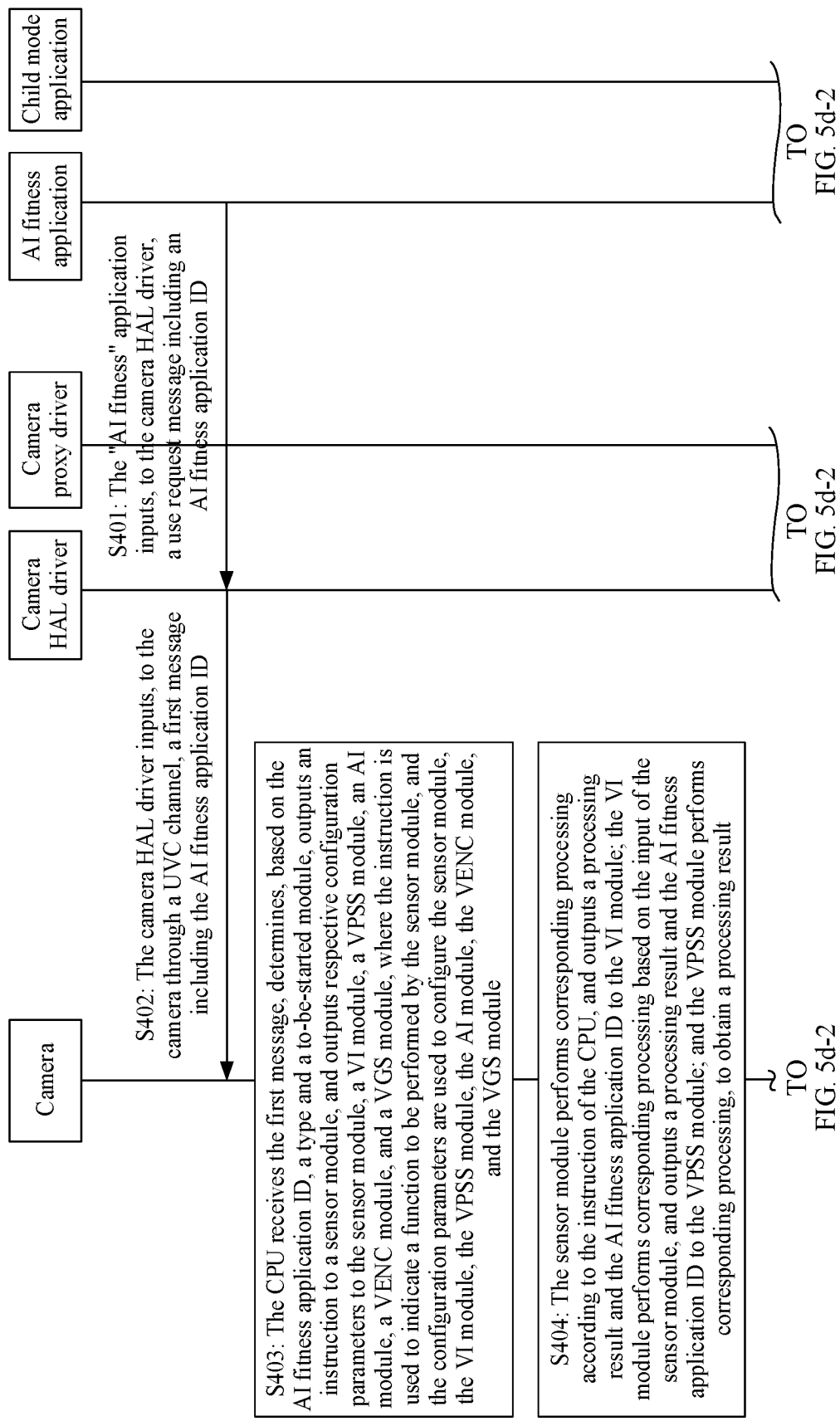
Figures 2, 5D:
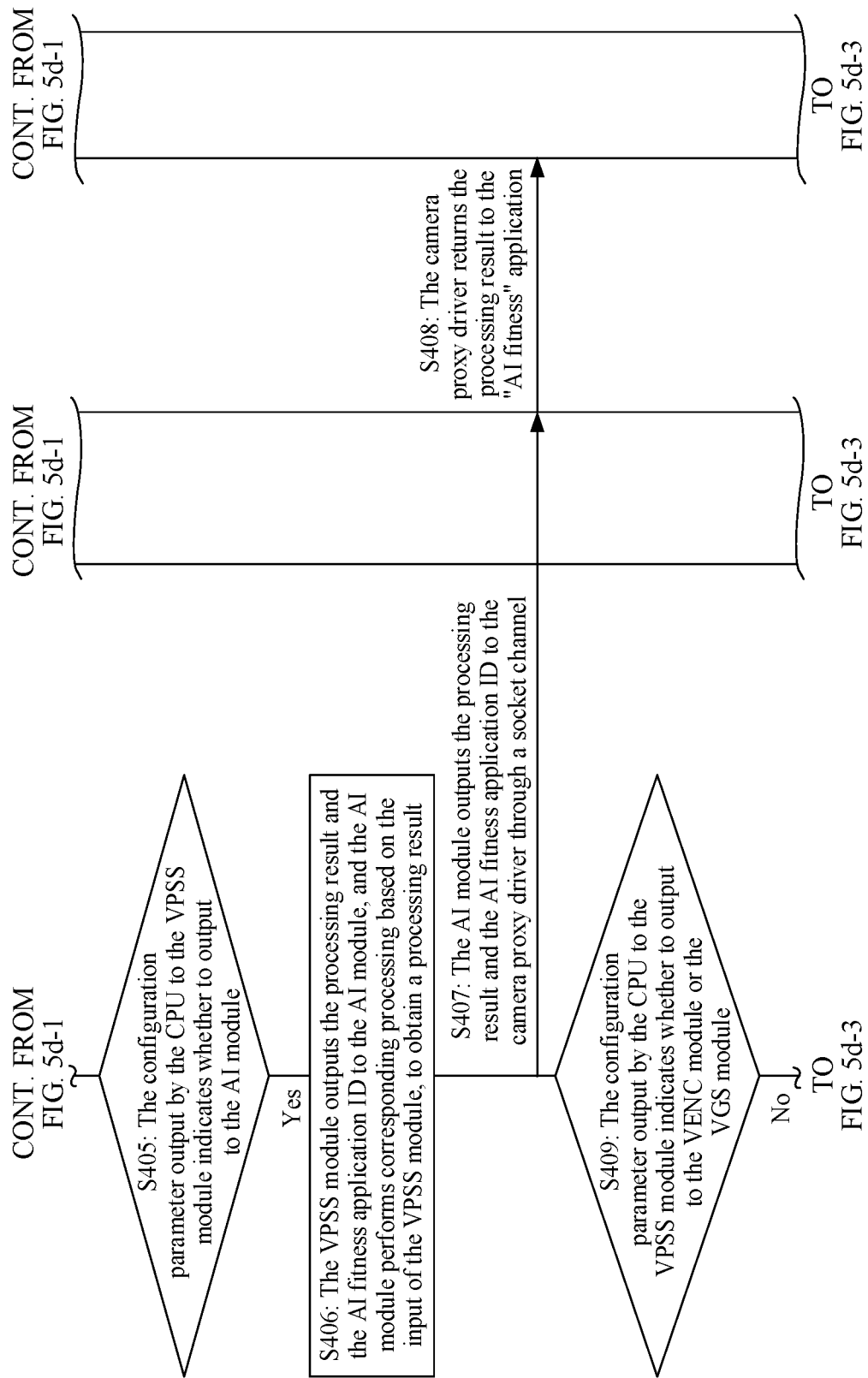
Figures 3, 5D:
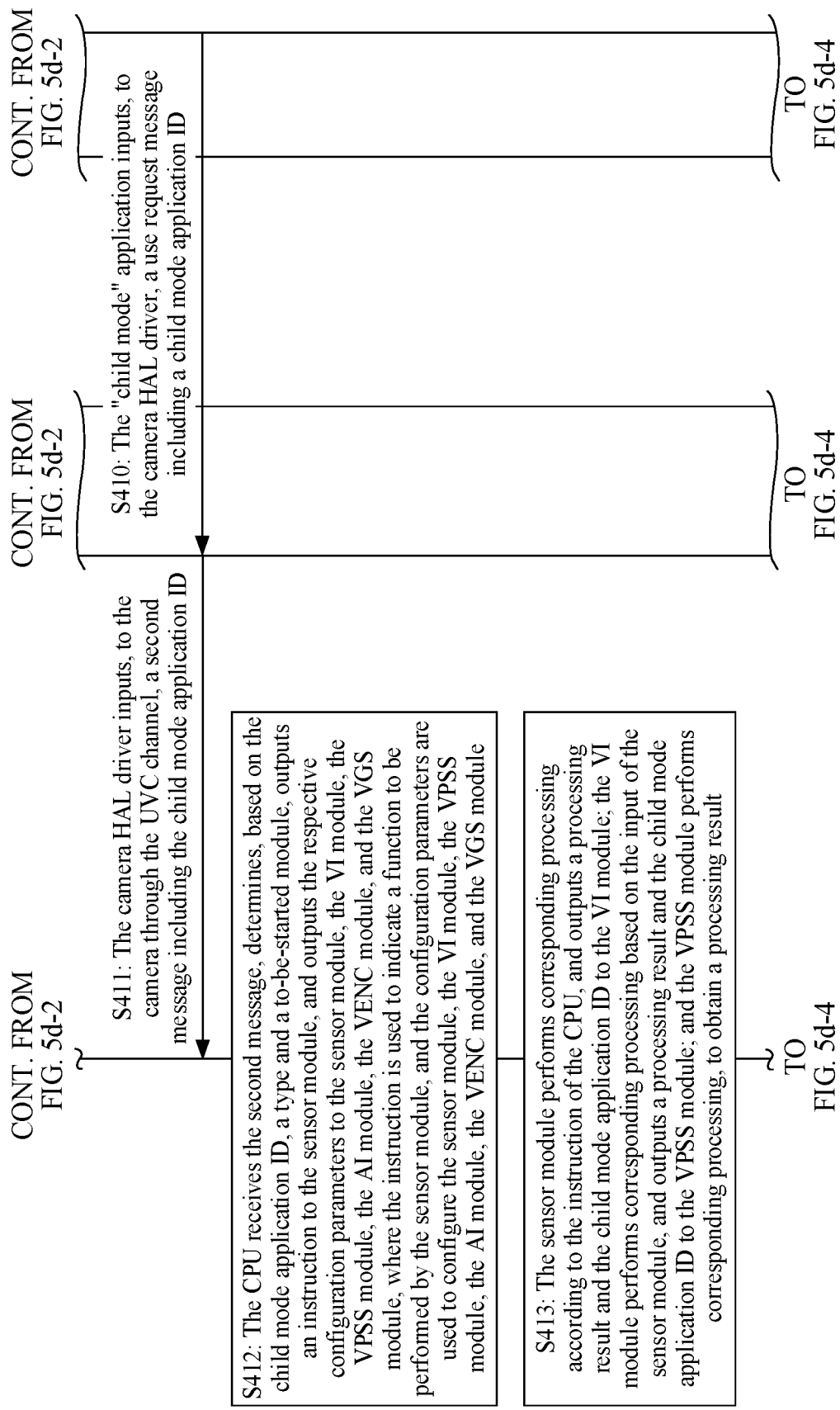
Figures 4, 5D:
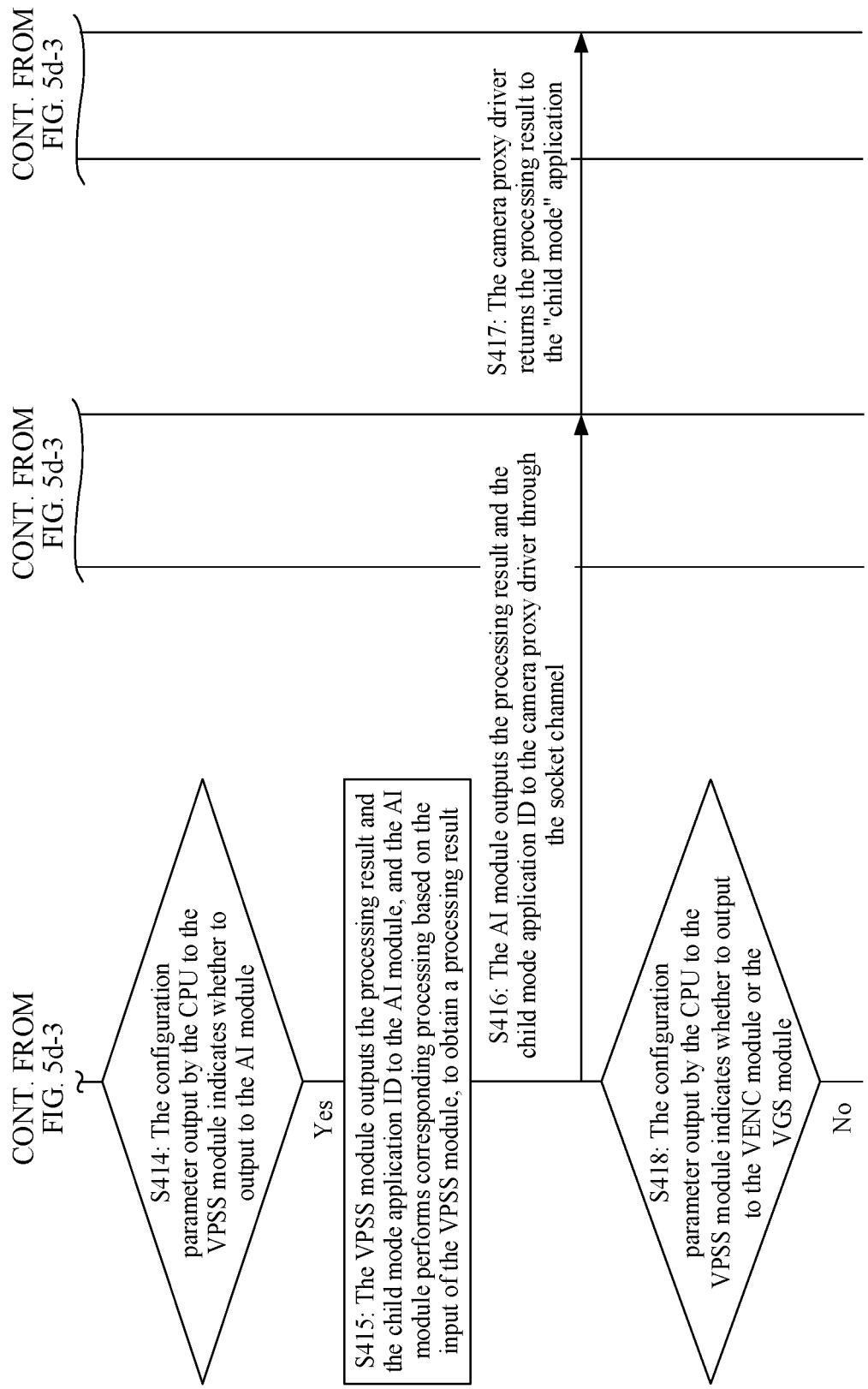

As shown in FIG. 5d-1 to FIG. 5d-4, method steps of remotely using the camera of the first electronic device by the second electronic device are as follows.

S401: The "AI fitness" application inputs, to the camera HAL driver, a use request message including an AI fitness application ID.

For example, the "AI fitness" application has only an AI function, and does not have other sub-functions. The AI fitness application ID may be an application package name of the AI fitness application.

S402: The camera HAL driver inputs, to the camera through the UVC channel, a first message including the AI fitness application ID.

S403: The CPU receives the first message, determines, based on the AI fitness application ID, a type and a to-be-started module, outputs an instruction to the sensor module, and outputs the respective configuration parameters to the sensor module, the VI module, the VPSS module, the AI module, the VENC module, and the VGS module, where the instruction is used to instruct the sensor module to perform a specific function, and the configuration parameters are used to configure the sensor module, the VI module, the VPSS module, the AI module, the VENC module, and the VGS module.

S404: The sensor module performs corresponding processing according to the instruction of the CPU, and outputs a processing result and the AI fitness application ID to the VI module; the VI module performs corresponding processing based on the input of the sensor module, and outputs a processing result and the AI fitness application ID to the VPSS module; and the VPSS module performs corresponding processing to obtain a processing result.

S405: The configuration parameter output by the CPU to the VPSS module indicates whether to output the processing result to the AI module.

S406: The VPSS module outputs the processing result and the AI fitness application ID to the AI module, and the AI module performs corresponding processing based on the input of the VPSS module, to obtain a processing result.

S407: The AI module outputs the processing result and the AI fitness application ID to the camera proxy driver through the socket channel.

S408: The camera proxy driver returns the processing result to the "AI fitness" application based on the AI fitness application ID.

S409: The configuration parameter output by the CPU to the VPSS module indicates whether to output the processing result to the VENC module or the VGS module. After the configuration parameter output by the CPU to the VPSS module indicates not to output the processing result to the VENC module or the VGS module, S410 is performed.

S410: The "child mode" application inputs, to the camera HAL driver, a use request message including a child mode application ID.

S411: The camera HAL driver inputs, to the camera through the UVC channel, a second message including the child mode application ID.

S412: The CPU receives the second message, determines, based on the child mode application ID, a type and a to-be-started module, outputs an instruction to the sensor module, and outputs the respective configuration parameters to the sensor module, the VI module, the VPSS module, the AI module, the VENC module, and the VGS module, where the instruction is used to instruct the sensor module to perform a specific function, and the configuration parameters are used to configure the sensor module, the VI module, the VPSS module, the AI module, the VENC module, and the VGS module.

S413: The sensor module performs corresponding processing according to the instruction of the CPU, and outputs a processing result and the child mode application ID to the VI module; the VI module performs corresponding processing based on the input of the sensor module, and outputs a processing result and the child mode application ID to the VPSS module; and the VPSS module performs corresponding processing to obtain a processing result.

S414: The configuration parameter output by the CPU to the VPSS module indicates whether to output the processing result to the AI module. After the configuration parameter output by the CPU to the VPSS module indicates to output the processing result to the AI module, S415 is performed.

S415: The VPSS module outputs the processing result and the child mode application ID to the AI module, and the AI module performs corresponding processing based on the input of the VPSS module, to obtain a processing result.

S416: The AI module outputs the processing result and the child mode application ID to the camera proxy driver through the socket channel.

S417: The camera proxy driver returns the processing result to the "child mode" application based on the child mode application ID.

S418: The configuration parameter output by the CPU to the VPSS module indicates whether to output the processing result to the VENC module or the VGS module.

Details that are not described in S401 to S418 are the same as or similar to those in S301 to S317. Details are not described herein again.

Embodiment 2

Figure 6:
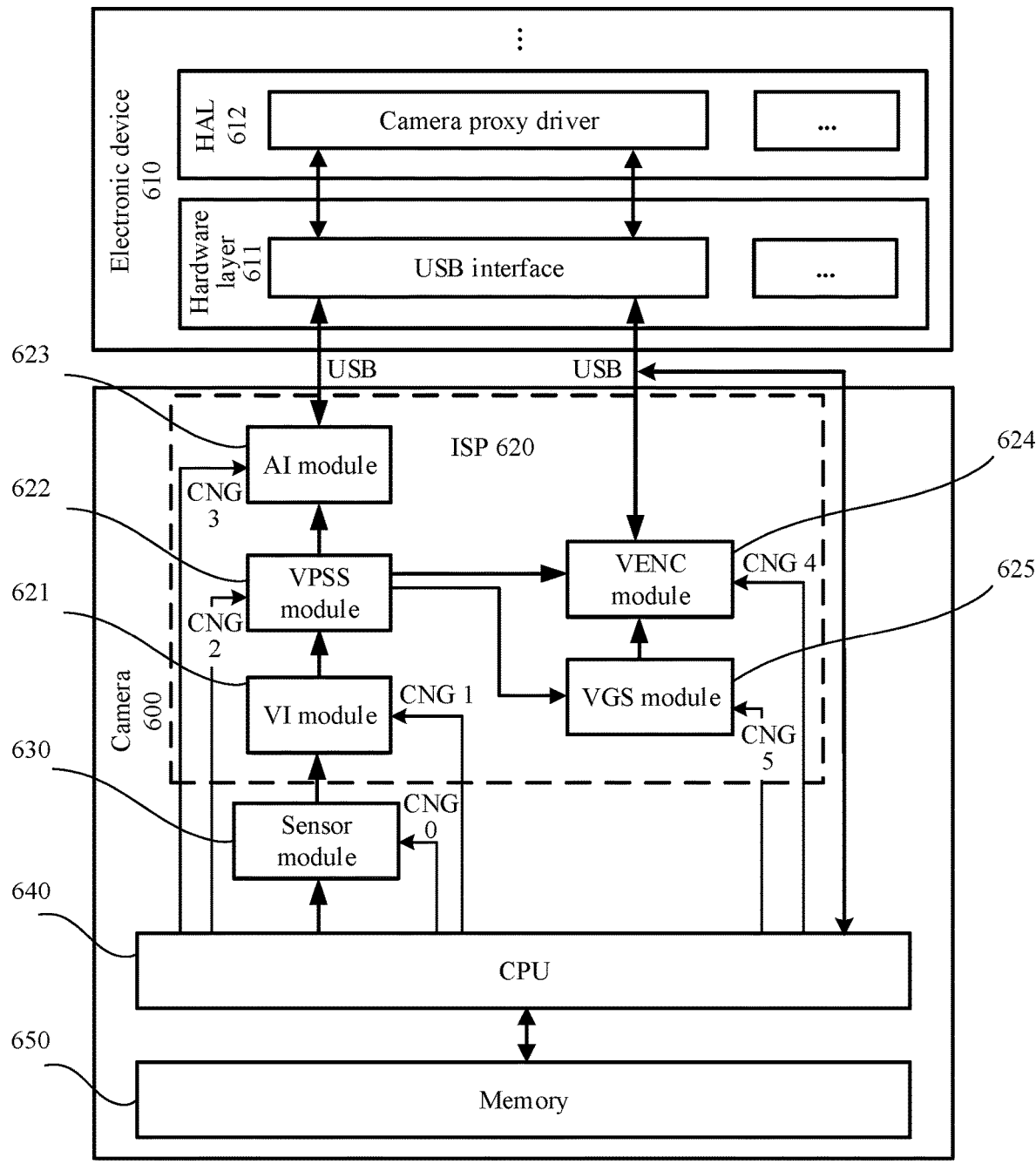
FIG. 6 is a schematic diagram of a structure in which a camera is connected to an electronic device according to Embodiment 2 of this application.

FIG. 6 is a schematic diagram of a structure in which a camera is connected to an electronic device according to Embodiment 2 of this application. Components included in a camera 600 in FIG. 6 are the same the components included in a camera 400 in FIG. 4, except that the reference numerals are adjusted accordingly. For example, a VPSS module 622 in FIG. 6 and the VPSS module 422 in FIG. 4 have same functions and uses. Therefore, for the components included in the camera 600, refer to descriptions of the corresponding components in FIG. 4. Details are not described herein again.

In FIG. 6, the camera 600 is also connected to an electronic device 610 through a USB interface. The USB interface is merely an example, and other interfaces such as a UART and a USART may also be used for implementing a connection between the camera 600 and the electronic device 610. FIG. 6 is different from FIG. 4 in that, at a HAL 612 of the electronic device 610, the HAL 612 includes at least a camera proxy driver. The camera proxy driver is used to receive data that is input by an AI module 623 through a socket channel, and data that is input by a VENC module 624 through a UVC channel. The camera proxy driver is a proxy of the camera on one side of the electronic device. The camera proxy driver is used to receive two streams of data uploaded by the camera, and continue to transmit the two streams of data to a higher layer of the electronic device; and is used to receive data from the higher layer of the electronic device, and transmit the data to the camera through two streams by using a hardware layer. It should be noted that if the camera 600 is connected to the electronic device 610 through one USB interface, a socket message and a UVC message are transmitted through one USB cable. In a transmission process, the AI module or the VENC module of the camera may occupy the USB cable in a preemptive or balanced manner to transmit respective data. For inputting the data through the socket channel, sending the socket message is used as an example. For inputting the data through the UVC channel, sending the UVC message, for example, a SET CUR message, is used as an example.

In a possible implementation, the camera proxy driver may obtain application identification information and/or a type of a started application in the electronic device 610, and send the obtained application identification information and/or type to the camera 600. A CPU 640 of the camera 600 determines configuration parameters of modules based on the received application identification information and/or type, and respectively sends the configuration parameters of the modules to the modules. Based on the received configuration parameter, each module determines whether to start, run, and operate, determines a specific branch to which a processing result is sent, and the like.

Optionally, a memory 650 stores a correspondence between application identification information (namely, an application ID), a type, and a module use manner. The CPU 640 of the camera 600 obtains a corresponding type and a corresponding module use manner based on the received application identification information, and starts (or uses) a corresponding module.

Alternatively, the memory 650 does not store the correspondence between application identification information (namely, an application ID), a type, and a module use manner.

Unless otherwise stated, related content in Embodiment 2 of this application is the same as or similar to related content in Embodiment 1 of this application. Details are not described herein again.

Figures 1, 7A:
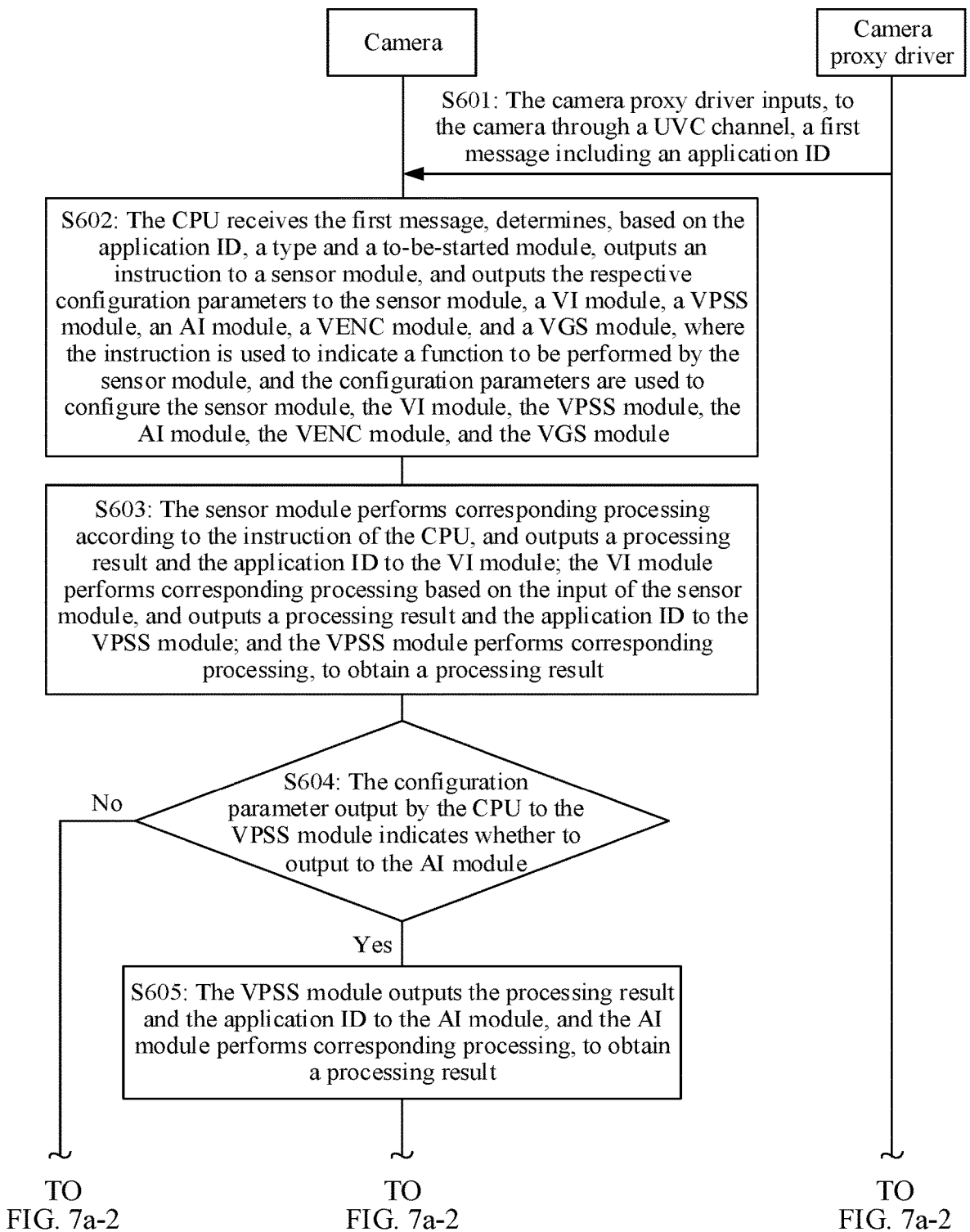
Figures 2, 7A:
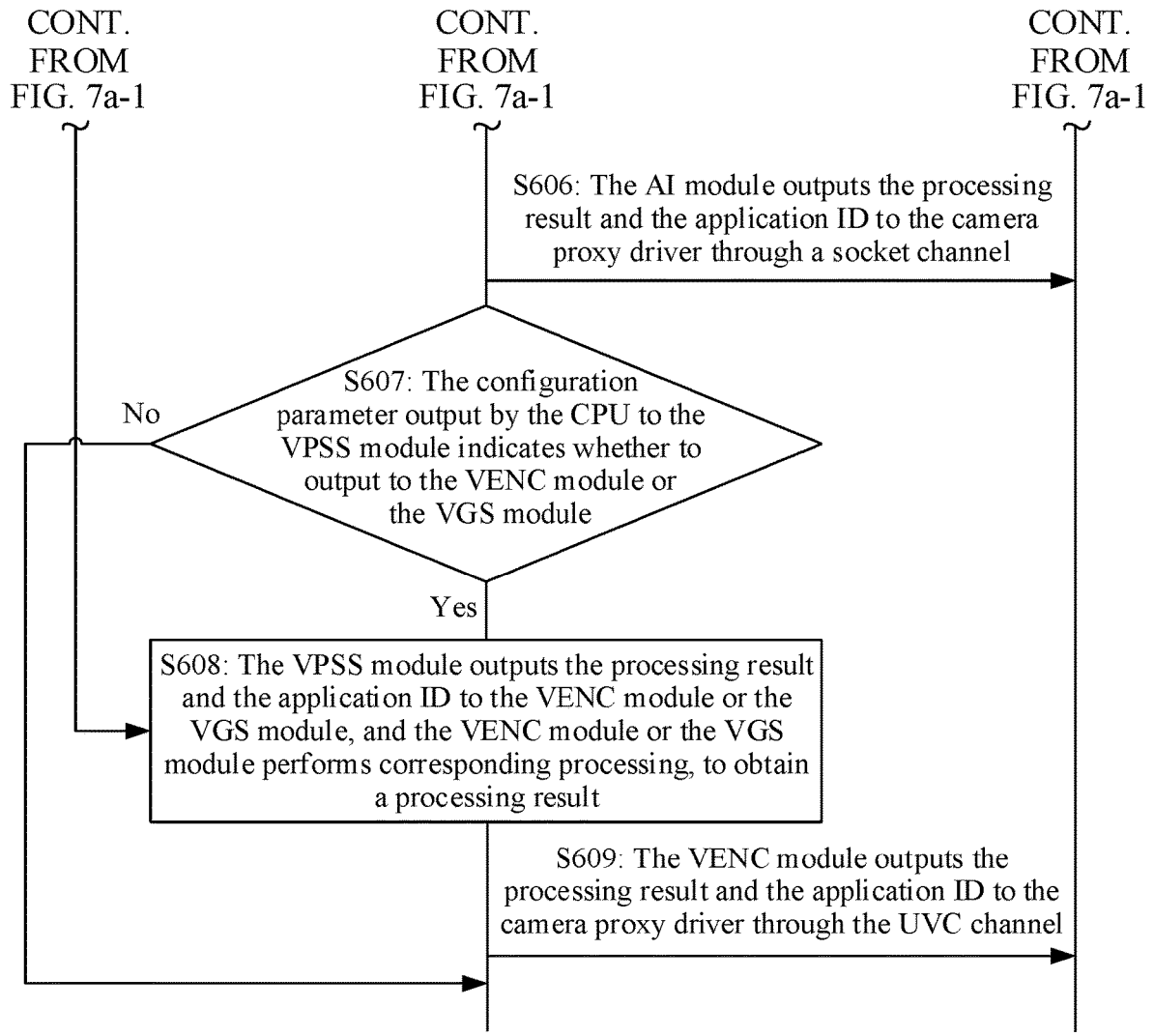

A process in which the camera proxy driver of the electronic device uses the camera in FIG. 7a-1 and FIG. 7a-2 is basically the same as a process in which the camera HAL driver and the camera proxy driver use the camera in FIG. 5a-1 and FIG. 5a-2. A difference is that in FIG. 5a-1 and FIG. 5a-2, the first message is sent by the camera HAL driver, and the processing result of the AI module or the VENC module is received by the camera proxy driver. In contrast, in FIG. 7a-1 and FIG. 7a-2, the first message is sent by the camera proxy driver, and the processing result of the AI module or the VENC module is also received by the camera proxy driver. In FIG. 7a-1 and FIG. 7a-2, specific steps of a process in which the camera proxy driver of the electronic device uses the camera are as follows.

S601: The camera proxy driver inputs, to the camera through the UVC channel, a first message including an application ID.

S602: The CPU receives the first message, determines, based on the application ID, a type and a to-be-started module, outputs an instruction to the sensor module, and outputs the respective configuration parameters to the sensor module, the VI module, the VPSS module, the AI module, the VENC module, and the VGS module, where the instruction is used to instruct the sensor module to perform a specific function, and the configuration parameters are used to configure the sensor module, the VI module, the VPSS module, the AI module, the VENC module, and the VGS module.

S603. The sensor module performs corresponding processing according to the instruction of the CPU, and outputs a processing result and the application ID to the VI module; the VI module performs corresponding processing based on the input of the sensor module, and outputs a processing result and the application ID to the VPSS module; and the VPSS module performs corresponding processing to obtain a processing result.

S604: The configuration parameter output by the CPU to the VPSS module indicates whether to output the processing result to the AI module. After the configuration parameter output by the CPU to the VPSS module indicates to output the processing result to the AI module, S605 is performed; otherwise, S608 is performed.

S605: The VPSS module outputs the processing result and the application ID to the AI module, and the AI module performs corresponding processing to obtain a processing result.

S606: The AI module outputs the processing result and the application ID to the camera proxy driver through the socket channel.

S607: The configuration parameter output by the CPU to the VPSS module indicates whether to output the processing result to the VENC module or the VGS module. After the configuration parameter output by the CPU to the VPSS module indicates to output the processing result to the VENC module or the VGS module, S608 is performed.

S608: The VPSS module outputs the processing result and the application ID to the VENC module or the VGS module, and the VENC module or the VGS module performs corresponding processing to obtain a processing result.

S609: The VENC module outputs the processing result to the camera proxy driver through the UVC channel.

Figures 1, 7B:
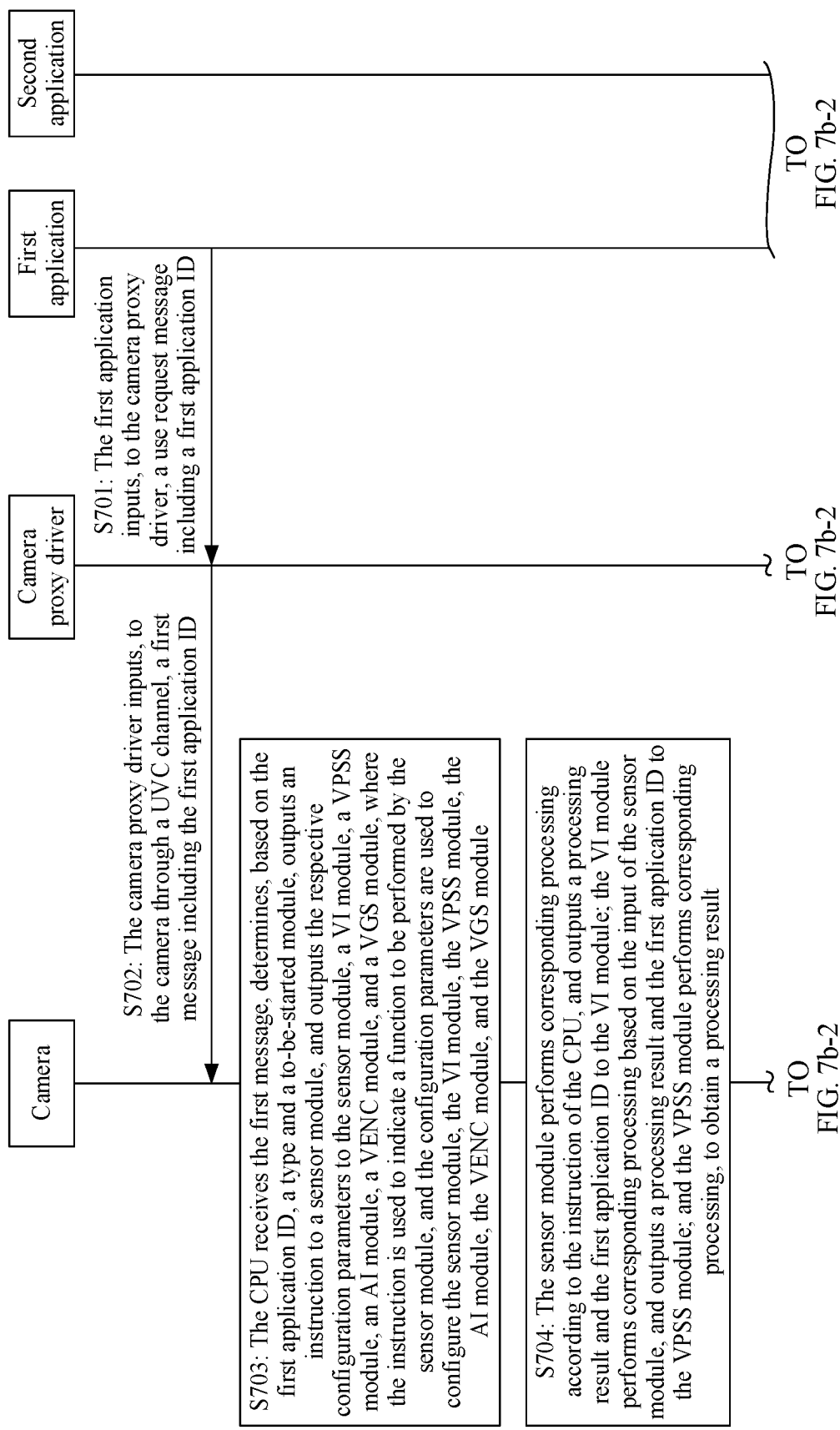
Figures 2, 7B:
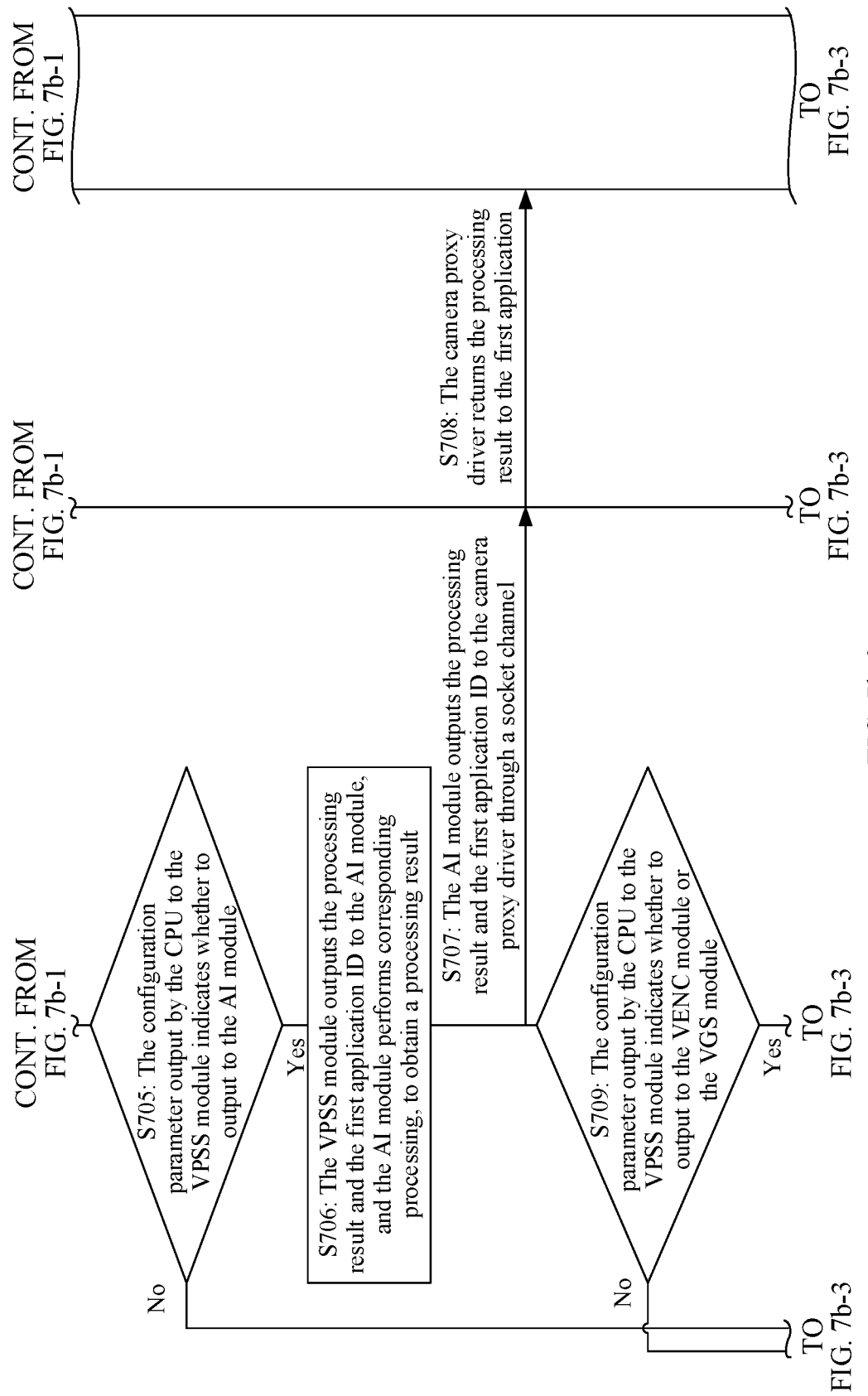
Figures 3, 7B:
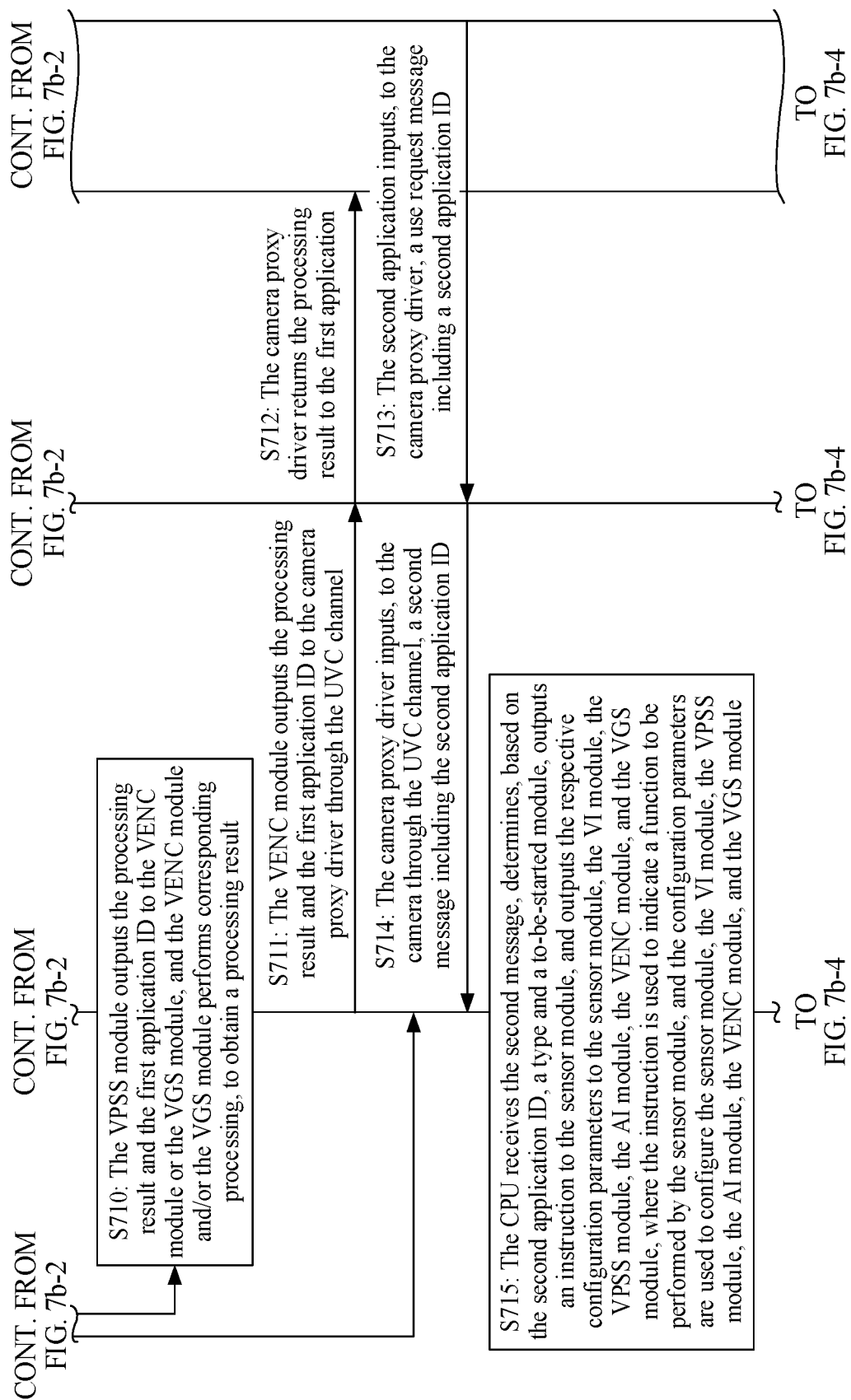
Figures 5, 7B:
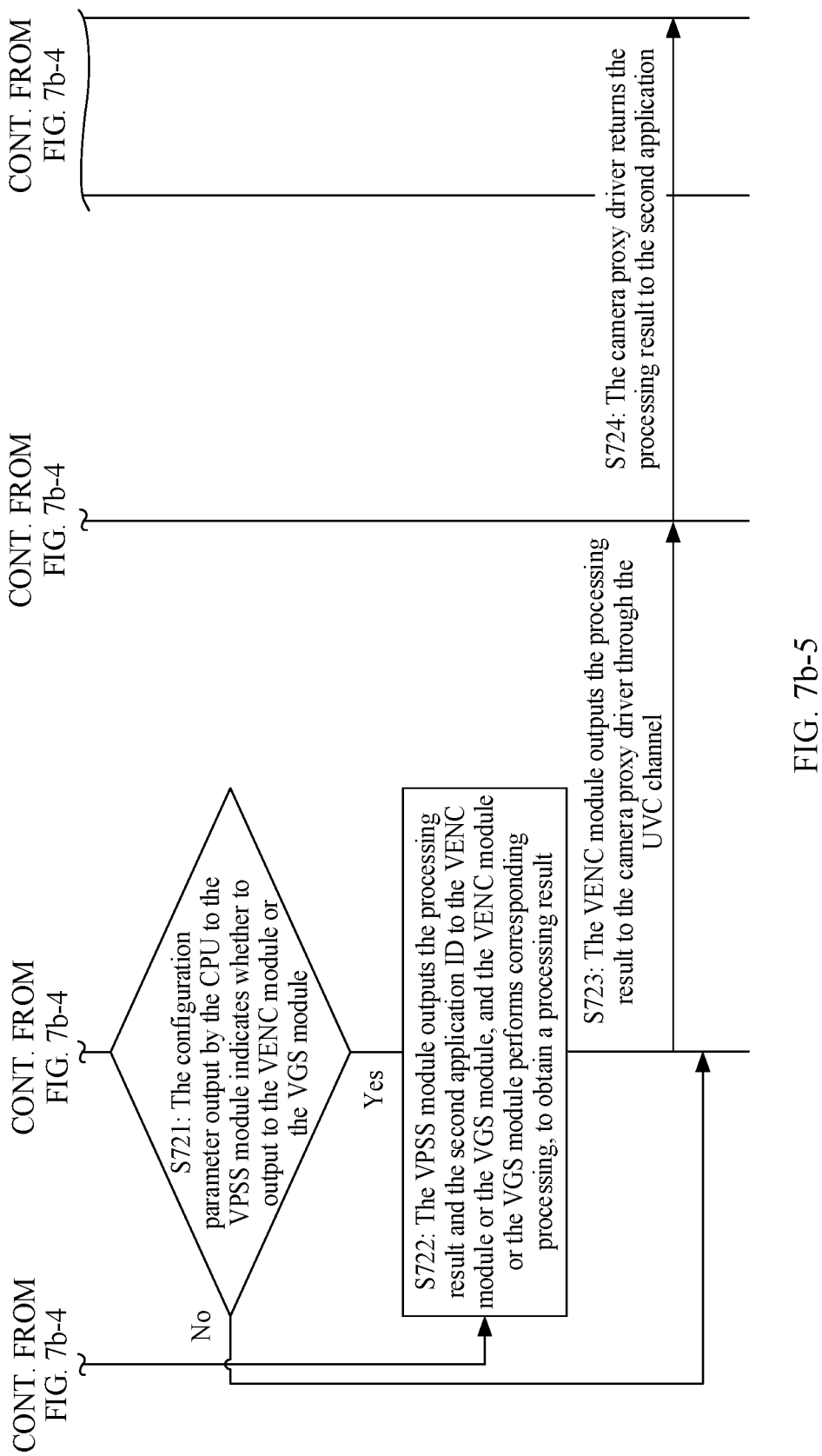

FIG. 7b-1 to FIG. 7b-5 further illustrate method steps of remotely using the camera of the first electronic device by a second electronic device. Content in FIG. 7b-1 to FIG. 7b-5 is basically the same as that in FIG. 5b-1 to FIG. 5b-5. A difference is that in FIG. 5b-1 to FIG. 5b-5, both the first application and the second application send the messages including the application IDs to the camera by using the camera HAL driver, and receive the processing results and the application IDs based on different application IDs by using the camera HAL driver or the camera proxy driver. In contrast, in FIG. 7b-1 to FIG. 7b-5, both the first application and the second application send the messages including the application IDs to the camera by using the camera proxy driver, and receive the processing results and the application IDs also by using the camera proxy driver. Specific steps in FIG. 7b-1 to FIG. 7b-5 are not described herein.

Figures 1, 7C:
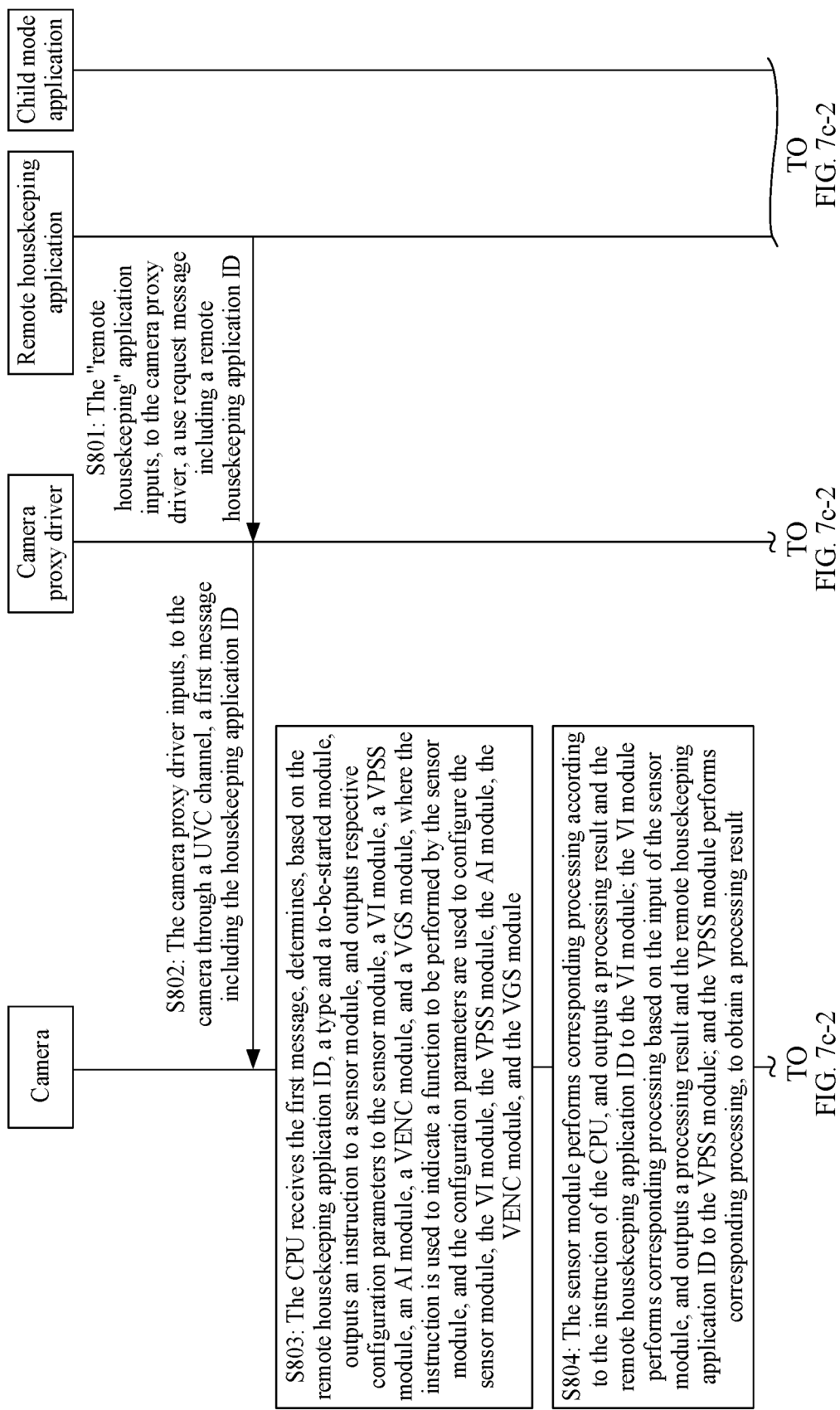
Figures 2, 7C:
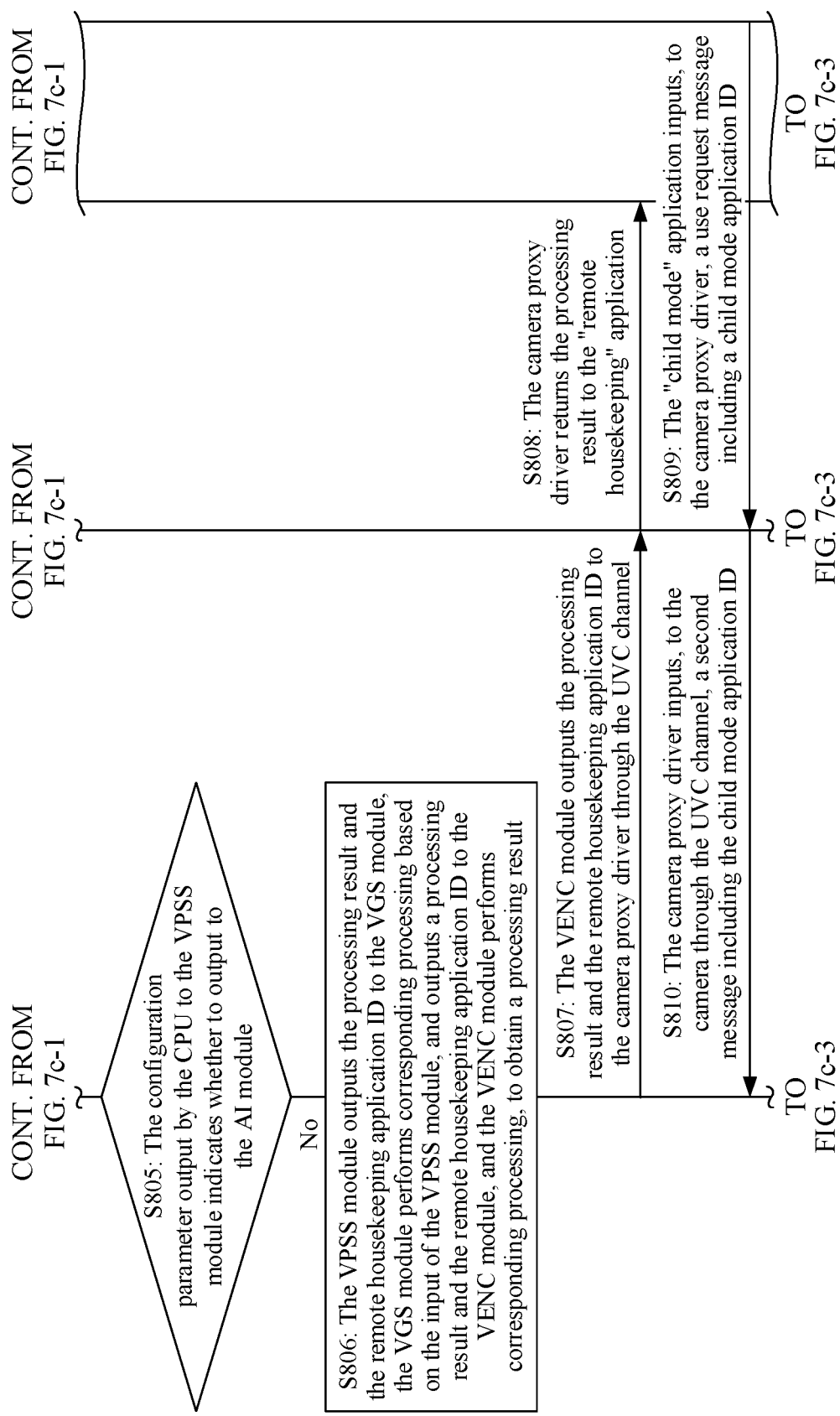
Figures 3, 7C:
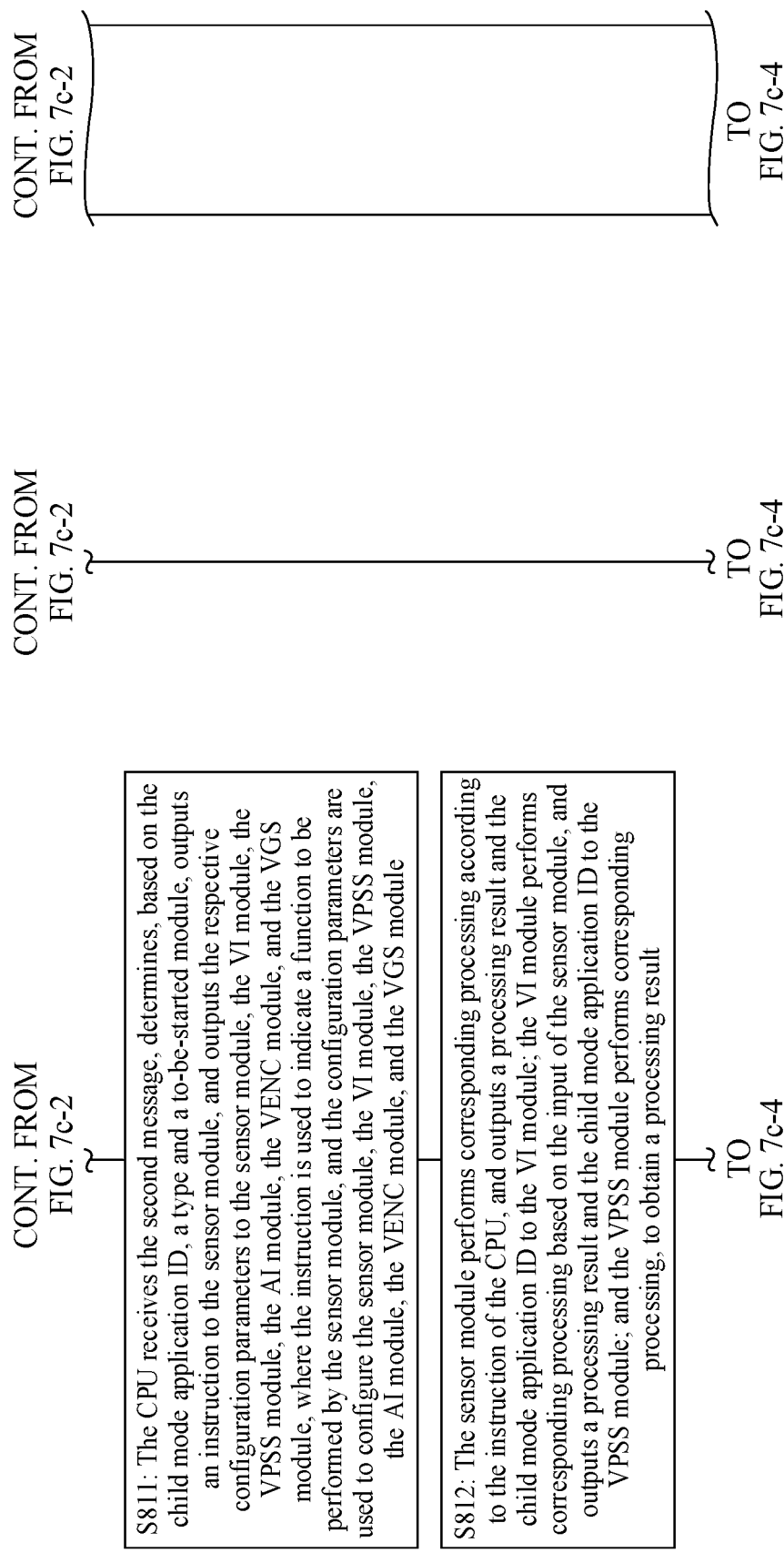
Figures 1, 7D:
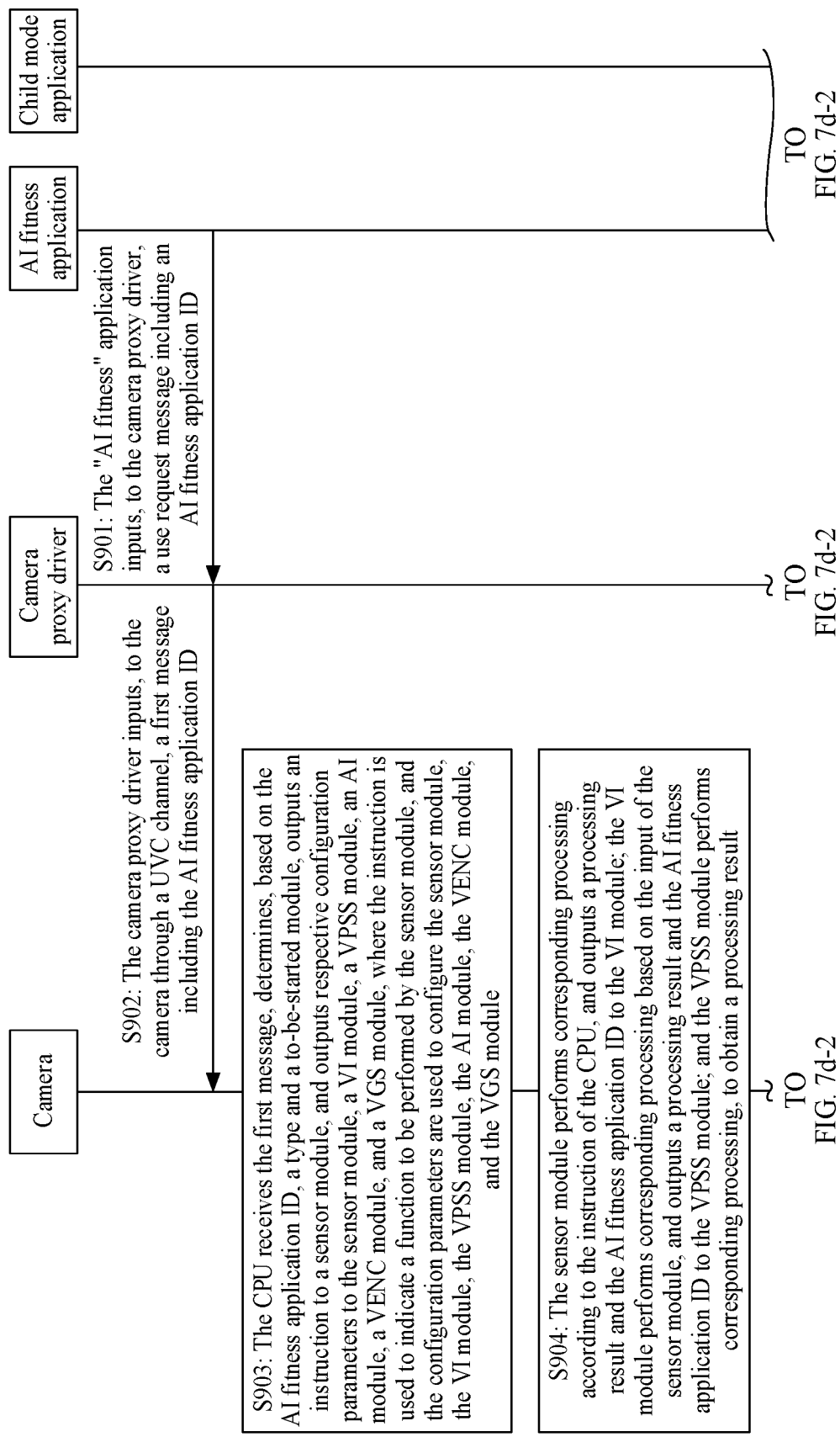
Figures 2, 7D:
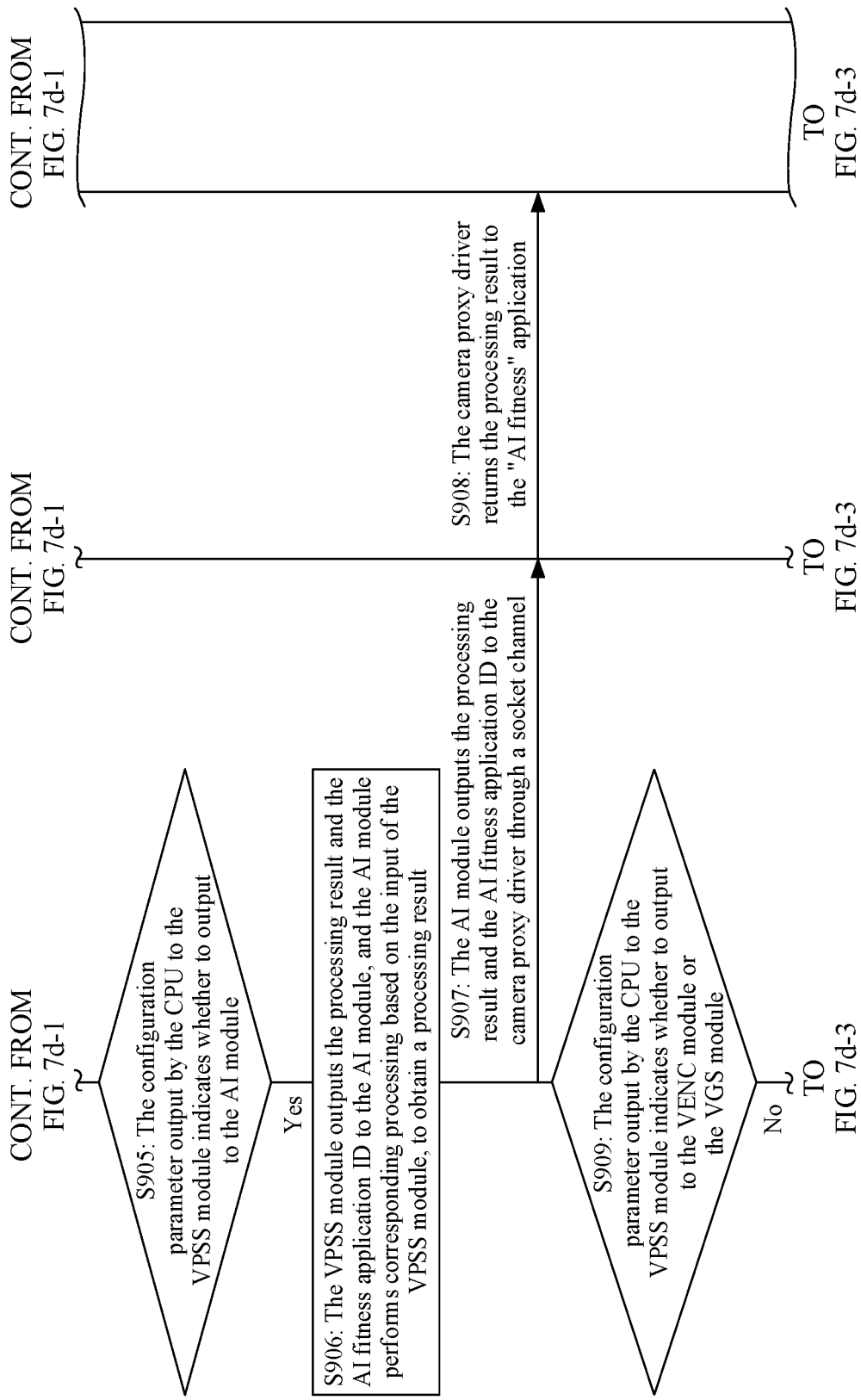
Figures 3, 7D:
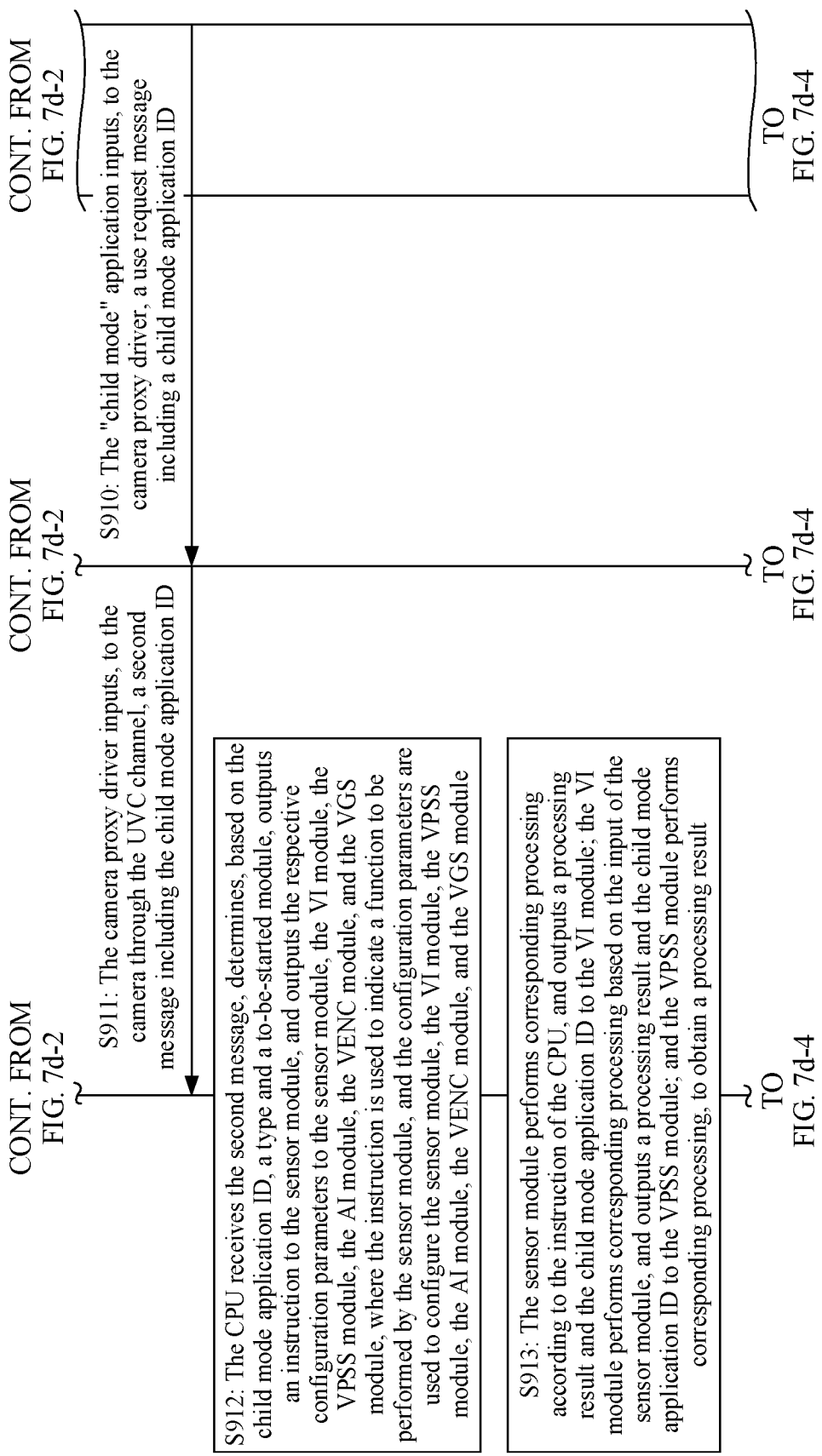
Figures 4, 7D:
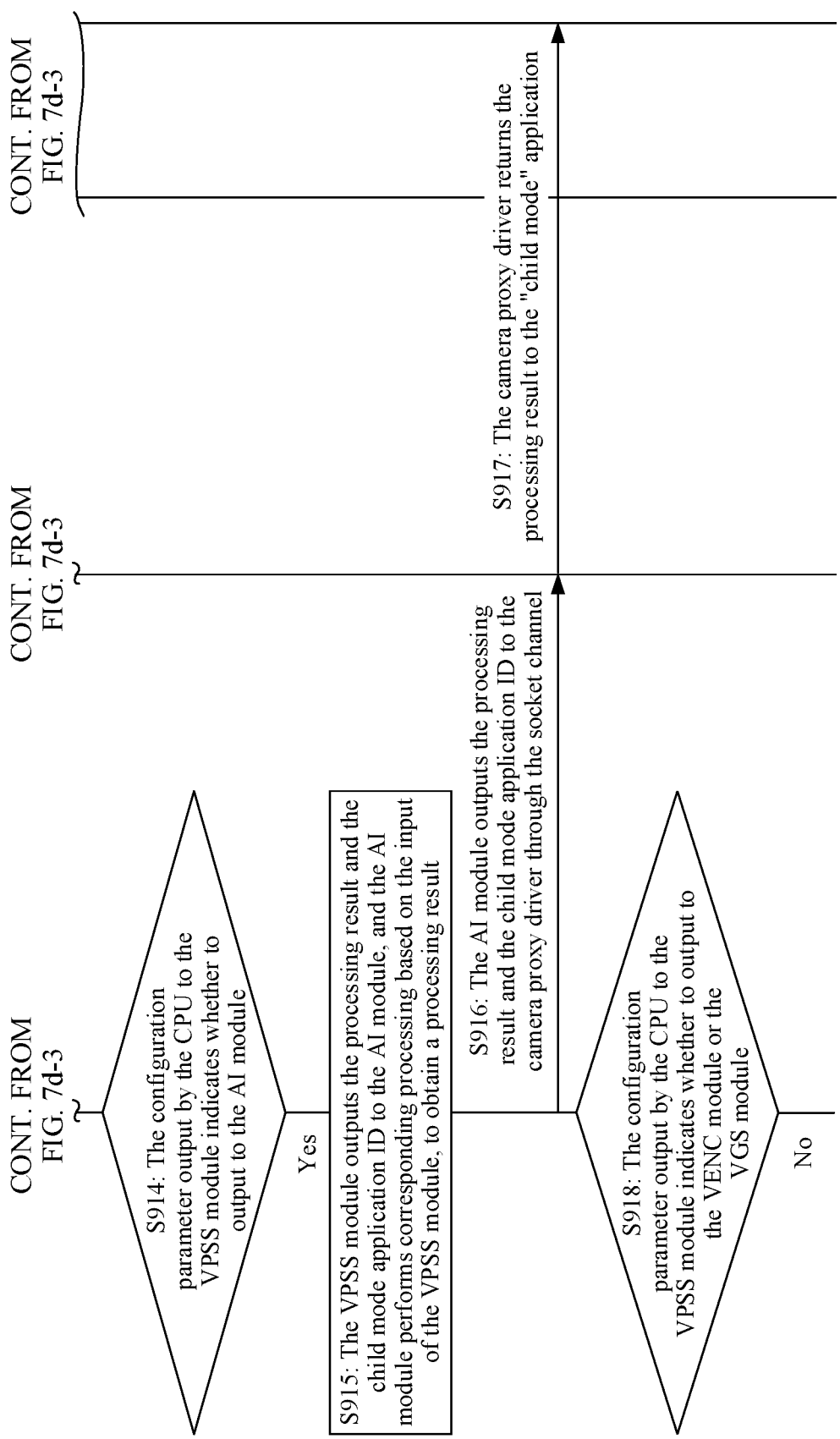

With reference specific applications, FIG. 7c-1 and FIG. 7c-4 and FIG. 7d-1 to FIG. 7d-4 further illustrate method steps of remotely using the camera of the first electronic device by the second electronic device. In FIG. 7c-1 and FIG. 7c-4, a first application is a "remote housekeeping" application, and a second application is a "child mode" application. In FIG. 7d-1 to FIG. 7d-4, a first application is an "AI fitness" application, and a second application is a "child mode" application. Content in FIG. 7c-1 and FIG. 7c-4 is basically the same as that in FIG. 5c-1 to FIG. 5c-4, and content in FIG. 7d-1 to FIG. 7d-4 is basically the same as that in FIG. 5d-1 to FIG. 5d-4. A difference is that in FIG. 5c-1 to FIG. 5c-4 and FIG. 5d-1 to FIG. 5d-4, both of two applications send the messages including the application IDs to the camera by using the camera HAL driver, and receive the processing results and the application IDs based on different application IDs by using the camera HAL driver or the camera proxy driver. In contrast, in FIG. 7c-1 and FIG. 7c-4 and FIG. 7d-1 to FIG. 7d-4, both of two applications send the messages including the application IDs to the camera by using the camera proxy driver, and receive the processing results and the application IDs also by using the camera proxy driver. Specific steps in FIG. 7c-1 and FIG. 7c-4 and FIG. 7d-1 to FIG. 7d-4 are not described herein.

In summary, in this application, corresponding modules of the camera may be started based on different types, to implement a dynamic use method that is based on a type, so that a plurality of applications use the camera.

It can be understood that, to implement the foregoing functions, the electronic device includes corresponding hardware and/or software modules for performing the functions. With reference to the algorithm steps of the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, functional modules of the electronic device may be obtained through division based on the foregoing method examples. For example, each functional module may be obtained through division in correspondence to each function, or two or more functions may be integrated into one processing module. The integrated module may be implemented by using hardware. It should be noted that, in embodiments, division into the modules is an example, is merely logical function division, and may be other division during actual implementation.

Figure 8:
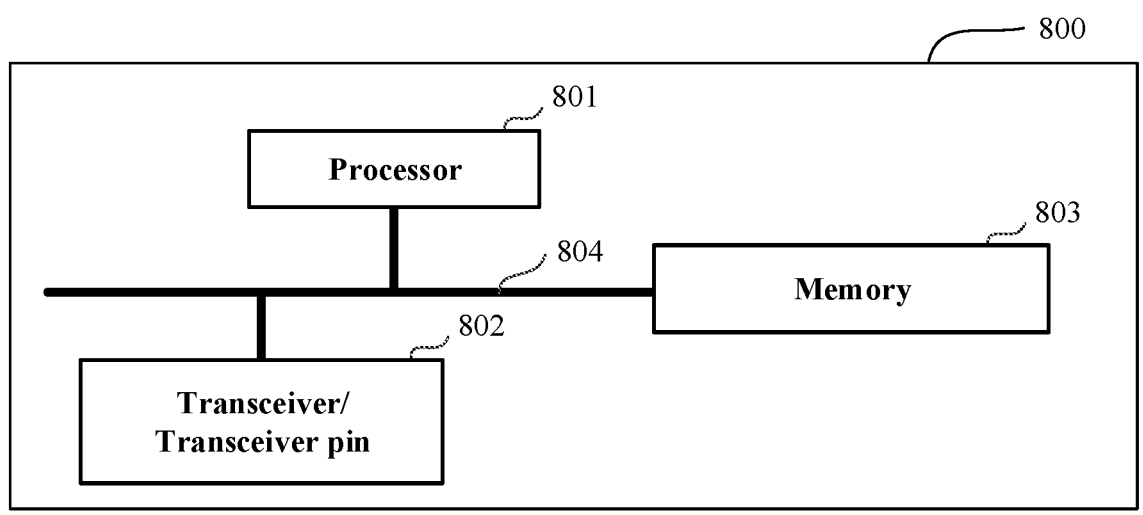
FIG. 8 is a schematic diagram of a structure of an electronic device according to an embodiment of this application.

In another example, FIG. 8 shows a schematic block diagram of an apparatus 800 according to an embodiment of this application. The apparatus 800 may include a processor 801 and a transceiver/transceiver pin 802. Optionally, the apparatus 800 further includes a memory 803.

Components of the apparatus 800 are coupled together through a bus 804. In addition to a data bus, the bus 804 further includes a power bus, a control bus, and a status signal bus. However, for clear description, various types of buses in the figure are marked as the bus 804.

Optionally, the memory 803 may be configured to store instructions in the foregoing method embodiments. The processor 801 may be configured to: execute the instructions in the memory 803, control the receiving pin to receive a signal, and control the sending pin to send a signal.

The apparatus 800 may be the first electronic device, the second electronic device, or the camera in the foregoing method embodiments.

All related content of the steps in the method embodiments may be cited in function descriptions of corresponding function modules. Details are not described herein again.

An embodiment further provides a computer storage medium. The computer storage medium stores computer instructions. When the computer instructions are run on an electronic device, the electronic device is enabled to perform the foregoing related method steps to implement the camera use methods in the foregoing embodiments.

An embodiment further provides a computer program product. When the computer program product is run on a computer, the computer is enabled to perform the foregoing related steps to implement the camera use methods in the foregoing embodiments.

In addition, an embodiment of this application further provides an apparatus. The apparatus may be specifically a chip, a component, or a module, and the apparatus may include a processor and a memory that are connected to each other. The memory is configured to store computer executable instructions. When the apparatus runs, the processor may execute the computer executable instructions stored in the memory, so that the chip performs the camera use methods in the foregoing method embodiments.

The electronic device, the computer storage medium, the computer program product, or the chip that is provided in embodiments is configured to perform the corresponding method provided above. Therefore, for beneficial effects thereof, reference may be made to the beneficial effects of the corresponding method provided above. Details are not described herein again.

Based on descriptions of the foregoing implementations, a person skilled in the art may understand that, for the purpose of convenient and brief descriptions, division into the foregoing function modules is merely used as an example for description. In actual application, the foregoing functions can be allocated to different function modules and implemented based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

Any content in embodiments of this application and any content in a same embodiment can be freely combined. Any combination of the foregoing content falls within the scope of this application.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera, wherein the camera is connected to an electronic device through a first interface, and the camera comprises:
    one or more processors; and
    one or more memories coupled to the one or more processors and storing programing instructions for execution by the one or more processor to perform the following operations:
        receiving a first message comprising an application identification (ID) or an application sub-function ID;
        in response to the first message,
            outputting a first processing result having a first message type along a first path through the first interface when it is detected that a type corresponding to the application ID or the application sub-function ID is a first type; or
            outputting a second processing result having a second message type along a second path or a third path through the first interface when it is detected that a type corresponding to the application ID or the application sub-function ID is a second type;
        receiving a second message comprising another application ID or another application sub-function ID; and
        in response to the second message,
            outputting a third processing result having the first message type along the first path through the first interface when it is detected that a type corresponding to the another application ID or the another application sub-function ID is the first type.

2. The camera according to claim 1, wherein the one or more memories store the programing instructions for execution by the one or more processors to perform the following operations:
    in response to the second message, outputting a fourth processing result having the second message type along the second path or the third path through the first interface when it is detected that the type corresponding to the another application ID or the another application sub-function ID is the second type.

3. The camera according to claim 2, wherein the one or more memories store the programing instructions for execution by the one or more processors to perform the following operations:
    in response to the first message,
        when it is detected that the type corresponding to the application ID or the application sub-function ID is a third type,
            outputting the first processing result having the first message type along the first path through the first interface; and
            outputting the second processing result having the second message type along the second path or the third path through the first interface, wherein the third type is the first type+the second type; and
    in response to the second message,
        when it is detected that the type corresponding to the another application ID or the another application sub-function ID is the third type,
            outputting the third processing result having the first message type along the first path through the first interface; and
            outputting the fourth processing result having the second message type along the second path or the third path through the first interface, wherein the third type is the first type+the second type.

4. The camera according to claim 1, wherein the camera further comprises:
    one or more sensors, a video input device, a video processing device, an artificial intelligence device, a video encoder, and a video graphics device, wherein:
    the one or more sensors are configured to collect an image, and output the collected image to the video input device;
    the one or more memories store the programming instructions for execution by the video input device to pre-process the image collected by the one or more sensors;
    the one or more memories store the programming instructions for execution by the video processing device to perform noise reduction processing on an image obtained through preprocessing by the video input device;
    the one or more memories store the programming instructions for execution by the artificial intelligence device to perform artificial intelligence recognition on an image obtained through processing by the video processing device, and output an artificial intelligence event of the first message type through the first interface;
    the one or more memories store the programming instructions for execution by the video graphics device to perform zoom processing on the image obtained through processing by the video processing device, and output an image obtained through zoom processing to the video encoder; and
    the one or more memories store the programming instructions for execution by the video encoder to encode the image obtained through processing by the video processing device or the image obtained through zoom processing by the video graphics device to generate a video stream, and output the video stream of the second message type through the first interface.

5. The camera according to claim 4, wherein
the first path comprises the one or more sensors, the video input device,
the video processing device, and the artificial intelligence device;
    the second path comprises the one or more sensors, the video input device, the video processing device, the video graphics device, and the video encoder; and
    the third path comprises the one or more sensors, the video input device, the video processing device, and the video encoder.

6. The camera according to claim 3, wherein the first type is an artificial intelligence type, the second type is a video stream type, the third type is the artificial intelligence type+the video stream type, the first message type is a socket message type, the second message type is a universal serial bus video class (UVC) message type, and the first interface is a universal serial bus (USB) interface.

7. A camera, wherein the camera is connected to an electronic device through a first interface and a second interface, and the camera comprises:
    one or more processors; and
    one or more memories coupled to the one or more processors and storing programming instructions for execution by the one or more processors to perform the following operations:
        receiving a first message comprising an application identification (ID) or an application sub-function ID;
        in response to the first message,
            outputting a first processing result having a first message type along a first path through the first interface when it is detected that a type corresponding to the application ID or the application sub-function ID is a first type; or
outputting a second processing result having a second message type along a second path or a third path through the second interface when it is detected that a type corresponding to the application ID or the application sub-function ID is a second type;
receiving a second message comprising another application ID or another application sub-function ID; and
in response to the second message,
outputting a third processing result having the first message type along the first path through the first interface when it is detected that a type corresponding to the another application ID or the another application sub-function ID is the first type.

8. The camera according to claim 7, wherein the one or more memories store the programing instructions for execution by the one or more processors to perform the following operations:
in response to the second message, outputting a fourth processing result having the second message type along the second path or the third path through the second interface when it is detected that the type corresponding to the another application ID or the another application sub-function ID is the second type.

9. The camera according to claim 8, wherein the one or more memories store the programing instructions for execution by the one or more processors to perform the following operations:
in response to the first message,
when it is detected that the type corresponding to the application ID or the application sub-function ID is a third type,
outputting the first processing result having the first message type along the first path through the first interface; and
outputting the second processing result having the second message type along the second path or the third path through the second interface, wherein the third type is the first type+the second type; and
in response to the second message,
when it is detected that the type corresponding to the another application ID or the another application sub-function ID is the third type,
outputting the third processing result having the first message type along the first path through the first interface; and
outputting the fourth processing result having the second message type along the second path or the third path through the second interface, wherein the third type is the first type+the second type.

10. The camera according to claim 7, wherein the camera further comprises:
one or more sensors, a video input device, a video processing device, an artificial intelligence device, a video encoder, and a video graphics device, wherein:
the one or more sensors are configured to collect an image, and output the collected image to the video input device;
the one or more memories store the programming instructions for execution by the video input device to preprocess the image collected by the one or more sensors;
the one or more memories store the programming instructions for execution by the video processing device to perform noise reduction processing on an image obtained through preprocessing by the video input device;
the one or more memories store the programming instructions for execution by the artificial intelligence device to perform artificial intelligence recognition on an image obtained through processing by the video processing device, and output an artificial intelligence event of the first message type through the first interface;
the one or more memories store the programming instructions for execution by the video graphics device to perform zoom processing on the image obtained through processing by the video processing device, and output an image obtained through zoom processing to the video encoder; and
the one or more memories store the programming instructions for execution by the video encoder to encode the image obtained through processing by the video processing device or the image obtained through zoom processing by the video graphics device to generate a video stream, and output the video stream of the second message type through the second interface.

11. The camera according to claim 10, wherein;
the first path comprises the one or more sensors, the video input device, the video processing device, and the artificial intelligence device;
the second path comprises the one or more sensors, the video input device, the video processing device, the video graphics device, and the video encoder; and
the third path comprises the one or more sensors, the video input device, the video processing device, and the video encoder.

12. The camera according to claim 9, wherein the first type is an artificial intelligence type, the second type is a video stream type, the third type is the artificial intelligence type+the video stream type, the first message type is a socket message type, the second message type is a universal serial bus video class (UVC) message type, and at least one of the first interface and the second interface is a universal serial bus (USB) interface.

13. An electronic device, wherein the electronic device is connected to a camera through a first interface, and the electronic device comprises:
one or more processors;
one or more memories coupled to the one or more processors and storing programming instructions for execution by the one or more processors to perform the following operations:
when detecting that an application associated with the camera is started or when detecting that an application sub-function of an application is started, sending a first message comprising an application identification (ID) or an application sub-function ID to the camera, wherein the application ID corresponds to the application or the application sub-function ID corresponds to the application sub-function;
receiving at least one of a first processing result having a first message type or a second processing result having a second message type through the first interface;
when detecting that another application associated with the camera is started or when detecting that another application sub-function is enabled, sending a second message comprising another application ID or another application sub-function ID to the camera, wherein the another application ID corresponds to the another application or the another application sub-function ID corresponds to the another application sub-function; and receiving a third processing result having the first message type or a fourth processing result having the second message type through the first interface.

14. The electronic device according to claim 13, wherein the camera further comprises a prism or a mirror, and the prism or the mirror is located on an object side of a zoom lens, and is configured to deflect rays to the zoom lens.

15. The electronic device according to claim 14, wherein the first message type is a socket message type, the second message type is a universal serial bus video class (UVC) message type, and the first interface is a universal serial bus (USB) interface.

16. An electronic device, wherein the electronic device is connected to a camera through a first interface and a second interface, and the electronic device comprises:

one or more processors;

one or more processors, the electronic device is enabled to perform the following steps one or more memories coupled to the one or more processors and storing programing instructions for execution by the one or more processor to perform the following operations:

when detecting that an application associated with the camera is started or when detecting that an application sub-function of an application is started, sending a first message comprising an application identification (ID) or an application sub-function ID to the camera, wherein the application ID corresponds to the application or the application sub-function ID corresponds to the application sub-function;

receiving at least one of a first processing result having a first message type or a second processing result having a second message type through the first interface;

when detecting that another application associated with the camera is started or when detecting that another application sub-function is enabled, sending a second message comprising another application ID or another application sub-function ID to the camera, wherein the another application ID corresponds to the another application or the another application sub-function ID corresponds to the another application sub-function; and receiving a third processing result having the first message type or a fourth processing result having the second message type through the first interface.

17. The electronic device according to claim 16, wherein the first message type is a socket message type, the second message type is a universal serial bus video class (UVC) message type, and at least one of the first interface and the second interface is a universal serial bus (USB) interface.

* * * * *

UNITED STATES PATENT AND TRADEMARK OFFICE
CERTIFICATE OF CORRECTION

PATENT NO. : 12,184,972 B2
APPLICATION NO. : 18/003652
DATED : December 31, 2024
INVENTOR(S) : Xingong Zhang and Fei Lv Page 1 of 1

It is certified that error appears in the above-identified patent and that said Letters Patent is hereby corrected as shown below:

In the Claims

In Column 40, In Line 25, In Claim 11, delete "wherein;" and insert -- wherein: --.

In Column 41, In Line 20-21, In Claim 16, below "processors;" delete "one or more processors, the electronic device is enabled to perform the following steps".

Signed and Sealed this
Eighteenth Day of March, 2025

Coke Morgan Stewart
*Acting Director of the United States Patent and Trademark Office*